(12) United States Patent
Tsai et al.

(10) Patent No.: US 12,429,663 B2
(45) Date of Patent: Sep. 30, 2025

(54) IMAGING LENS ASSEMBLY, IMAGE CAPTURING APPARATUS AND ELECTRONIC DEVICE

(71) Applicant: LARGAN PRECISION CO., LTD., Taichung (TW)

(72) Inventors: Chun-Hua Tsai, Taichung (TW); Yu-Chen Lai, Taichung (TW); Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 818 days.

(21) Appl. No.: 17/667,796

(22) Filed: Feb. 9, 2022

(65) Prior Publication Data

US 2022/0350105 A1    Nov. 3, 2022

(30) Foreign Application Priority Data

Apr. 30, 2021   (TW) ................... 110115808

(51) Int. Cl.
*G02B 7/02* (2021.01)
*G02B 7/18* (2021.01)
*G02B 13/00* (2006.01)

(52) U.S. Cl.
CPC ............ *G02B 7/028* (2013.01); *G02B 7/021* (2013.01); *G02B 7/181* (2013.01); *G02B 13/0065* (2013.01); *G02B 7/025* (2013.01)

(58) Field of Classification Search
CPC ........ G02B 7/028; G02B 7/003; G02B 7/021; G02B 7/025; G02B 13/0065; G02B 7/022; G02B 7/1805; G02B 7/181; G03B 30/00

USPC .......................................... 359/811, 733, 709
See application file for complete search history.

(56) References Cited

U.S. PATENT DOCUMENTS

| | | | |
|---|---|---|---|
| 7,724,452 | B2 | 5/2010 | Huang |
| 8,570,672 | B2 | 10/2013 | Lin |
| 9,042,040 | B2 | 5/2015 | Kim |
| 9,759,885 | B2 | 9/2017 | Yan et al. |
| 9,857,551 | B2 | 1/2018 | Yan et al. |
| 9,910,238 | B2 | 3/2018 | Yan et al. |

(Continued)

FOREIGN PATENT DOCUMENTS

| | | |
|---|---|---|
| CN | 101526656 A | 9/2009 |
| CN | 101576641 A | 11/2009 |

(Continued)

*Primary Examiner* — George G. King
(74) *Attorney, Agent, or Firm* — McClure, Qualey & Rodack, LLP

(57) ABSTRACT

An imaging lens assembly includes, in order from an object side to an image side, a first lens element and a second lens element. The first lens element includes a first frustum surface and a second frustum surface. The first frustum surface is disposed on a side of the first lens element facing towards the second lens element. The first frustum surface and the second frustum surface are disposed on the same side and coaxial, and the second frustum surface is closer to an optical axis than the first frustum surface to the optical axis. The second lens element includes a first corresponding frustum surface and a second corresponding frustum surface. The first corresponding frustum surface is corresponding to the first frustum surface. The second corresponding frustum surface is corresponding to the second frustum surface.

22 Claims, 39 Drawing Sheets

(56) References Cited

U.S. PATENT DOCUMENTS

| | | | |
|---|---|---|---|
| 2014/0029114 A1* | 1/2014 | Kim | G02B 7/003 |
| | | | 359/709 |
| 2015/0323756 A1 | 11/2015 | Cho et al. | |
| 2018/0059379 A1* | 3/2018 | Chou | G02B 13/0065 |
| 2020/0073077 A1* | 3/2020 | Kanzaki | G02B 3/04 |
| 2021/0302805 A1* | 9/2021 | Yoshida | G02B 7/021 |

FOREIGN PATENT DOCUMENTS

| | | |
|---|---|---|
| CN | 103364915 A | 10/2013 |
| CN | 103576276 A | 2/2014 |
| CN | 103901574 A | 7/2014 |
| CN | 105093467 A | 11/2015 |
| CN | 210222336 U | 3/2020 |

\* cited by examiner

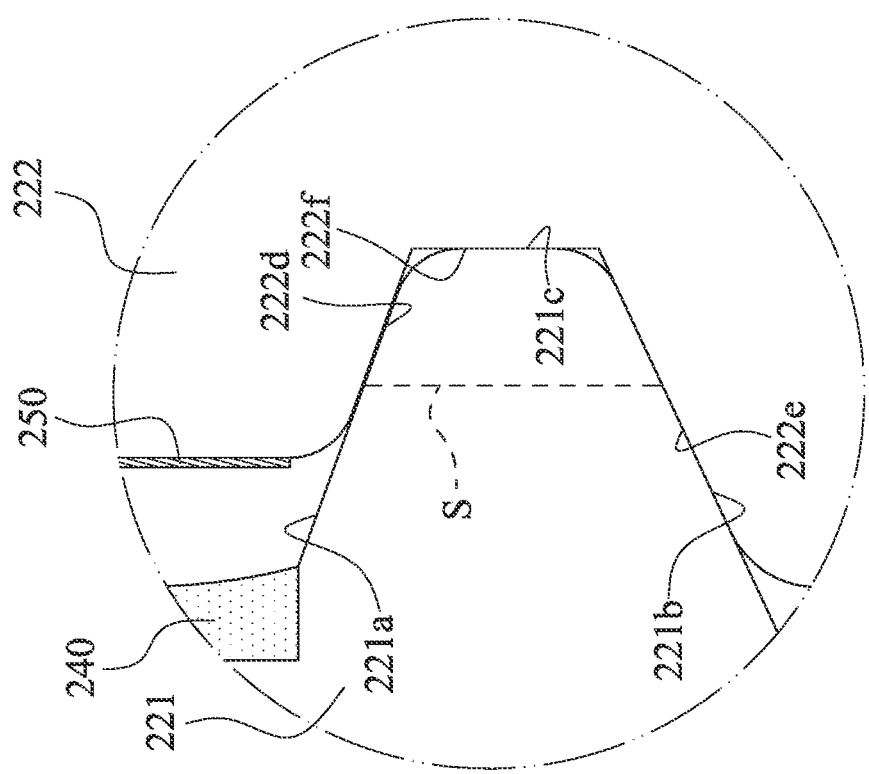
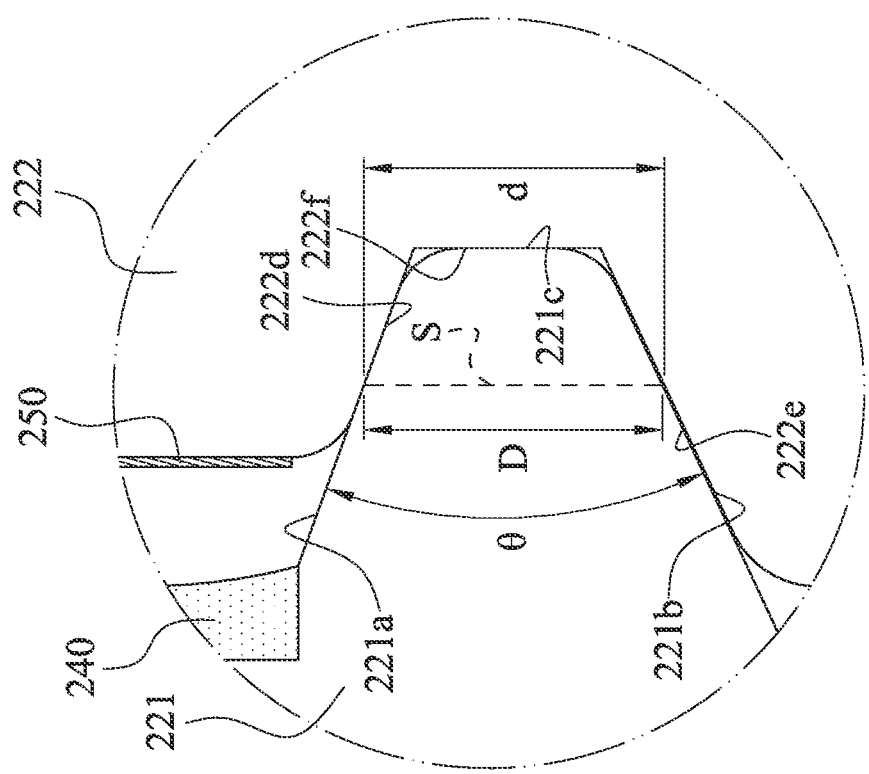
Fig. 2E
Fig. 2F

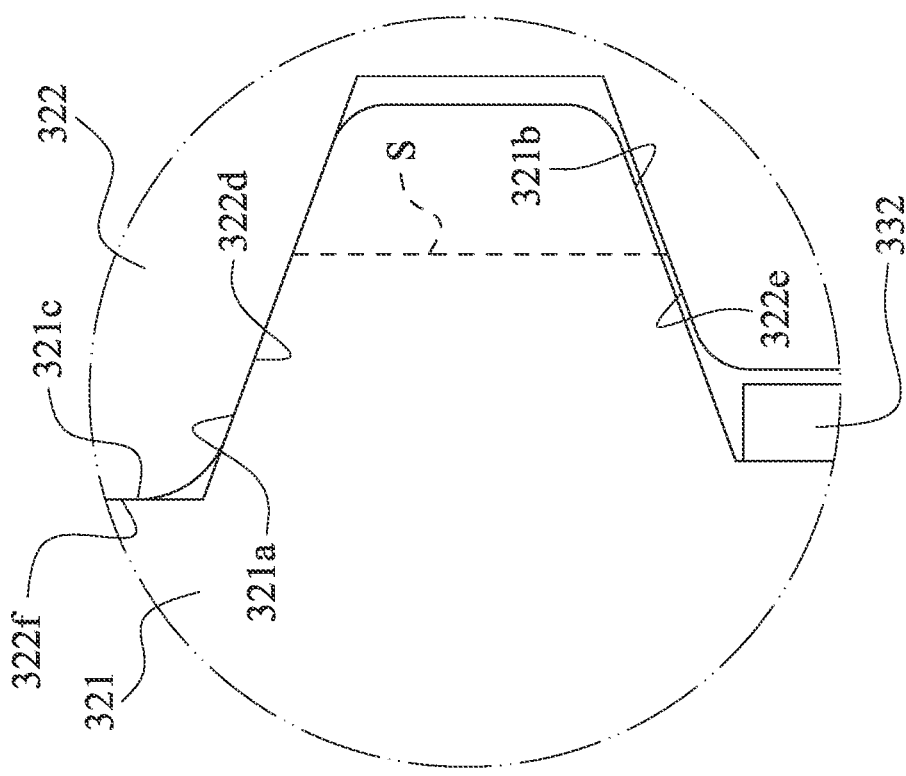
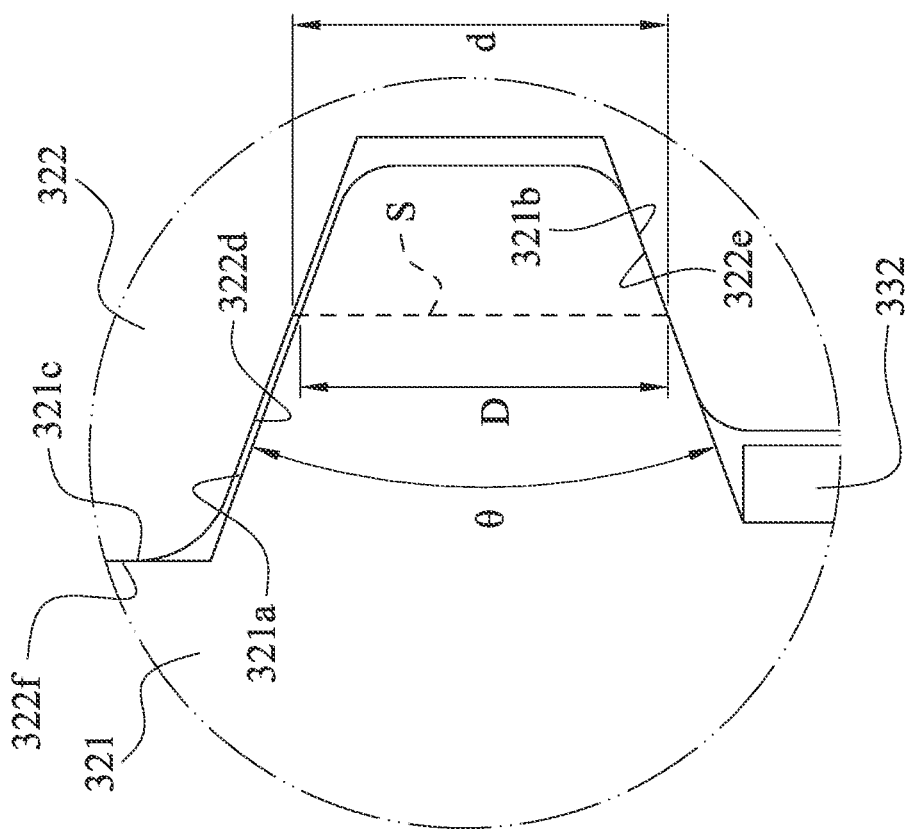
Fig. 3F
Fig. 3G

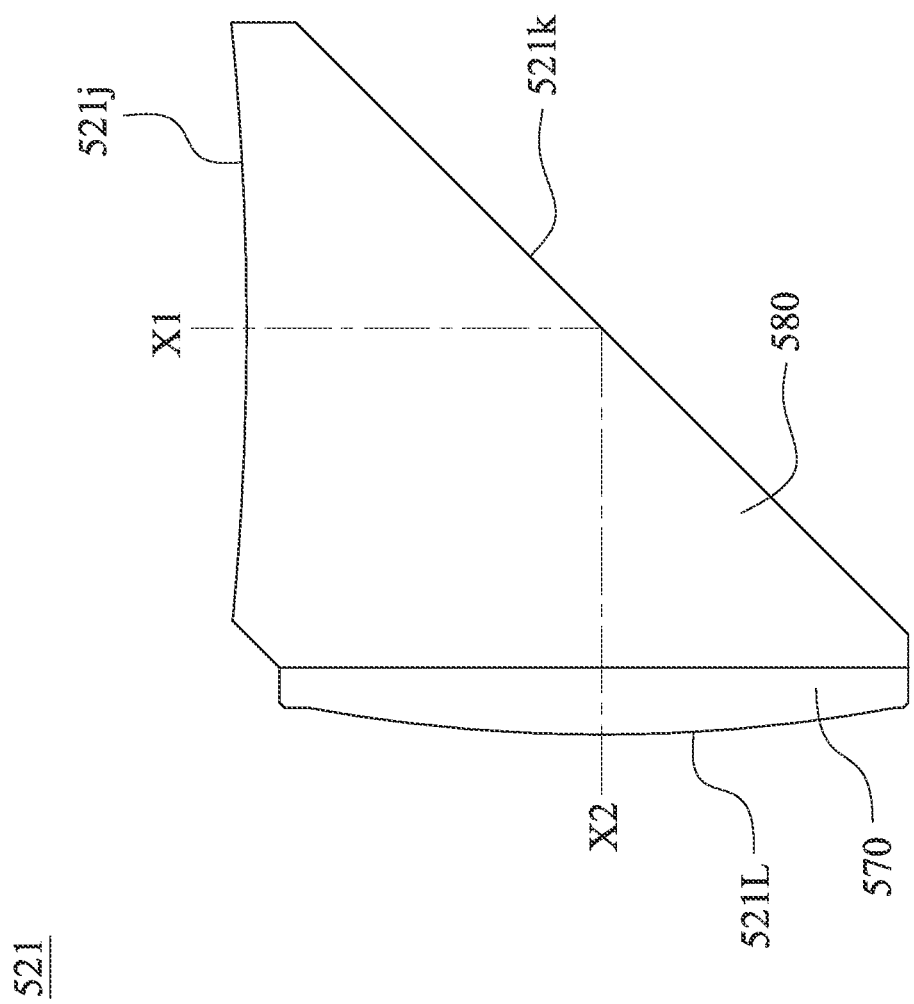

IMAGING LENS ASSEMBLY, IMAGE CAPTURING APPARATUS AND ELECTRONIC DEVICE

RELATED APPLICATIONS

This application claims priority to Taiwan Application Serial Number 110115808, filed Apr. 30, 2021, which is herein incorporated by reference.

BACKGROUND

Technical Field

The present disclosure relates to an imaging lens assembly and an image capturing apparatus. More particularly, the present disclosure relates to an imaging lens assembly and an image capturing apparatus applicable to portable electronic devices.

Description of Related Art

In recent years, portable electronic devices have developed rapidly. For example, intelligent electronic devices and tablets have been filled in the lives of modern people, and image capturing apparatuses and imaging lens assemblies thereof mounted on portable electronic devices have also prospered. However, as technology advances, the quality requirements of the imaging lens assemblies are becoming higher and higher.

In particular, the imaging lens assemblies are usually cooperated with lens elements with different refractive index to reduce the optical dispersion so as to promote the imaging quality. However, the lens elements with the different refractive index have different physical properties. That is, when the temperature or the humidity is changed, or when the imaging lens assemblies are disposed under the high temperature and the high humidity for the long time, the lens elements are easily expanded or contracted owing to the variation of the temperature or the absorption of the moisture, so that the imaging quality is influenced because of the relative displacement between the lens elements. Therefore, an imaging lens assembly, which can maintain the relative position between the lens elements under the variation of the temperature or the humidity, needs to be developed.

SUMMARY

According to one aspect of the present disclosure, an imaging lens assembly includes, in order from an object side to an image side, a first lens element and a second lens element, and an optical axis passes through the first lens element and the second lens element. The first lens element includes a first frustum surface and a second frustum surface. The first frustum surface is disposed on a side of the first lens element facing towards the second lens element, and the optical axis is an axis of the first frustum surface. The first frustum surface and the second frustum surface are disposed on the same side and coaxial, and the second frustum surface is closer to the optical axis than the first frustum surface to the optical axis. The second lens element includes a first corresponding frustum surface and a second corresponding frustum surface. The first corresponding frustum surface is corresponding to the first frustum surface. The second corresponding frustum surface is corresponding to the second frustum surface. When an environmental temperature is T1, the first frustum surface is directly contacted with the first corresponding frustum surface, the second frustum surface and the second corresponding frustum surface are disposed at intervals, and the first lens element is aligned to the second lens element; when the environmental temperature is T2, the second frustum surface is directly contacted with the second corresponding frustum surface, the first frustum surface and the first corresponding frustum surface are disposed at intervals, the first lens element is aligned to the second lens element, and the following condition is satisfied: $5\ K \leq |T1-T2| \leq 200\ K$.

According to one aspect of the present disclosure, an imaging lens assembly includes, in order from an object side to an image side, a first lens element and a second lens element. The first lens element includes a first frustum surface and a receiving surface. The first frustum surface is disposed on a side of the first lens element facing towards the second lens element, and the optical axis is an axis of the first frustum surface. The first frustum surface and the receiving surface are disposed on the same side, the receiving surface is substantially vertical to the optical axis, and the receiving surface is directly contacted with the second lens element. The second lens element includes a corresponding frustum surface. The corresponding frustum surface is disposed on a side of the second lens element facing towards the first lens element, and is corresponding to the first frustum surface. When an environmental temperature is between T1 and T2, a spacing between the first frustum surface and the corresponding frustum surface changes according to the environmental temperature and is recoverable, and the receiving surface and the second lens element keep being directly contacted; when the environmental temperature is T1, the first frustum surface and the corresponding frustum surface are disposed at intervals; when the environmental temperature is T2, the first frustum surface is directly contacted with the corresponding frustum surface, and the first lens element is aligned to the second lens element, the following condition is satisfied:

$$5\ K \leq |T1-T2| \leq 200\ K.$$

According to one aspect of the present disclosure, an imaging lens assembly includes, in order from an object side to an image side, a first lens element and a second lens element, and an optical axis passes through the first lens element and the second lens element. The first lens element includes a first frustum surface and a second frustum surface. The first frustum surface is disposed on a side of the first lens element facing towards the second lens element, and the optical axis is an axis of the first frustum surface. The first frustum surface and the second frustum surface are disposed on the same side and coaxial, and the second frustum surface is closer to the optical axis than the first frustum surface to the optical axis. The second lens element includes a first corresponding frustum surface and a second corresponding frustum surface. The first corresponding frustum surface is corresponding to the first frustum surface. The second corresponding frustum surface is corresponding to the second frustum surface. When a condition of the first frustum surface directly contacted with the first corresponding frustum surface is different from a condition of the second frustum surface directly contacted with the second corresponding frustum surface, on a cross section vertical to the optical axis and passing through the first frustum surface, the first corresponding frustum surface, the second frustum surface and the second corresponding frustum surface, a nearest distance between the first frustum surface and the second frustum surface is D, and a shortest distance between the first corresponding frustum surface and the second corresponding frustum surface is d, the following condition is satisfied: 0.2 μm≤|D−d|≤19.8 μm.

According to one aspect of the present disclosure, an image capturing apparatus includes at least one of the imaging lens assembly of any one of the aforementioned aspects.

According to one aspect of the present disclosure, an electronic device includes at least one of the image capturing apparatus of the aforementioned aspect and an image sensor, wherein the image sensor is disposed on an image surface of the imaging lens assembly.

BRIEF DESCRIPTION OF THE DRAWINGS

FIG. 2E is a partial enlarged view of the electronic device according to the 2nd example in FIG. 2D.

FIG. 2F is a partial enlarged view of the electronic device under the different environmental temperature according to the 2nd example in FIG. 2D.

FIG. 3F is a partial enlarged view of the electronic device according to the 3rd example in FIG. 3E.

FIG. 3G is a partial enlarged view of the electronic device under the different environmental temperature according to the 3rd example in FIG. 3E.

FIG. 5B is a schematic view of the lens element according to the 5th example in FIG. 5A.

DETAILED DESCRIPTION

Figure 1A:
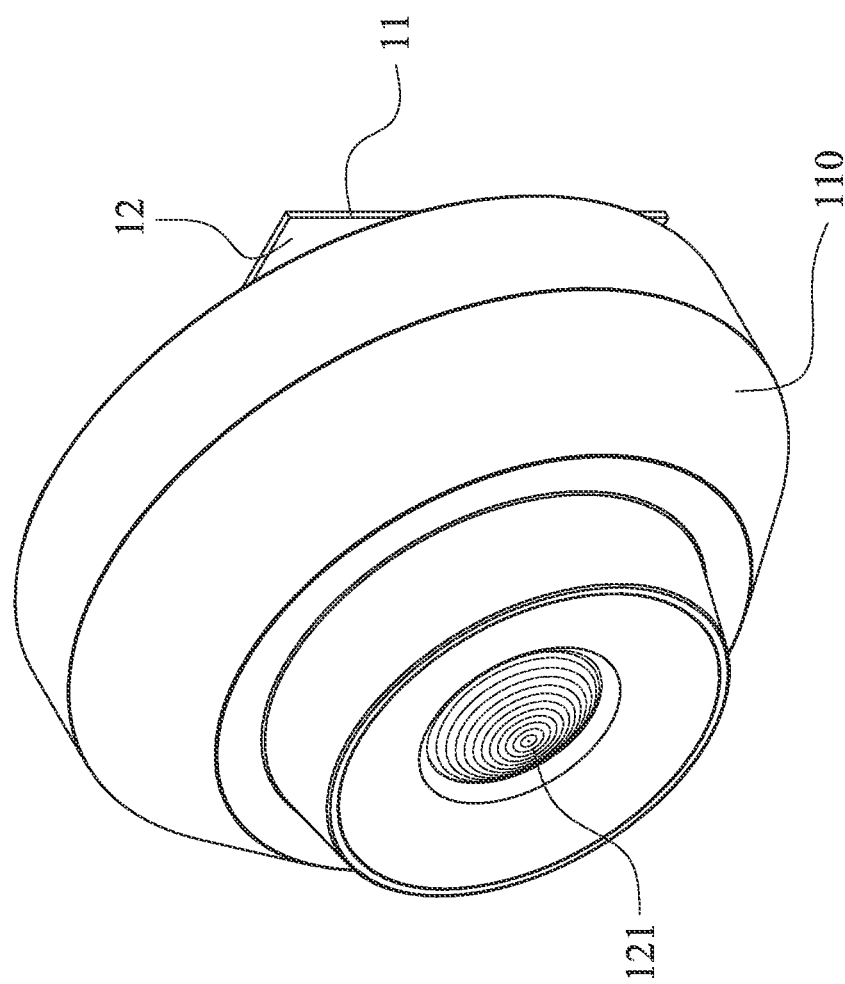
FIG. 1A is a three dimensional view of an electronic device according to the 1st example of the present disclosure.

The present disclosure provides an imaging lens assembly, which has an imaging light path, and the imaging light path includes an optical axis. The imaging lens assembly includes, in order from an object side to an image side, a first lens element and a second lens element, and the optical axis passes through the first lens element and the second lens element. The first lens element includes a first frustum surface, wherein the first frustum surface is disposed on a side of the first lens element facing towards the second lens element, and the optical axis is an axis of the first frustum surface. The second lens element includes a first corresponding frustum surface, wherein the first corresponding frustum surface is disposed on a side of the second lens element facing towards the first lens element, and the first corresponding frustum surface is corresponding to the first frustum surface. It should be mentioned that the first corresponding frustum surface can be a corresponding frustum surface, and the following description will be uniformly described as the first corresponding frustum surface.

By the aforementioned disposition, the alignment of the first lens element and the second lens element can be maintained under the variation of the environment, and the cooperation of the first lens element and the second lens element can be kept when the environment is restored, so that the resistance of the imaging lens assembly against the variation of the foreign factors can be enhanced. The aforementioned variation of the environment can be the variation of the temperature, the variation of the humidity or the long-term of high temperature and high humidity environment, and the aforementioned variation of the environment can also be the resistance against the impact of falling or the vibrating force.

The first lens element can further include a second frustum surface, wherein the first frustum surface and the second frustum surface are disposed on the same side and face towards the second lens element, the second frustum surface and the first frustum surface are coaxial, and the second frustum surface is closer to the optical axis than the first frustum surface to the optical axis. The second lens element can further include a second corresponding frustum surface corresponding to the second frustum surface. Therefore, the risk of the offset of the lens elements can be further reduced.

The first lens element can further include a receiving surface, wherein the receiving surface and the first frustum surface are disposed on the same side, the receiving surface is substantially vertical to the optical axis, and the receiving surface faces towards and is directly contacted with the second lens element. The spacing between the first lens element and the second lens element on the optical axis can be kept by the receiving surface, so as to avoid the deformation of the first lens element and the second lens element by the first frustum surface, the second frustum surface, the first corresponding frustum surface and the second corresponding frustum surface under pressure.

At least one of the first lens element and the second lens element can further include an outside surface, wherein the outside surface is farther from the optical axis than the first frustum surface, the first corresponding frustum surface, the second frustum surface or the second corresponding frustum surface from the optical axis, and a light blocking layer of the imaging lens assembly covers at least one portion of the outside surface. The light blocking layer can be a colloid or a coating with the light-blocking property or the light-absorbing property, and the light blocking layer can be configured to block the non-imaging light to enter the image sensor. Therefore, the glare can be reduced.

The imaging lens assembly can further include a lens carrier accommodating the first lens element and the second lens element, and the lens carrier includes an inside surface, wherein the inside surface faces towards and surrounds the first lens element and the second lens element, and one of the first lens element and the second lens element and the lens carrier are disposed at intervals. Therefore, the squeeze deformation of the lens elements caused by the radial pressure of expansion and contraction of the lens carrier can be avoided to further enhance the yield rate of the finished product.

One of the first lens element and the second lens element can include at least one reduction surface reducing from a side of one of the first lens element and the second lens element away from the optical axis towards a direction close to the optical axis. In particular, the reduction surface and the first frustum surface of the first lens element are intersected, or the reduction surface and the first corresponding frustum surface of the second lens element are intersected, hence, the first frustum surface or the first corresponding frustum surface is C-shaped.

It should be mentioned that the first frustum surface and the first corresponding frustum surface can incompletely surround the optical axis, and the reduction surface can be a mark of the alignment of the first lens element or the second lens element vertical to the optical axis so as to enhance the assembling efficiency. Moreover, the reduction surface can be formed via the transfer mold, or the reduction surface can be a cross-section of the secondary processing of the first lens element or the second lens element after forming, and the reduction surface can further include a nozzle of the injection molding. The noncircular projection of the first lens element or the second lens element vertical to the optical axis can be obtained via the reduction surface, so as to reduce the dimension of the imaging lens assembly vertical to the optical axis.

One of the first lens element and the second lens element can be a reflective lens element, wherein the reflective lens element along the imaging light path includes an incident surface, at least one reflective surface and an exit surface, and the imaging light path is folded on the reflective surface towards a mirror direction. At least one of the incident surface and the exit surface can include an axisymmetric surface, the imaging light path passes through the axisymmetric surface, and the axisymmetric surface and the first frustum surface are coaxially disposed on the optical axis. The axisymmetric surface can be sphere, aspherical surface or freeform surface. Therefore, the reflective lens element can be simultaneously configured to fold the imaging light path and change the image field so as to reduce the optical components and enhance the assembling efficiency.

The incident surface, the reflective surface and the exit surface of the reflective lens element can be integrally formed via a plastic injection. Further, the reflective surface can further include a reflective layer, wherein the reflective layer can be a metal layer or a coating with high refractive index, but the present disclosure is not limited thereto. Therefore, the reflectivity of the reflective surface can be enhanced.

The reflective lens element can further include a reflective surface element and an optical surface element, the reflective surface is formed on the reflective surface element, and at least one of the incident surface and the exit surface is formed on the optical surface element. Furthermore, the reflective lens element can further include a glue bonded the reflective surface element and the optical surface element. Therefore, the interlayer of the dust can be avoided during fixing the relative position between the reflective surface element and the optical surface element, so that the glare can be reduced.

When an environmental temperature is T1, the first frustum surface is directly contacted with the first corresponding frustum surface, the second frustum surface and the second corresponding frustum surface are disposed at intervals, and the first lens element is aligned to the second lens element, or the first frustum surface and the first corresponding frustum surface are disposed at intervals; when the environmental temperature is T2, the second frustum surface is directly contacted with the second corresponding frustum surface, the first frustum surface and the first corresponding frustum surface are disposed at intervals, the first lens element is aligned to the second lens element, or the first frustum surface is directly contacted with the first corresponding frustum surface; when an environmental temperature is between T1 and T2, a spacing between the first frustum surface and the first corresponding frustum surface changes according to the environmental temperature and is recoverable, and the receiving surface and the second lens element keep being directly contacted, the following condition can be satisfied: 5 K≤|T1−T2|≤200 K.

In particular, the risk of the offset of the lens elements of the imaging lens assembly can be reduced by the secondary alignment of the first lens element and the second lens element under the different temperature. Further, the cooperation between the first lens element and the second lens element can be avoided being interfered and affected by the direct contact of the first frustum surface and the first corresponding frustum surface or the direct contact of the second frustum surface and the second corresponding frustum surface. Further, the following condition can be satisfied: 10 K≤|T1−T2|≤100 K. Further, the following condition can be satisfied: 15 K≤|T1−T2|≤50 K.

When a condition of the first frustum surface directly contacted with the first corresponding frustum surface is different from a condition of the second frustum surface directly contacted with the second corresponding frustum surface (that is, the first frustum surface is directly contacted with the first corresponding frustum surface, and the second frustum surface and the second corresponding frustum surface are disposed at intervals, or the second frustum surface is directly contacted with the second corresponding frustum surface, and the first frustum surface and the first corresponding frustum surface are disposed at intervals), on a cross section vertical to the optical axis and passing through the first frustum surface, the first corresponding frustum surface, the second frustum surface and the second corresponding frustum surface, a nearest distance between the first frustum surface and the second frustum surface is D, and a shortest distance between the first corresponding frustum surface and the second corresponding frustum surface is d, the following condition can be satisfied: 0.2 μm≤|D−d|≤19.8 μm. By controlling the aforementioned distances (that are, the nearest distance and the shortest distance), the superior design can be obtained according to the practical application. Further, the following condition can be satisfied: 1.0 μm≤|D−d|≤9.8 μm. Further, the following condition can be satisfied: 2.0 μm≤|D−d|≤3.5 μm.

When the first lens element and the second lens element can have different coefficients of linear thermal expansion, the coefficient of linear thermal expansion of the first lens element is E1, and the coefficient of linear thermal expansion of the second lens element is E2, the following condition can be satisfied: 0.005≤|(E1−E2)/(E1+E2)|≤0.95. When the coefficient of linear thermal expansion of the first lens element and the coefficient of linear thermal expansion of the second lens element are satisfied the aforementioned range, the positions of the first lens element and the second lens element can be maintained during the variation of the temperature. Moreover, both of the first lens element and the second lens element can be plastic lens elements or glass lens elements, but the present disclosure is not limited thereto. Further, the following condition can be satisfied: 0.01≤|(E1−E2)/(E1+E2)|≤0.7. Further, the following condition can be satisfied: 0.02≤|(E1−E2)/(E1+E2)|≤0.3.

In particular, according to the present disclosure, both of the coefficient of linear thermal expansion of the first lens element and the coefficient of linear thermal expansion of the second lens element are based on the experimental value under 293.1 K (that is, 20° C.). Further, both of the coefficient of linear thermal expansion of the first lens element and the coefficient of linear thermal expansion of the second lens element are controllable, the variation of the thermal expansion can be regarded as the linear variation (that is, the coefficient of linear thermal expansion can be regarded as the fixed value), and the temperature of the embodiments is 293.1 K when the temperature is not mentioned.

When an angle between the first frustum surface and the second frustum surface on a cross section parallel to the optical axis is θ, the following condition can be satisfied: 10 degrees≤θ≤90 degrees. Therefore, the force direction of the contact between the first lens element and the second lens element can be controlled to avoid the curve during the thermal expansion of the first lens element and the second lens element. Further, the following condition can be satisfied: 15 degrees≤θ≤60 degrees.

When the environmental temperature is a random temperature between T1 and T2, on a cross section vertical to the optical axis and passing through the first frustum surface and the first corresponding frustum surface, a shortest distance between the first frustum surface and the first corresponding frustum surface is D', and D' is not larger than 19.8 μm; when the environmental temperature is between T1 and T2, a maximum shortest distance between the first frustum surface and the first corresponding frustum surface is D'max, and D'max is not less than 0.2 μm.

Each of the aforementioned features of the imaging lens assembly can be utilized in various combinations for achieving the corresponding effects.

The present disclosure provides an image capturing apparatus, which includes at least one of the aforementioned imaging lens assembly.

The present disclosure provides an electronic device, which includes at least one of the aforementioned image capturing apparatus and an image sensor, wherein the image sensor is disposed on an image surface of the imaging lens assembly.

According to the aforementioned embodiment, specific examples are provided, and illustrated via figures.

1st Example

Figure 1B:
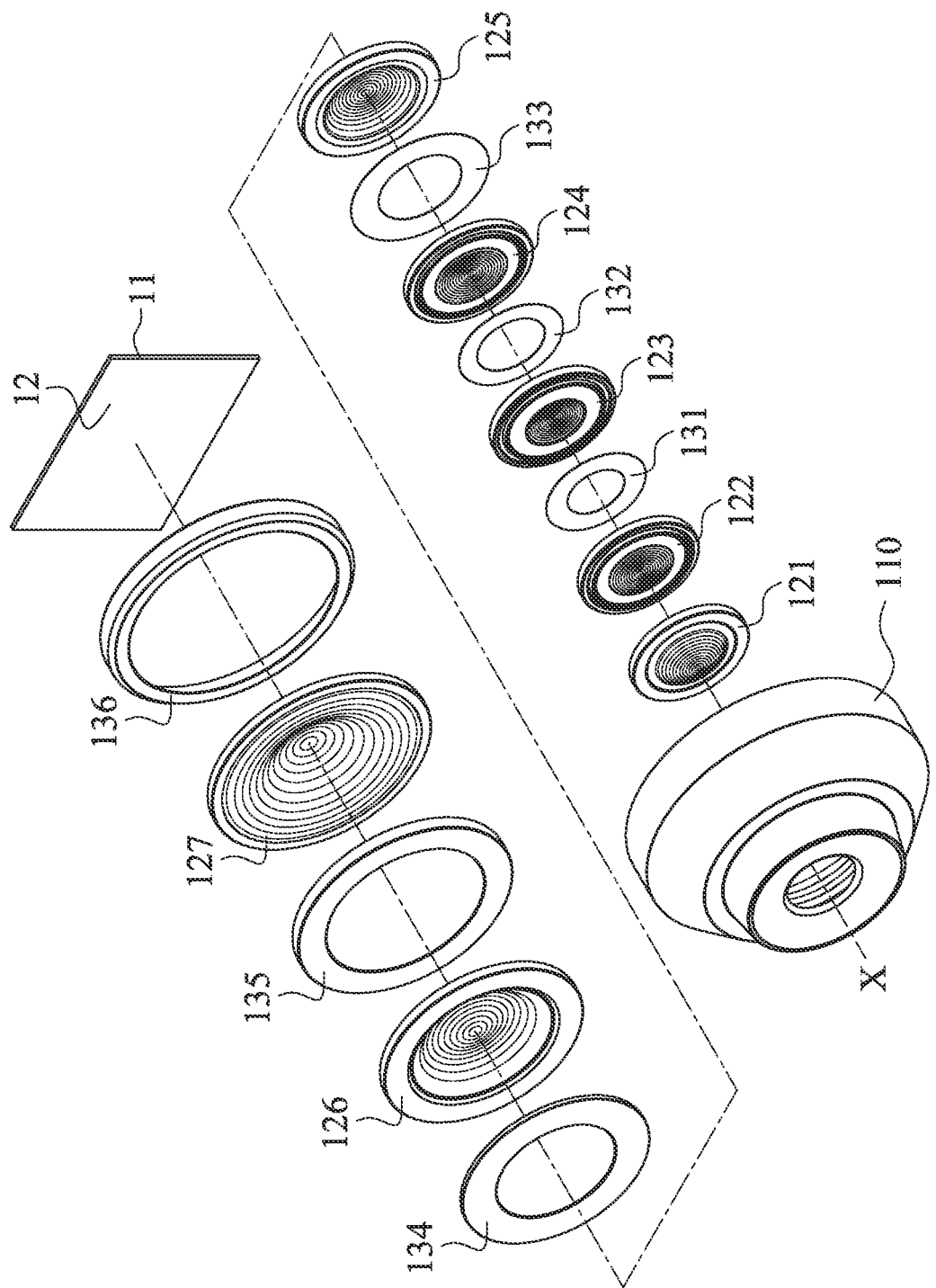
FIG. 1B is an exploded view of the electronic device according to the 1st example in FIG. 1A.
Figure 1C:
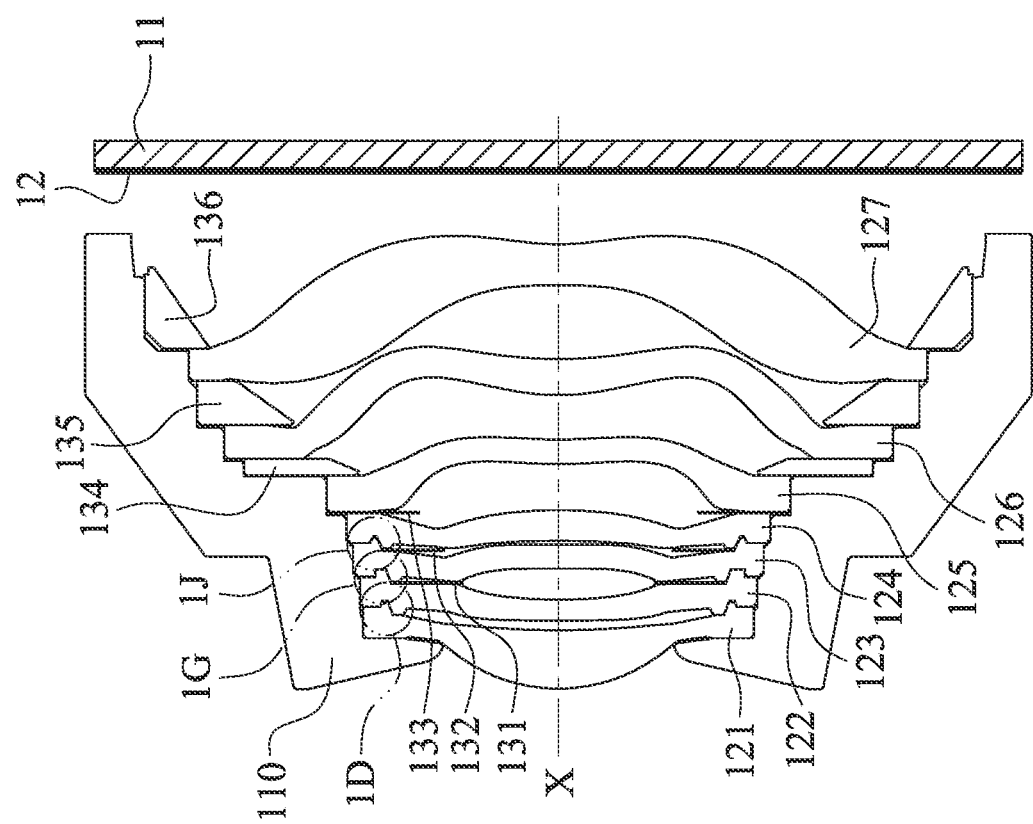
FIG. 1C is a schematic view of the electronic device according to the 1st example in FIG. 1A.

FIG. 1A is a three dimensional view of an electronic device 10 according to the 1st example of the present disclosure. FIG. 1B is an exploded view of the electronic device 10 according to the 1st example in FIG. 1A. FIG. 1C is a schematic view of the electronic device 10 according to the 1st example in FIG. 1A. In FIGS. 1A to 1O, the electronic device 10 includes at least one image capturing apparatus (its reference numeral is omitted) and an image sensor 11, wherein the image capturing apparatus includes at least one imaging lens assembly (its reference numeral is omitted), and the image sensor 11 is disposed on an image surface 12 of the imaging lens assembly.

Moreover, the imaging lens assembly has an imaging light path (its reference numeral is omitted), and the imaging light path includes an optical axis X. The imaging lens assembly includes, in order from an object side to an image side, a lens carrier 110, a lens element 121, a lens element 122, a light blocking sheet 131, a lens element 123, a light blocking sheet 132, a lens element 124, a light blocking sheet 133, a lens element 125, a spacer 134, a lens element 126, a spacer 135, a lens element 127 and a retainer 136, and the lens carrier 110 accommodates the lens elements 121, 122, 123, 124, 125, 126, 127, the light blocking sheets 131, 132, 133, the spacers 134, 135 and the retainer 136. By the light blocking sheets 131, 132, 133 disposed between the lens elements 122, 123, between the lens elements 123, 124 and between the lens elements 124, 125, respectively, the non-imaging light can be blocked to enter the image sensor 11 to form the flare. It should be mentioned that the lens elements 121, 122, 123, 124, 125, 126, 127 can be plastic lens elements or glass lens elements, and numbers, structures, surface shapes and so on of the lens elements can be disposed according to different imaging demand, other optical elements can be disposed on demands, and the present disclosure is not limited thereto.

In FIG. 1C, each adjacent two of the lens elements (that is, the lens elements 121, 122, 123, 124) of the imaging lens assembly include annular corresponding structures (their reference numerals are omitted) configured to solve the problem of offset because of the variation of the environmental factors (that is, temperature, humidity). The annular corresponding structures between the lens elements 121, 122, the annular corresponding structures between lens elements 122, 123 and the annular corresponding structures between the lens elements 123, 124 are illustrated as followed.

Figure 1D:
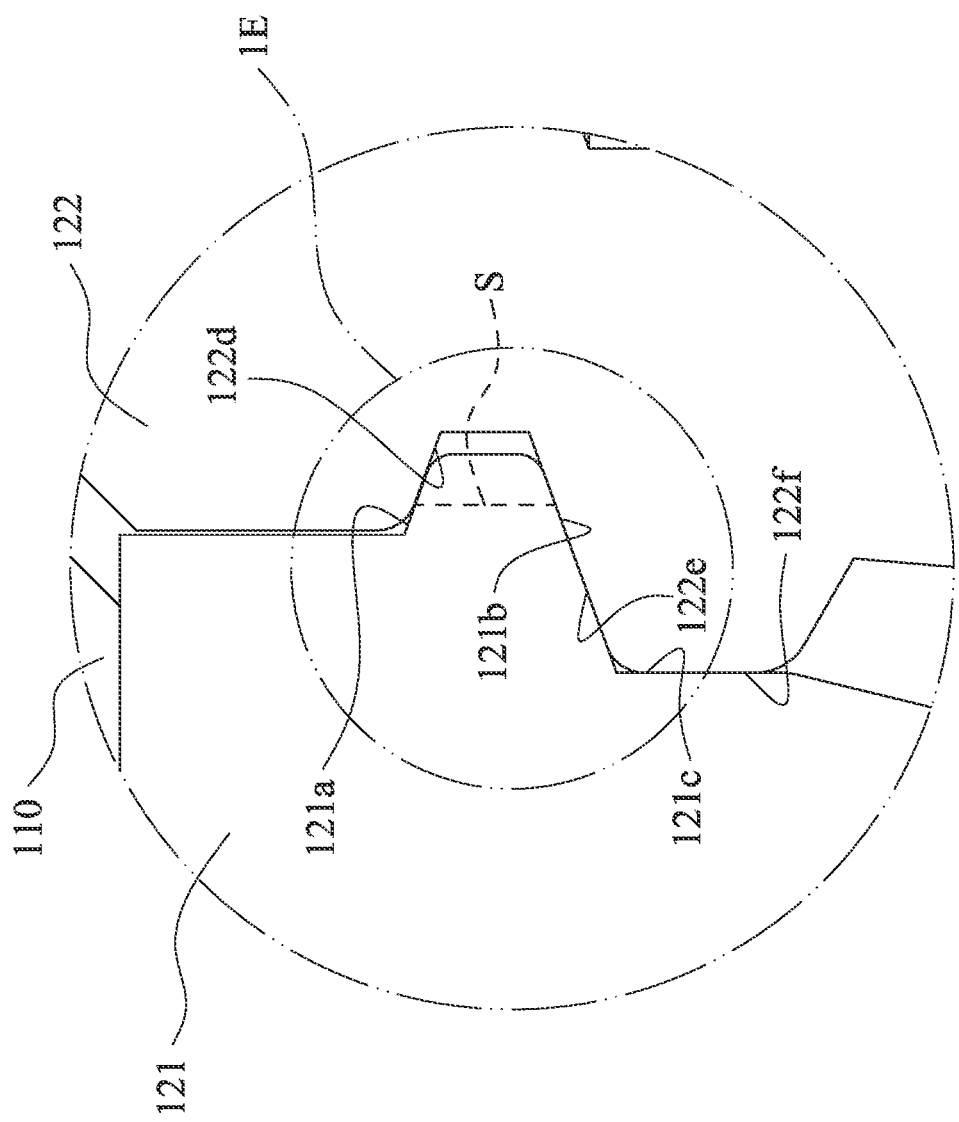
FIG. 1D is a partial enlarged view of the electronic device according to the 1st example in FIG. 1C.
Figure 1E:
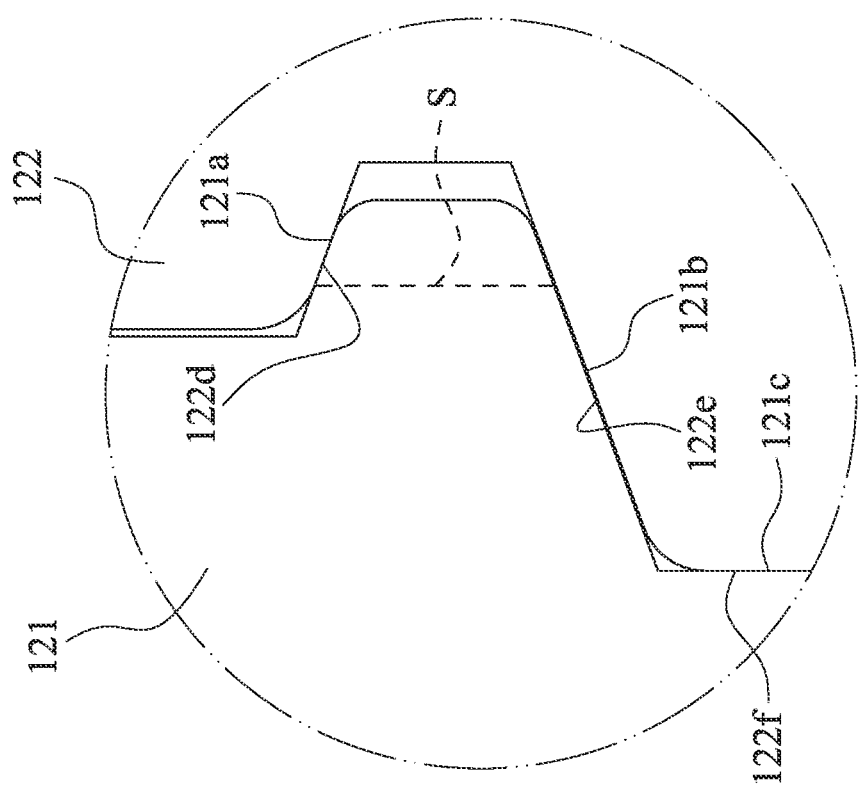
FIG. 1E is a partial enlarged view of the electronic device according to the 1st example in FIG. 1D.
Figure 1F:
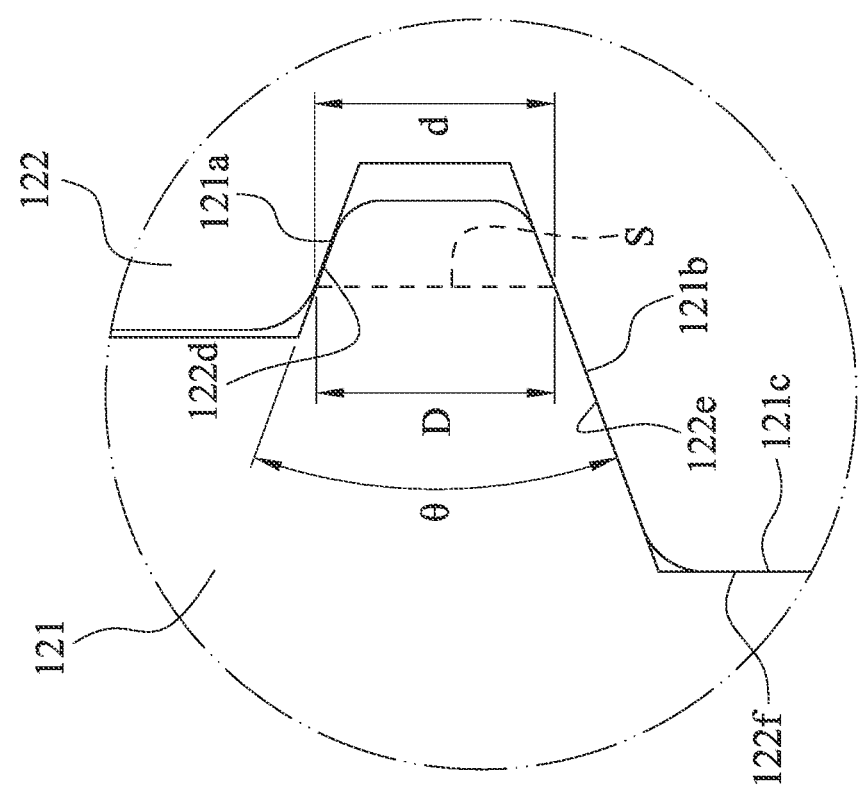
FIG. 1F is a partial enlarged view of the electronic device under the different environmental temperature according to the 1st example in FIG. 1D.

FIG. 1D is a partial enlarged view of the electronic device 10 according to the 1st example in FIG. 1C. FIG. 1E is a partial enlarged view of the electronic device 10 according to the 1st example in FIG. 1D. FIG. 1F is a partial enlarged view of the electronic device 10 under the different environmental temperature according to the 1st example in FIG. 1D. In FIGS. 1C to 1F, the lens elements 121, 122 are relatively located on the object side and the image side of the imaging lens assembly, and the optical axis X passes through the lens elements 121, 122, wherein the lens element 121 can be a first lens element, and the lens element 122 can be a second lens element.

The first lens element includes a first frustum surface 121a, a second frustum surface 121b and a receiving surface 121c, wherein the first frustum surface 121a is disposed on a side of the first lens element facing towards the second lens element, and the optical axis X is an axis of the first frustum surface 121a, the second frustum surface 121b and the first frustum surface 121a are disposed on the same side and face towards the second lens element, the second frustum surface 121b and the first frustum surface 121a are coaxial, and the second frustum surface 121b is closer to the optical axis X than the first frustum surface 121a to the optical axis X; the receiving surface 121c faces towards the second lens element, the receiving surface 121c is substantially vertical to the optical axis X, the receiving surface 121c, the first frustum surface 121a and the second frustum surface 121b are disposed on the same side, and the receiving surface 121c is directly contacted with the second lens element.

The second lens element includes a first corresponding frustum surface 122d, a second corresponding frustum surface 122e and a corresponding receiving surface 122f, wherein the first corresponding frustum surface 122d is disposed on a side of the second lens element facing towards the first lens element, and the first corresponding frustum surface 122d is corresponding to the first frustum surface 121a, the second corresponding frustum surface 122e is corresponding to the second frustum surface 121b, the corresponding receiving surface 122f is corresponding to the receiving surface 121c, and the corresponding receiving surface 122f, the first corresponding frustum surface 122d and the second corresponding frustum surface 122e are disposed on the same side.

It should be mentioned that the first frustum surface 121a, the second frustum surface 121b and the receiving surface 121c are the annular corresponding structure of the first lens element, the first corresponding frustum surface 122d, the second corresponding frustum surface 122e and the corresponding receiving surface 122f are the annular corresponding structure of the second lens element. The first lens element is directly contacted with and aligned to the second lens element via the annular corresponding structures.

In FIG. 1F, when an environmental temperature is T1, the first frustum surface 121a is directly contacted with the first corresponding frustum surface 122d, the second frustum surface 121b and the second corresponding frustum surface 122e are disposed at intervals, and the first lens element is aligned to the second lens element; in FIGS. 1D and 1E, when the environmental temperature is T2, the second frustum surface 121b is directly contacted with the second corresponding frustum surface 122e, the first frustum surface 121a and the first corresponding frustum surface 122d are disposed at intervals, and the first lens element is aligned to the second lens element. Furthermore, when the environmental temperature is between T1 and T2, a spacing between the first frustum surface 121a and the first corresponding frustum surface 122d changes according to the environmental temperature and is recoverable, and the receiving surface 121c and the second lens element keep being directly contacted, wherein the spacing between the first lens element and the second lens element on the optical axis X can be kept by the receiving surface 121c, so as to avoid the deformation of the first lens element and the second lens element by the first frustum surface 121a, the second frustum surface 121b, the first corresponding frustum surface 122d and the second corresponding frustum surface 122e under pressure. In FIGS. 1D to 1F, T1 is 343.1 K, and T2 is 293.1 K. It should be mentioned that the environmental temperature is the environmental temperature outside the imaging lens assembly when the inner temperature of the imaging lens assembly is under the steady state.

In particular, the risk of the offset of the lens elements of the imaging lens assembly can be reduced by the secondary alignment of the first lens element and the second lens element under the different temperature. Further, the cooperation between the first lens element and the second lens element can be avoided being interfered and affected by the direct contact of the first frustum surface 121a and the first corresponding frustum surface 122d or the direct contact of the second frustum surface 121b and the second corresponding frustum surface 122e.

In FIG. 1E, on a cross section S vertical to the optical axis X and passing through the first frustum surface 121a, the first corresponding frustum surface 122d, the second frustum surface 121b and the second corresponding frustum surface 122e, a nearest distance between the first frustum surface 121a and the second frustum surface 121b is D, a shortest distance between the first corresponding frustum surface 122d and the second corresponding frustum surface 122e is d, a coefficient of linear thermal expansion of the first lens element is E1, a coefficient of linear thermal expansion of the second lens element is E2, and an angle between the first frustum surface 121a and the second frustum surface 121b on a cross section (its reference numeral is omitted) parallel to the optical axis X is θ, the following conditions of the Table 1 are satisfied.

TABLE 1

| 1st example-FIG. 1E | | | |
|---|---|---|---|
| D (μm) | 127 | E1 (ppm/K) | 93 |
| d (μm) | 128 | E2 (ppm/K) | 86 |
| \|D − d\| (μm) | 1 | \|(E1 − E2)/(E1 + E2)\| | 0.039 |
| θ (degree) | 40 | | |

Moreover, when the environmental temperature is a random temperature between T1 and T2, on the cross section S vertical to the optical axis X and passing through the first frustum surface 121a and the corresponding frustum surface (that is, the first corresponding frustum surface 122d), a shortest distance between the first frustum surface 121a and the corresponding frustum surface is D', and D' is not larger than 19.8 μm; when the environmental temperature is between T1 and T2, a maximum shortest distance between the first frustum surface 121a and the corresponding frustum surface is D'max, and D'max is not less than 0.2 μm.

It should be mentioned that the first lens element and the second lens element have different coefficients of linear thermal expansion, and the first lens element and the second lens element can further have different hygroscopic expansion coefficients.

Figure 1G:
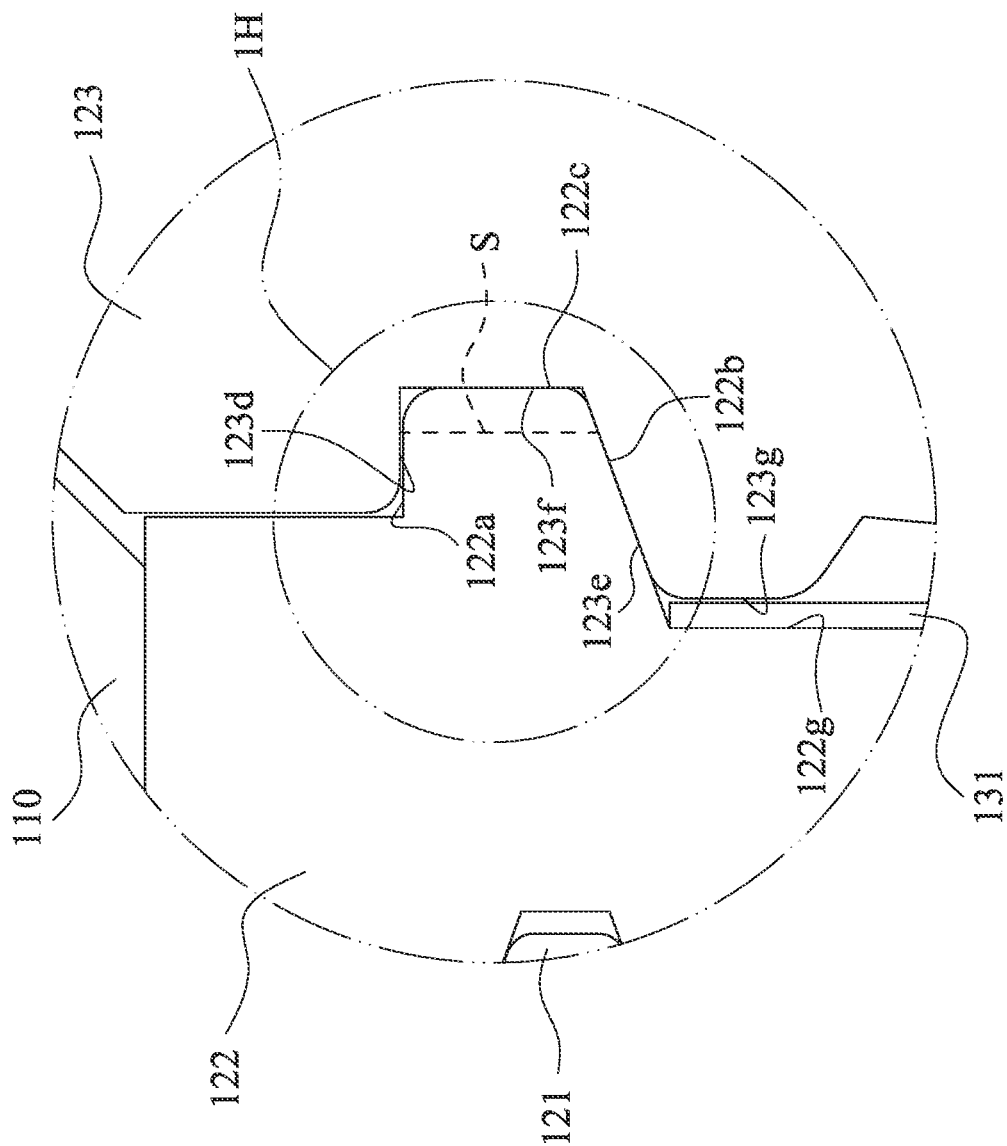
FIG. 1G is another partial enlarged view of the electronic device according to the 1st example in FIG. 1C.
Figure 1H:
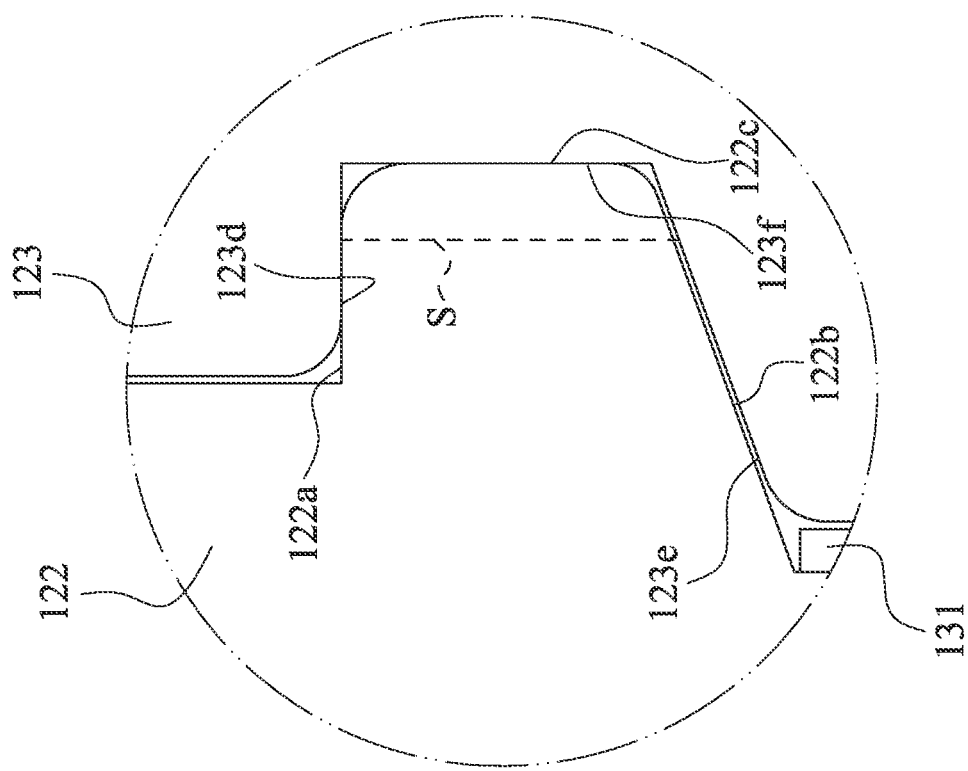
FIG. 1H is a partial enlarged view of the electronic device according to the 1st example in FIG. 1G.
Figure 1I:
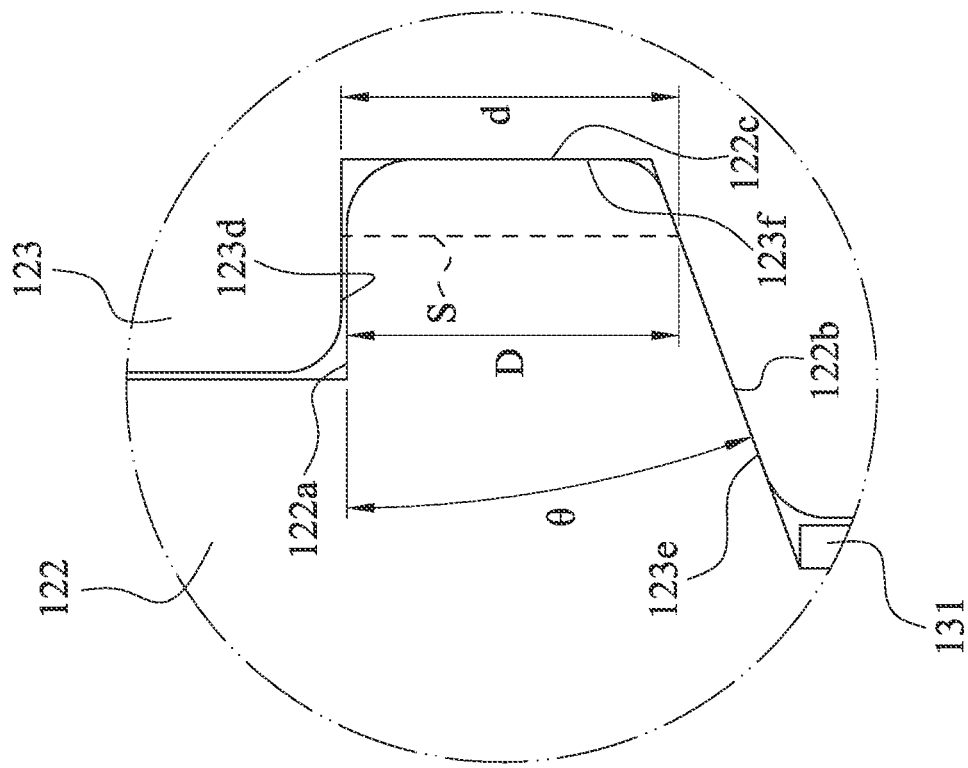
FIG. 1I is a partial enlarged view of the electronic device under the different environmental temperature according to the 1st example in FIG. 1G.

FIG. 1G is another partial enlarged view of the electronic device 10 according to the 1st example in FIG. 1C. FIG. 1H is a partial enlarged view of the electronic device 10 according to the 1st example in FIG. 1G. FIG. 1I is a partial enlarged view of the electronic device 10 under the different environmental temperature according to the 1st example in FIG. 1G. In FIGS. 1C and 1G to 1I, the lens elements 122, 123 are relatively located on the object side and the image side of the imaging lens assembly, and the optical axis X passes through the lens elements 122, 123, wherein the lens element 122 can be the first lens element, and the lens element 123 can be the second lens element.

The first lens element includes a first frustum surface 122a, a second frustum surface 122b, a receiving surface 122c and a connecting surface 122g, wherein the first frustum surface 122a is disposed on a side of the first lens element facing towards the second lens element, and the optical axis X is an axis of the first frustum surface 122a; the second frustum surface 122b and the first frustum surface 122a are disposed on the same side and face towards the second lens element, the second frustum surface 122b and the first frustum surface 122a are coaxial, the second frustum surface 122b is closer to the optical axis X than the first frustum surface 122a to the optical axis X, and the second frustum surface 122b is gradually close to the first frustum surface 122a; the receiving surface 122c faces towards the second lens element, the receiving surface 122c is substantially vertical to the optical axis X, the receiving surface 122c, the first frustum surface 122a and the second frustum surface 122b are disposed on the same side, and the receiving surface 122c is directly contacted with the second lens element; the connecting surface 122g extends towards and is close towards the optical axis X from a side of the second frustum surface 122b close to the optical axis X, the connecting surface 122g is connected to optical surfaces (their reference numerals are omitted) of the first lens element, and the optical axis X passes through the optical surfaces.

The second lens element includes a first corresponding frustum surface 123d, a second corresponding frustum surface 123e, a corresponding receiving surface 123f and a connecting surface 123g, wherein the first corresponding frustum surface 123d is disposed on a side of the second lens element facing towards the first lens element, the first corresponding frustum surface 123d is corresponding to the first frustum surface 122a, and the first frustum surface 122a and the first corresponding frustum surface 123d are substantially parallel to the optical axis X; the second corresponding frustum surface 123e is corresponding to the second frustum surface 122b, and the second corresponding frustum surface 123e is gradually close to the first corresponding frustum surface 123d; the corresponding receiving surface 123f is corresponding to the receiving surface 122c, and the corresponding receiving surface 123f, the first corresponding frustum surface 123d and the second corresponding frustum surface 123e are disposed on the same side; the connecting surface 123g extends towards and is close towards the optical axis X from a side of the second corresponding frustum surface 123e close to the optical axis X, the connecting surface 123g is connected to optical surfaces (their reference numerals are omitted) of the second lens element, the optical axis X passes through the optical surfaces, and the light blocking sheet 131 is disposed between the connecting surfaces 122g, 123g.

It should be mentioned that the first frustum surface 122a, the second frustum surface 122b and the receiving surface 122c are the annular corresponding structure of the first lens element, the first corresponding frustum surface 123d, the second corresponding frustum surface 123e and the corresponding receiving surface 123f are the annular corresponding structure of the second lens element. The first lens element is directly contacted with and aligned to the second lens element via the annular corresponding structures.

In FIG. 1I, when an environmental temperature is T1, the first frustum surface 122a is directly contacted with the first corresponding frustum surface 123d, the second frustum surface 122b and the second corresponding frustum surface 123e are disposed at intervals, and the first lens element is aligned to the second lens element; in FIGS. 1G and 1H, when the environmental temperature is T2, the second frustum surface 122b is directly contacted with the second corresponding frustum surface 123e, the first frustum surface 122a and the first corresponding frustum surface 123d are disposed at intervals, and the first lens element is aligned to the second lens element. Furthermore, when the environmental temperature is between T1 and T2, a spacing between the first frustum surface 122a and the first corresponding frustum surface 123d changes according to the environmental temperature and is recoverable, and the receiving surface 122c and the second lens element keep being directly contacted, wherein the spacing between the first lens element and the second lens element on the optical axis X can be kept by the receiving surface 122c, so as to avoid the deformation of the first lens element and the second lens element by the first frustum surface 122a, the second frustum surface 122b, the first corresponding frustum surface 123d and the second corresponding frustum surface 123e under pressure. In FIGS. 1G to 1I, T1 is 343.1 K, and T2 is 293.1 K.

In particular, the risk of the offset of the lens elements of the imaging lens assembly can be reduced by the secondary alignment of the first lens element and the second lens element under the different temperature. Further, the cooperation between the first lens element and the second lens element can be avoided being interfered and affected by the direct contact of the first frustum surface 122a and the first corresponding frustum surface 123d or the direct contact of the second frustum surface 122b and the second corresponding frustum surface 123e.

In FIG. 1H, when on a cross section S vertical to the optical axis X and passing through the first frustum surface 122a, the first corresponding frustum surface 123d, the second frustum surface 122b and the second corresponding frustum surface 123e, a nearest distance between the first frustum surface 122a and the second frustum surface 122b is D, a shortest distance between the first corresponding frustum surface 123d and the second corresponding frustum surface 123e is d, a coefficient of linear thermal expansion of the first lens element is E1, a coefficient of linear thermal expansion of the second lens element is E2, and an angle between the first frustum surface 122a and the second frustum surface 122b on a cross section (its reference numeral is omitted) parallel to the optical axis X is θ, the following conditions of the Table 2 are satisfied.

TABLE 2

| 1st example-FIG. 1H | | | |
|---|---|---|---|
| D (μm) | 177 | E1 (ppm/K) | 86 |
| d (μm) | 180 | E2 (ppm/K) | 61 |
| \|D − d\| (μm) | 3 | \|(E1 − E2)/(E1 + E2)\| | 0.170 |
| θ (degree) | 20 | | |

When the environmental temperature is a random temperature between T1 and T2, on the cross section S vertical to the optical axis X and passing through the first frustum surface 122a and the corresponding frustum surface (that is, the first corresponding frustum surface 123d), a shortest distance between the first frustum surface 122a and the corresponding frustum surface is D', and D' is not larger than 19.8 μm; when the environmental temperature is between T1 and T2, a maximum shortest distance between the first frustum surface 122a and the corresponding frustum surface is D'max, and D'max is not less than 0.2 μm.

It should be mentioned that the first lens element and the second lens element have different coefficients of linear thermal expansion, and the first lens element and the second lens element can further have different hygroscopic expansion coefficients.

Figure 1J:
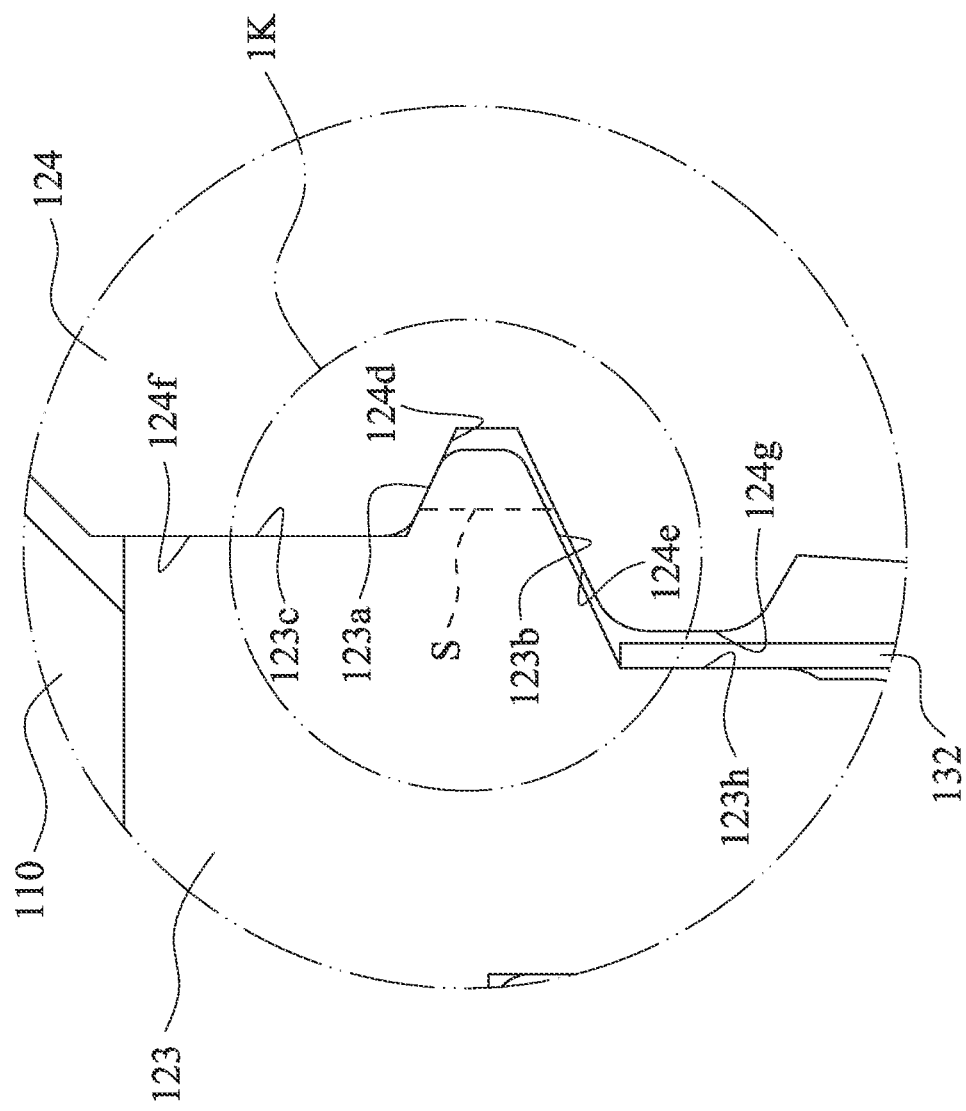
FIG. 1J is another partial enlarged view of the electronic device according to the 1st example in FIG. 1C.
Figure 1K:
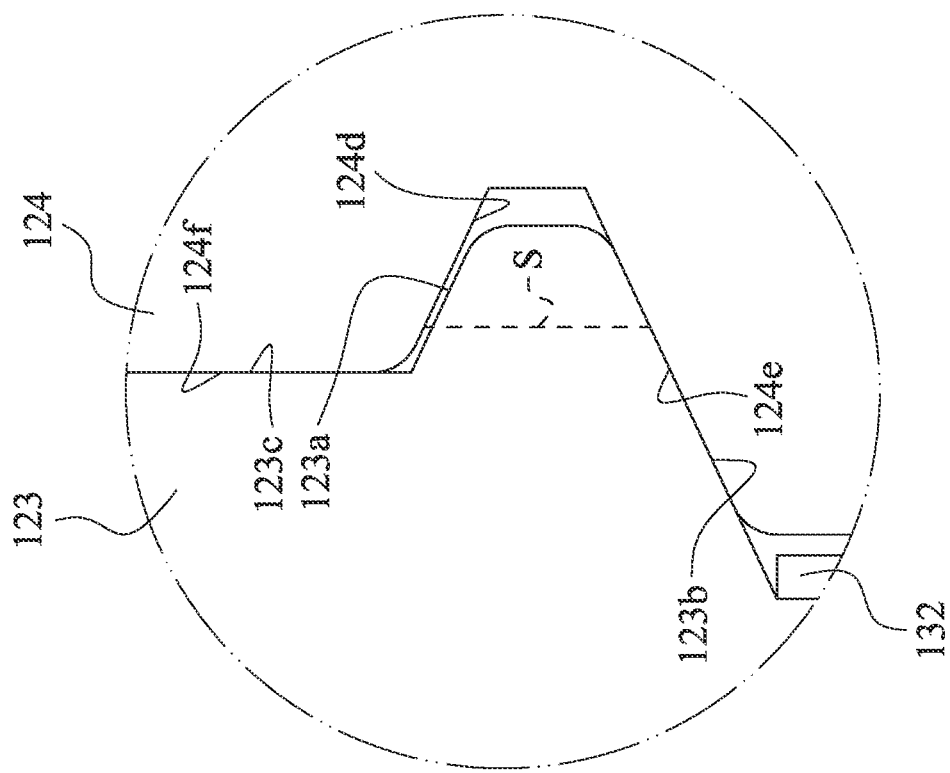
FIG. 1K is a partial enlarged view of the electronic device according to the 1st example in FIG. 1J.
Figure 1L:
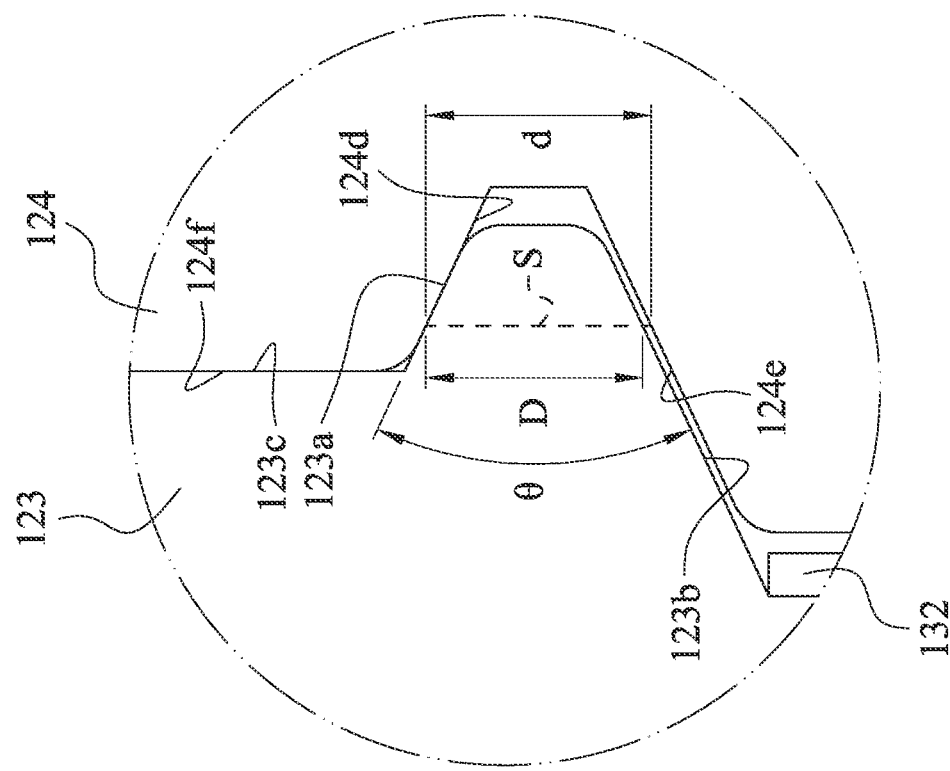
FIG. 1L is a partial enlarged view of the electronic device under the different environmental temperature according to the 1st example in FIG. 1J.

FIG. 1J is another partial enlarged view of the electronic device 10 according to the 1st example in FIG. 1C. FIG. 1K is a partial enlarged view of the electronic device 10 according to the 1st example in FIG. 1J. FIG. 1L is a partial enlarged view of the electronic device 10 under the different environmental temperature according to the 1st example in FIG. 1J. In FIGS. 1C and 1J to 1L, the lens elements 123, 124 are relatively located on the object side and the image side of the imaging lens assembly, and the optical axis X passes through the lens elements 123, 124, wherein the lens element 123 can be the first lens element, and the lens element 124 can be the second lens element.

The first lens element includes a first frustum surface 123a, a second frustum surface 123b, a receiving surface 123c and a connecting surface 123h, wherein the first frustum surface 123a is disposed on a side of the first lens element facing towards the second lens element, and the optical axis X is an axis of the first frustum surface 123a; the second frustum surface 123b and the first frustum surface 123a are disposed on the same side and face towards the second lens element, the second frustum surface 123b and the first frustum surface 123a are coaxial, and the second frustum surface 123b is closer to the optical axis X than the first frustum surface 123a to the optical axis X; the receiving surface 123c faces towards the second lens element, the receiving surface 123c is substantially vertical to the optical axis X, the receiving surface 123c, the first frustum surface 123a and the second frustum surface 123b are disposed on the same side, and the receiving surface 123c is directly contacted with the second lens element; the connecting surface 123h extends towards and is close towards the optical axis X from a side of the second frustum surface 123b close to the optical axis X, the connecting surface 123h is connected to optical surfaces of the first lens element.

The second lens element includes a first corresponding frustum surface 124d, a second corresponding frustum surface 124e, a corresponding receiving surface 124f and a connecting surface 124g, wherein the first corresponding frustum surface 124d is disposed on a side of the second lens element facing towards the first lens element, and the first corresponding frustum surface 124d is corresponding to the first frustum surface 123a; the second corresponding frustum surface 124e is corresponding to the second frustum surface 123b; the corresponding receiving surface 124f is corresponding to the receiving surface 123c, and the corresponding receiving surface 124f, the first corresponding frustum surface 124d and the second corresponding frustum surface 124e are disposed on the same side; the connecting surface 124g extends towards and is close towards the optical axis X from a side of the second corresponding frustum surface 124e close to the optical axis X, the connecting surface 124g is connected to optical surfaces (their reference numerals are omitted) of the second lens element, the optical axis X passes through the optical surfaces, and the light blocking sheet 132 is disposed between the connecting surfaces 123h, 124g.

It should be mentioned that the first frustum surface 123a, the second frustum surface 123b and the receiving surface 123c are the annular corresponding structure of the first lens element, the first corresponding frustum surface 124d, the second corresponding frustum surface 124e and the corresponding receiving surface 124f are the annular corresponding structure of the second lens element. The first lens element is directly contacted with and aligned to the second lens element via the annular corresponding structures.

In FIGS. 1J and 1K, when an environmental temperature is T1, the first frustum surface 123a is directly contacted with the first corresponding frustum surface 124d, the second frustum surface 123b and the second corresponding frustum surface 124e are disposed at intervals, and the first lens element is aligned to the second lens element; in FIG. 1L, when the environmental temperature is T2, the second frustum surface 123b is directly contacted with the second corresponding frustum surface 124e, the first frustum surface 123a and the first corresponding frustum surface 124d are disposed at intervals, the first lens element is aligned to the second lens element. Furthermore, when the environmental temperature is between T1 and T2, a spacing between the first frustum surface 123a and the first corresponding frustum surface 124d changes according to the environmental temperature and is recoverable, and the receiving surface 123c and the second lens element keep being directly contacted, wherein the spacing between the first lens element and the second lens element on the optical axis X can be kept by the receiving surface 123c, so as to avoid the deformation of the first lens element and the second lens element by the first frustum surface 123a, the second frustum surface 123b, the first corresponding frustum surface 124d and the second corresponding frustum surface 124e under pressure. In FIGS. 1J to 1L, T1 is 293.1 K, and T2 is 343.1 K.

In particular, the risk of the offset of the lens elements of the imaging lens assembly can be reduced by the secondary alignment of the first lens element and the second lens element under the different temperature. Further, the cooperation between the first lens element and the second lens element can be avoided being interfered and affected by the direct contact of the first frustum surface 123a and the first corresponding frustum surface 124d or the direct contact of the second frustum surface 123b and the second corresponding frustum surface 124e.

In FIG. 1K, when on a cross section S vertical to the optical axis X and passing through the first frustum surface 123a, the first corresponding frustum surface 124d, the second frustum surface 123b and the second corresponding frustum surface 124e, a nearest distance between the first frustum surface 123a and the second frustum surface 123b is D, a shortest distance between the first corresponding frustum surface 124d and the second corresponding frustum surface 124e is d, a coefficient of linear thermal expansion of the first lens element is E1, a coefficient of linear thermal expansion of the second lens element is E2, and an angle between the first frustum surface 123a and the second frustum surface 123b on a cross section (its reference numeral is omitted) parallel to the optical axis X is θ, the following conditions of the Table 3 are satisfied.

TABLE 3

1st example-FIG. 1K

| D (μm) | 115.5 | E1 (ppm/K) | 61 |
|---|---|---|---|
| d (μm) | 120 | E2 (ppm/K) | 93 |
| \|D − d\| (μm) | 4.5 | \|(E1 − E2)/(E1 + E2)\| | 0.208 |
| θ (degree) | 50 | | |

When the environmental temperature is a random temperature between T1 and T2, on the cross section S vertical to the optical axis X and passing through the first frustum surface 123a and the corresponding frustum surface (that is, the first corresponding frustum surface 124d), a shortest distance between the first frustum surface 123a and the corresponding frustum surface is D', and D' is not larger than 19.8 μm; when the environmental temperature is between T1 and T2, a maximum shortest distance between the first frustum surface 123a and the corresponding frustum surface is D'max, and D'max is not less than 0.2 μm.

It should be mentioned that the first lens element and the second lens element have different coefficients of linear thermal expansion, and the first lens element and the second lens element can further have different hygroscopic expansion coefficients.

In particular, the environmental temperature ranges of the lens elements 121, 122 in FIGS. 1D to 1F, the lens elements 122, 123 in FIGS. 1G to 1I and the lens elements 123, 124 in FIGS. 1J to 1L are the same, and the examples in FIGS. 1D to 1F, in FIGS. 1G to 1I and in FIGS. 1J to 1L are configured to simulate the condition of the uniform environmental temperature. When the imaging lens assembly is disposed under the temperature gradient, the annular corresponding structures corresponding to the environmental temperature can be disposed in the imaging lens assembly. That is, when the environmental temperature rapidly increases or the heat source comes from the specific direction, so that the temperature in the imaging lens assembly gradiently changes, the annular corresponding structures corresponding to the different environmental temperature ranges can be disposed to promote the efficiency of the alignment.

2nd Example

Figure 2A:
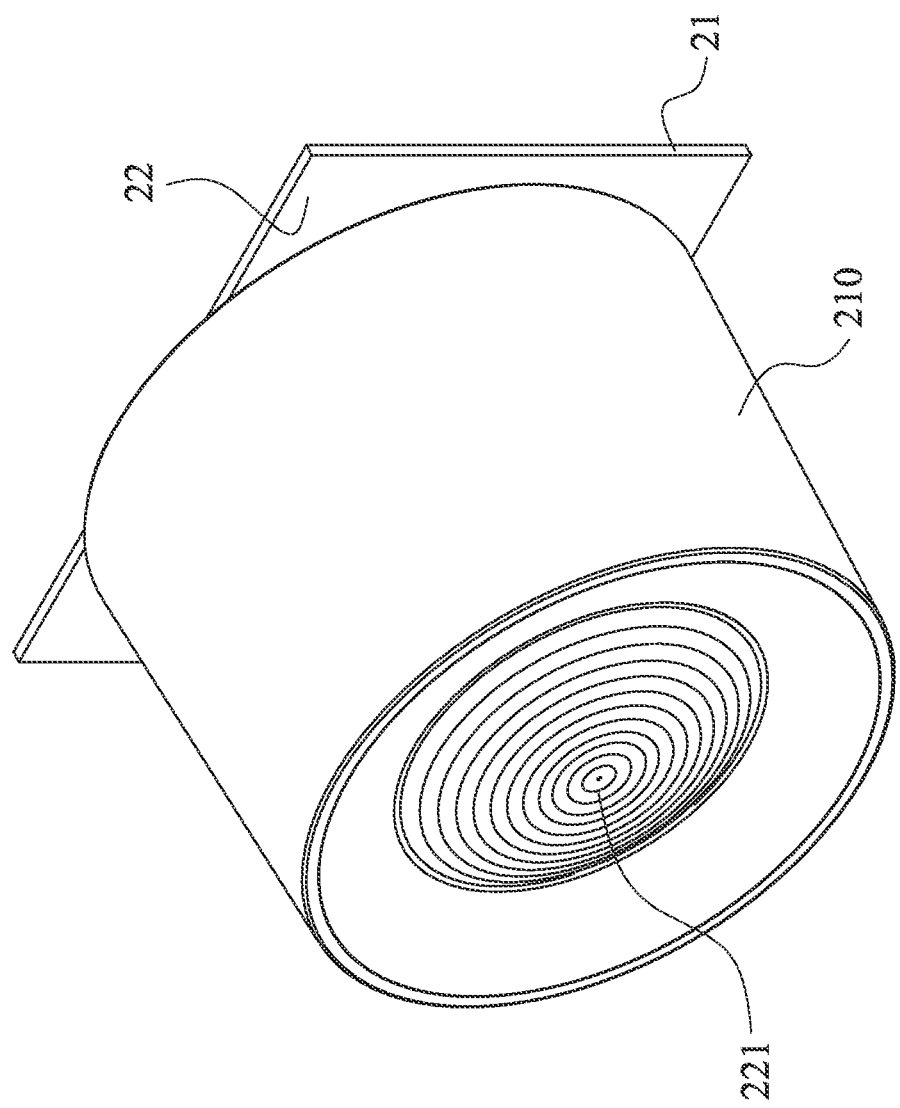
FIG. 2A is a three dimensional view of an electronic device according to the 2nd example of the present disclosure.
Figure 2B:
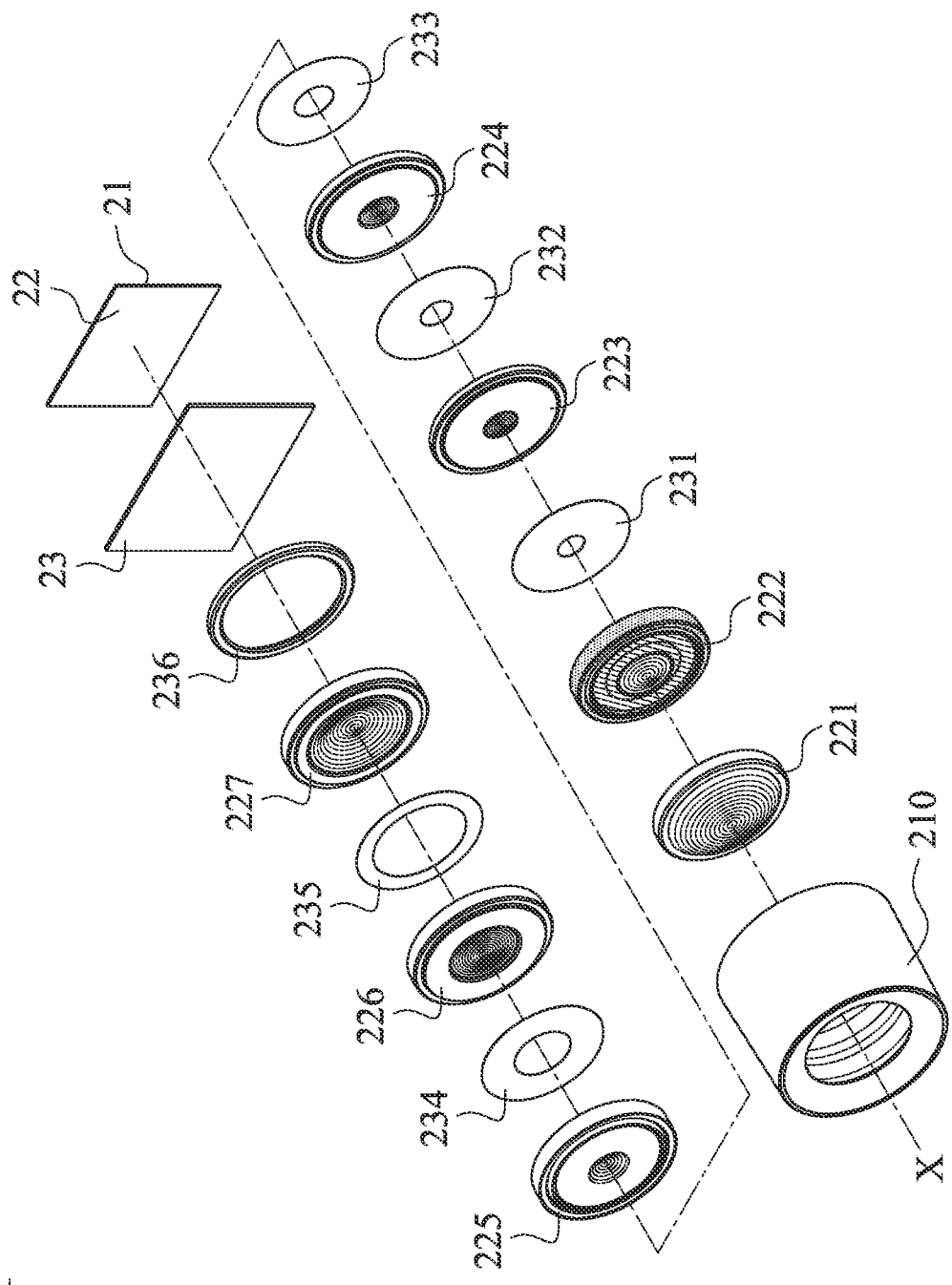
FIG. 2B is an exploded view of the electronic device according to the 2nd example in FIG. 2A.
Figure 2C:
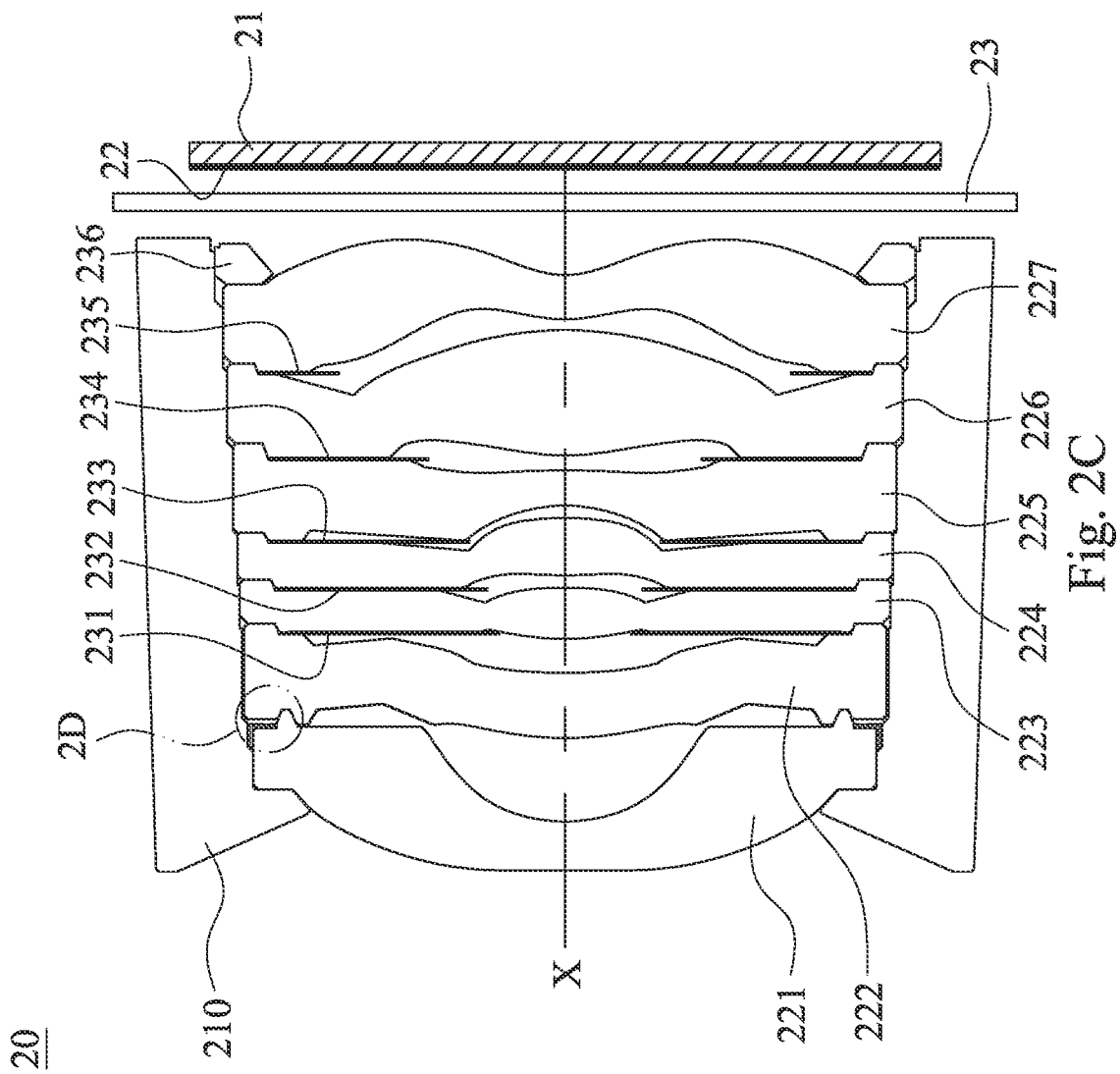
FIG. 2C is a schematic view of the electronic device according to the 2nd example in FIG. 2A.

FIG. 2A is a three dimensional view of an electronic device 20 according to the 2nd example of the present disclosure. FIG. 2B is an exploded view of the electronic device 20 according to the 2nd example in FIG. 2A. FIG. 2C is a schematic view of the electronic device 20 according to the 2nd example in FIG. 2A. In FIGS. 2A to 2C, the electronic device 20 includes at least one image capturing apparatus (its reference numeral is omitted), a filter 23 and an image sensor 21, wherein the image capturing apparatus includes at least one imaging lens assembly (its reference numeral is omitted), the filter 23 is disposed on an image side of the imaging lens assembly, and the image sensor 21 is disposed on an image surface 22 of the imaging lens assembly.

Moreover, the imaging lens assembly has an imaging light path (its reference numeral is omitted), and the imaging light path includes an optical axis X. The imaging lens assembly includes, in order from an object side to the image side, a lens carrier 210, a lens element 221, a lens element 222, a light blocking sheet 231, a lens element 223, a light blocking sheet 232, a lens element 224, a light blocking sheet 233, a lens element 225, a light blocking sheet 234, a lens element 226, a light blocking sheet 235, a lens element 227 and a retainer 236, and the lens carrier 210 accommodates the lens elements 221, 222, 223, 224, 225, 226, 227, the light blocking sheets 231, 232, 233, 234, 235 and the retainer 236. By the light blocking sheets 231, 232, 233, 234, 235 disposed between the lens elements 222, 223, between the lens elements 223, 224, between the lens elements 224, 225, between the lens elements 225, 226 and between the lens elements 226, 227, respectively, the non-imaging light can be blocked to enter the image sensor 21 to form the flare. It should be mentioned that the lens elements 221, 222, 223, 224, 225, 226, 227 can be plastic lens elements or glass lens elements, and numbers, structures, surface shapes and so on of the lens elements can be disposed according to different imaging demand, other optical elements can be disposed on demands, and the present disclosure is not limited thereto.

The lens carrier 210 includes an inside surface 211, wherein the inside surface 211 faces towards and surrounds the lens elements 221, 222, and the lens element 222 and the lens carrier 210 are disposed at intervals. Therefore, the squeeze deformation of the lens element 222 caused by the radial pressure of expansion and contraction of the lens carrier 210 can be avoided to further enhance the yield rate of the finished product.

Figure 2D:
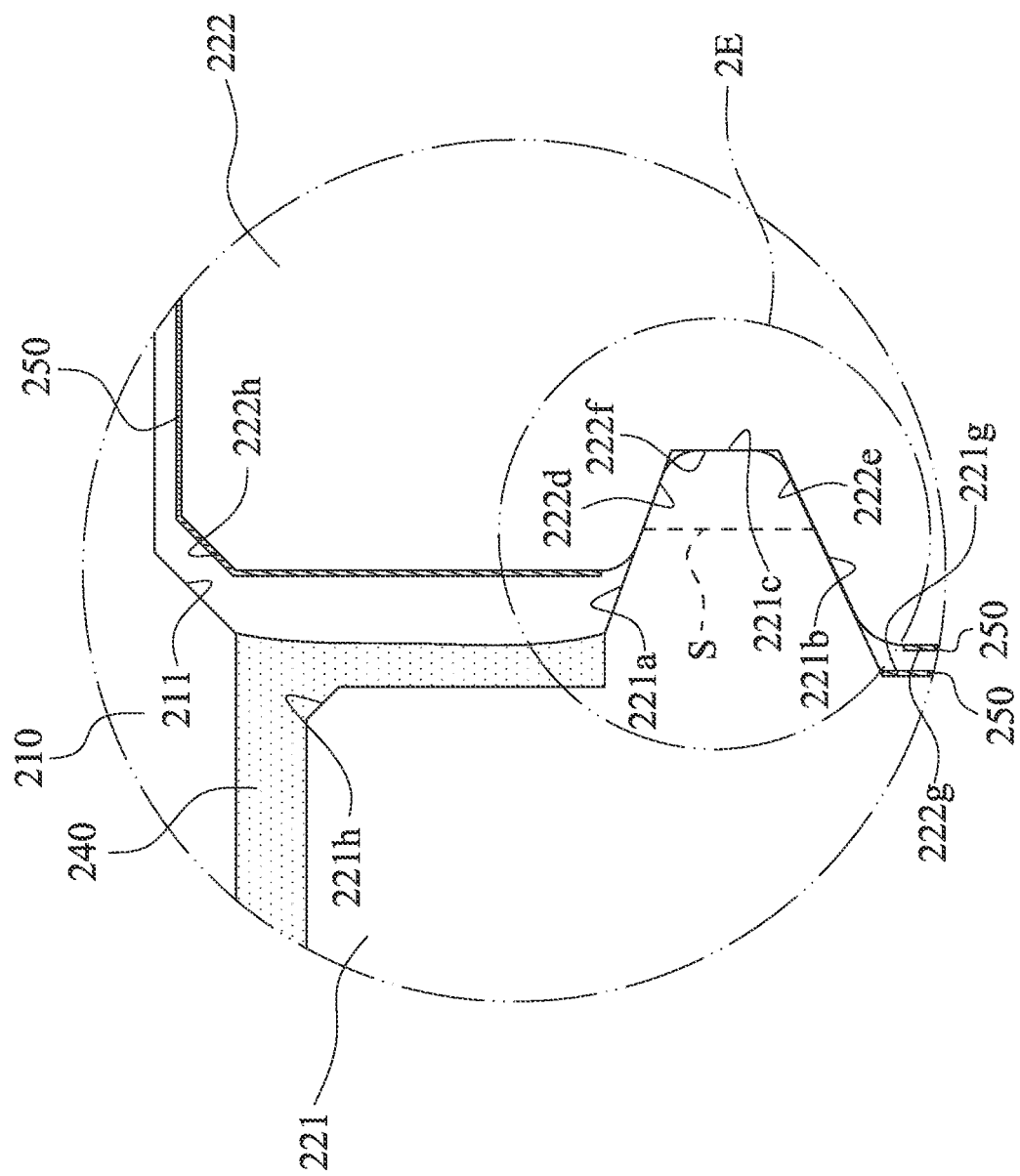
FIG. 2D is a partial enlarged view of the electronic device according to the 2nd example in FIG. 2C.
Figure 2G:
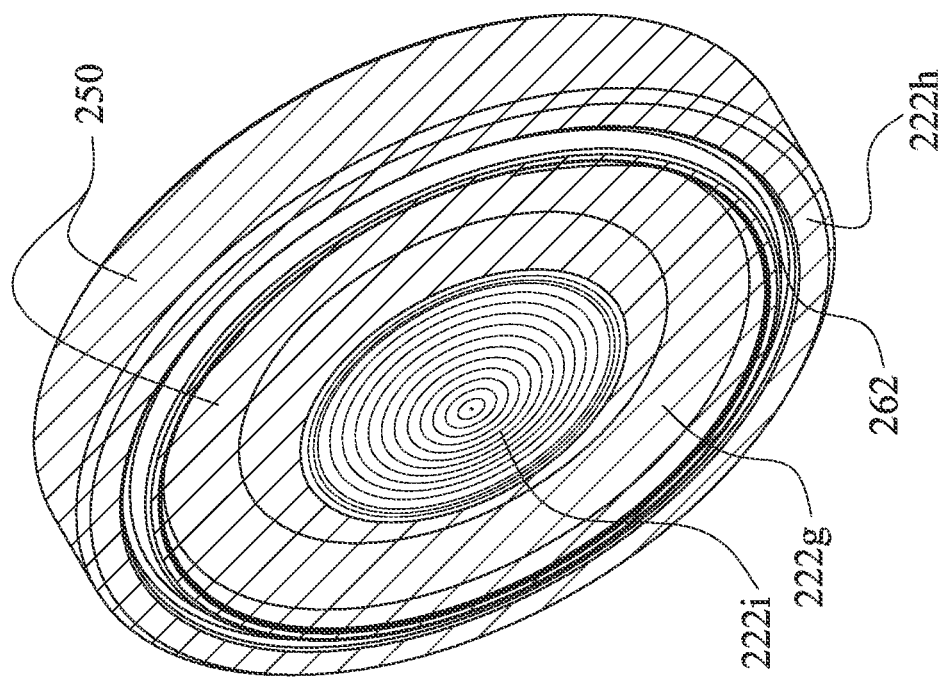
FIG. 2G is a schematic view of the lens element according to the 2nd example in FIG. 2A.
Figure 2H:
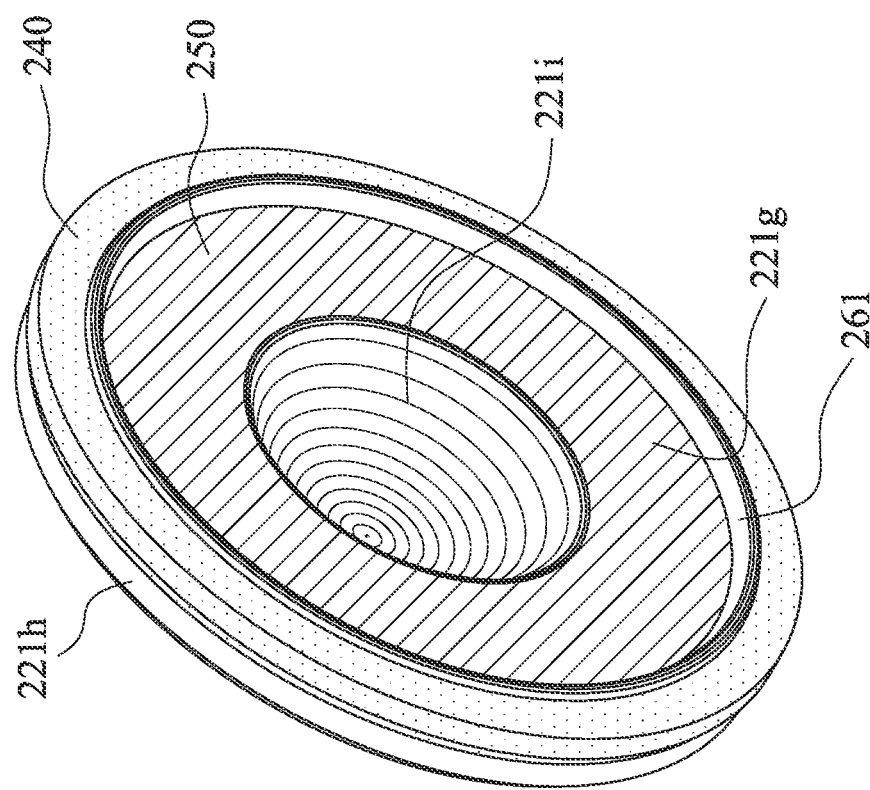
FIG. 2H is a schematic view of the lens element according to the 2nd example in FIG. 2A.

In FIG. 2C, each adjacent two of the lens elements (that is, the lens elements 221, 222) of the imaging lens assembly include annular corresponding structures 261 (as shown in FIG. 2G), 262 (as shown in FIG. 2H) configured to solve the problem of offset because of the variation of the environmental factors (that is, temperature, humidity). The annular corresponding structures 261, 262 between the lens elements 221, 222 are illustrated as followed.

FIG. 2D is a partial enlarged view of the electronic device 20 according to the 2nd example in FIG. 2C. FIG. 2E is a partial enlarged view of the electronic device 20 according to the 2nd example in FIG. 2D. FIG. 2F is a partial enlarged view of the electronic device 20 under the different environmental temperature according to the 2nd example in FIG. 2D. In FIGS. 2C to 2F, the lens elements 221, 222 are relatively located on the object side and the image side of the imaging lens assembly, and the optical axis X passes through the lens elements 221, 222, wherein the lens element 221 can be a first lens element, and the lens element 222 can be a second lens element.

The first lens element includes a first frustum surface 221a, a second frustum surface 221b, a receiving surface 221c and a connecting surface 221g, wherein the first frustum surface 221a is disposed on a side of the first lens element facing towards the second lens element, and the optical axis X is an axis of the first frustum surface 221a, the second frustum surface 221b and the first frustum surface 221a are disposed on the same side and face towards the second lens element, the second frustum surface 221b and the first frustum surface 221a are coaxial, and the second frustum surface 221b is closer to the optical axis X than the first frustum surface 221a to the optical axis X; the receiving surface 221c faces towards the second lens element, the receiving surface 221c is substantially vertical to the optical axis X, the receiving surface 221c, the first frustum surface 221a and the second frustum surface 221b are disposed on the same side, and the receiving surface 221c is directly contacted with the second lens element.

The second lens element includes a first corresponding frustum surface 222d, a second corresponding frustum surface 222e, a corresponding receiving surface 222f and a connecting surface 222g, wherein the first corresponding frustum surface 222d is disposed on a side of the second lens element facing towards the first lens element, and the first corresponding frustum surface 222d is corresponding to the first frustum surface 221a, the second corresponding frustum surface 222e is corresponding to the second frustum surface 221b, the corresponding receiving surface 222f is corresponding to the receiving surface 221c, and the corresponding receiving surface 222f, the first corresponding frustum surface 222d and the second corresponding frustum surface 222e are disposed on the same side; the connecting surfaces 221g, 222g are disposed at intervals.

It should be mentioned that the first frustum surface 221a, the second frustum surface 221b and the receiving surface 221c are the annular corresponding structure 261 of the first lens element, the first corresponding frustum surface 222d, the second corresponding frustum surface 222e and the corresponding receiving surface 222f are the annular corresponding structure 262 of the second lens element. The first lens element is directly contacted with and aligned to the second lens element via the annular corresponding structures 261, 262.

FIG. 2G is a schematic view of the lens element 221 according to the 2nd example in FIG. 2A. FIG. 2H is a schematic view of the lens element 222 according to the 2nd example in FIG. 2A. In FIGS. 2D to 2H, the first lens element further includes an outside surface 221h, an optical surface 221i and a glue 240, and the second lens element further includes an outside surface 222h and an optical surface 222i.

The optical axis X passes through the optical surfaces 221i, 222i, the connecting surface 221g is connected to the optical surface 221i and the annular corresponding structure 261, and the connecting surface 222g is connected to the optical surface 222i and the annular corresponding structure 262. The outside surfaces 221h, 222h extend from sides of the annular corresponding structures 261, 262 away from the optical axis X, respectively, and the outside surfaces 221h, 222h are farther from the optical axis X than the first frustum surface 221a, the first corresponding frustum surface 222d, the second frustum surface 221b or the second corresponding frustum surface 222e from the optical axis X. The outside surfaces 221h, 222h are corresponding to the inside surface 211 of the lens carrier 210, and the glue 240 is disposed between the outside surface 221h of the first lens element and the inside surface 211 of the lens carrier 210. Furthermore, the glue 240 can be configured to absorb the non-imaging light and fix the first lens element.

The connecting surfaces 221g, 222g and the outside surfaces 221h, 222h can be further the anti-glare surfaces or disposed the anti-glare structures, so that the non-imaging light can be avoid entering the image sensor 21. Therefore, the glare can be reduced, and the imaging quality and the resolution of the imaging lens assembly can be enhanced, wherein the anti-glare structures can be the rough surfaces, the low reflective coating, the convex which can be configured to reduce the glare, the concave which can be configured to reduce the glare, the light blocking coating or the light reducing coating, but the present disclosure is not limited thereto. In FIGS. 2D to 2F and 2H, a light blocking layer 250 of the imaging lens assembly covers at least one portion of the outside surface 222h of the second lens element, the connecting surface 221g of the first lens element and the connecting surface 222g of the second lens element, wherein the light blocking layer 250 can be a colloid or a coating with the light-blocking property or the light-absorbing property, and the light blocking layer 250 can be configured to block the non-imaging light to enter the image sensor 21. Therefore, the glare can be reduced.

In FIGS. 2D and 2E, when an environmental temperature is T1, the first frustum surface 221a is directly contacted with the first corresponding frustum surface 222d, the second frustum surface 221b and the second corresponding frustum surface 222e are disposed at intervals, and the first lens element is aligned to the second lens element; in FIG. 2F, when the environmental temperature is T2, the second frustum surface 221b is directly contacted with the second corresponding frustum surface 222e, the first frustum surface 221a and the first corresponding frustum surface 222d are disposed at intervals, and the first lens element is aligned to the second lens element. Furthermore, when the environmental temperature is between T1 and T2, a spacing between the first frustum surface 221a and the first corresponding frustum surface 222d changes according to the environmental temperature and is recoverable, and the receiving surface 221c and the second lens element keep being directly contacted, wherein the spacing between the first lens element and the second lens element on the optical axis X can be kept by the receiving surface 221c, so as to avoid the deformation of the first lens element and the second lens element by the first frustum surface 221a, the second frustum surface 221b, the first corresponding frustum surface 222d and the second corresponding frustum surface 222e under pressure. In FIGS. 2D to 2F, T1 is 273.1 K, and T2 is 293.1 K. It should be mentioned that the environmental temperature is the environmental temperature outside the imaging lens assembly when the inner temperature of the imaging lens assembly is under the steady state.

In particular, the risk of the offset of the lens elements of the imaging lens assembly can be reduced by the secondary alignment of the first lens element and the second lens element under the different temperature. Further, the cooperation between the first lens element and the second lens element can be avoided being interfered and affected by the direct contact of the first frustum surface 221a and the first corresponding frustum surface 222d or the direct contact of the second frustum surface 221b and the second corresponding frustum surface 222e.

In FIG. 2E, when on a cross section S vertical to the optical axis X and passing through the first frustum surface 221a, the first corresponding frustum surface 222d, the second frustum surface 221b and the second corresponding frustum surface 222e, a nearest distance between the first frustum surface 221a and the second frustum surface 221b is D, a shortest distance between the first corresponding frustum surface 222d and the second corresponding frustum surface 222e is d, a coefficient of linear thermal expansion of the first lens element is E1, a coefficient of linear thermal expansion of the second lens element is E2, and an angle between the first frustum surface 221a and the second frustum surface 221b on a cross section (its reference numeral is omitted) parallel to the optical axis X is θ, the following conditions of the Table 4 are satisfied.

TABLE 4

2nd example

| D (μm) | 159 | E1 (ppm/K) | 70 |
|---|---|---|---|
| d (μm) | 160 | E2 (ppm/K) | 84 |
| \|D − d\| (μm) | 1 | \|(E1 − E2)/(E1 + E2)\| | 0.091 |
| θ (degree) | 45 | | |

Moreover, when the environmental temperature is a random temperature between T1 and T2, on the cross section S vertical to the optical axis X and passing through the first frustum surface 221a and the corresponding frustum surface (that is, the first corresponding frustum surface 222d), a shortest distance between the first frustum surface 221a and the corresponding frustum surface is D', and D' is not larger than 19.8 μm; when the environmental temperature is between T1 and T2, a maximum shortest distance between the first frustum surface 221a and the corresponding frustum surface is D'max, and D'max is not less than 0.2 μm.

It should be mentioned that the first lens element and the second lens element have different coefficients of linear thermal expansion, and the first lens element and the second lens element can further have different hygroscopic expansion coefficients.

3rd Example

Figure 3A:
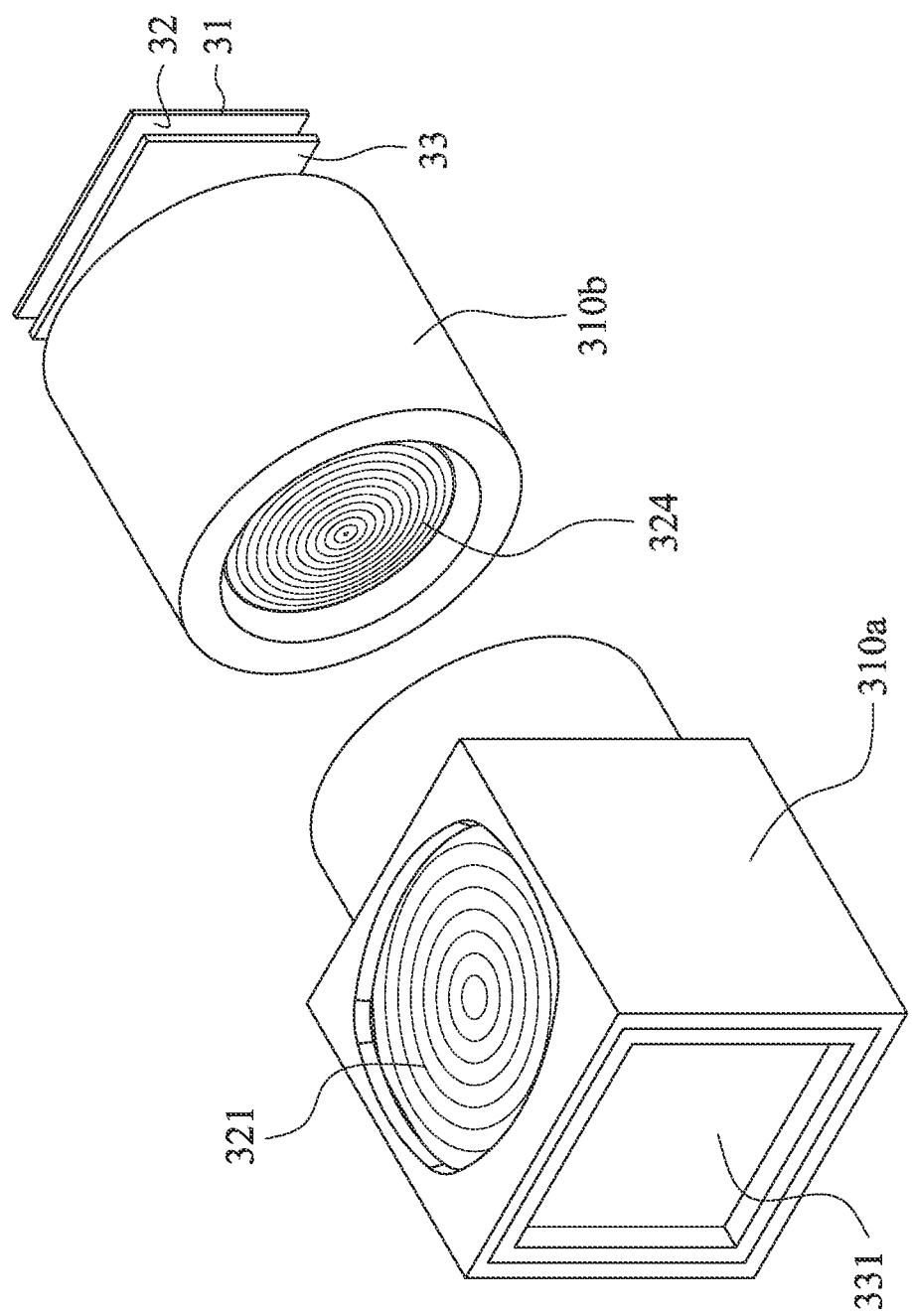
FIG. 3A is a three dimensional view of an electronic device according to the 3rd example of the present disclosure.
Figure 3B:
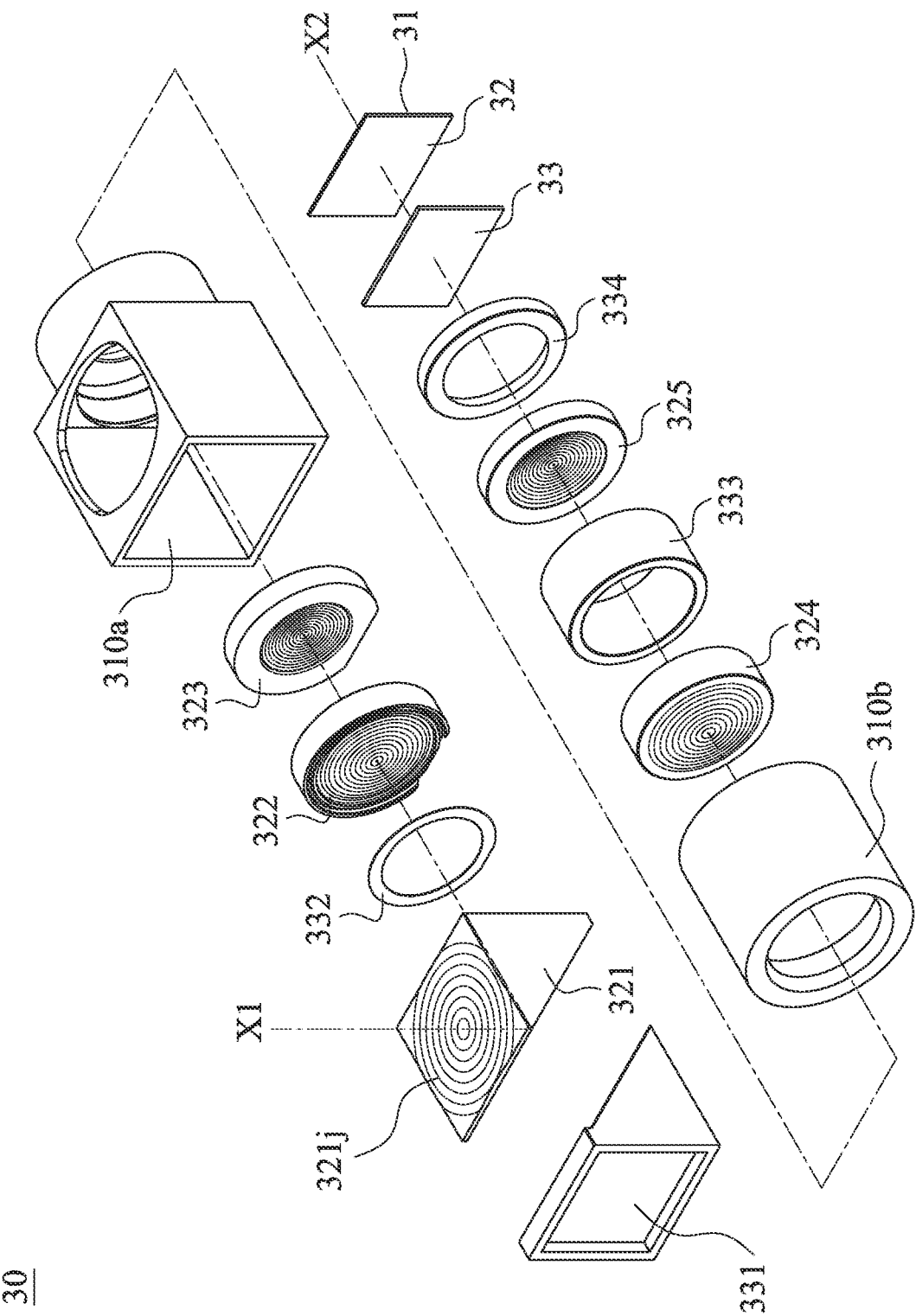
FIG. 3B is an exploded view of the electronic device according to the 3rd example in FIG. 3A.
Figure 3C:
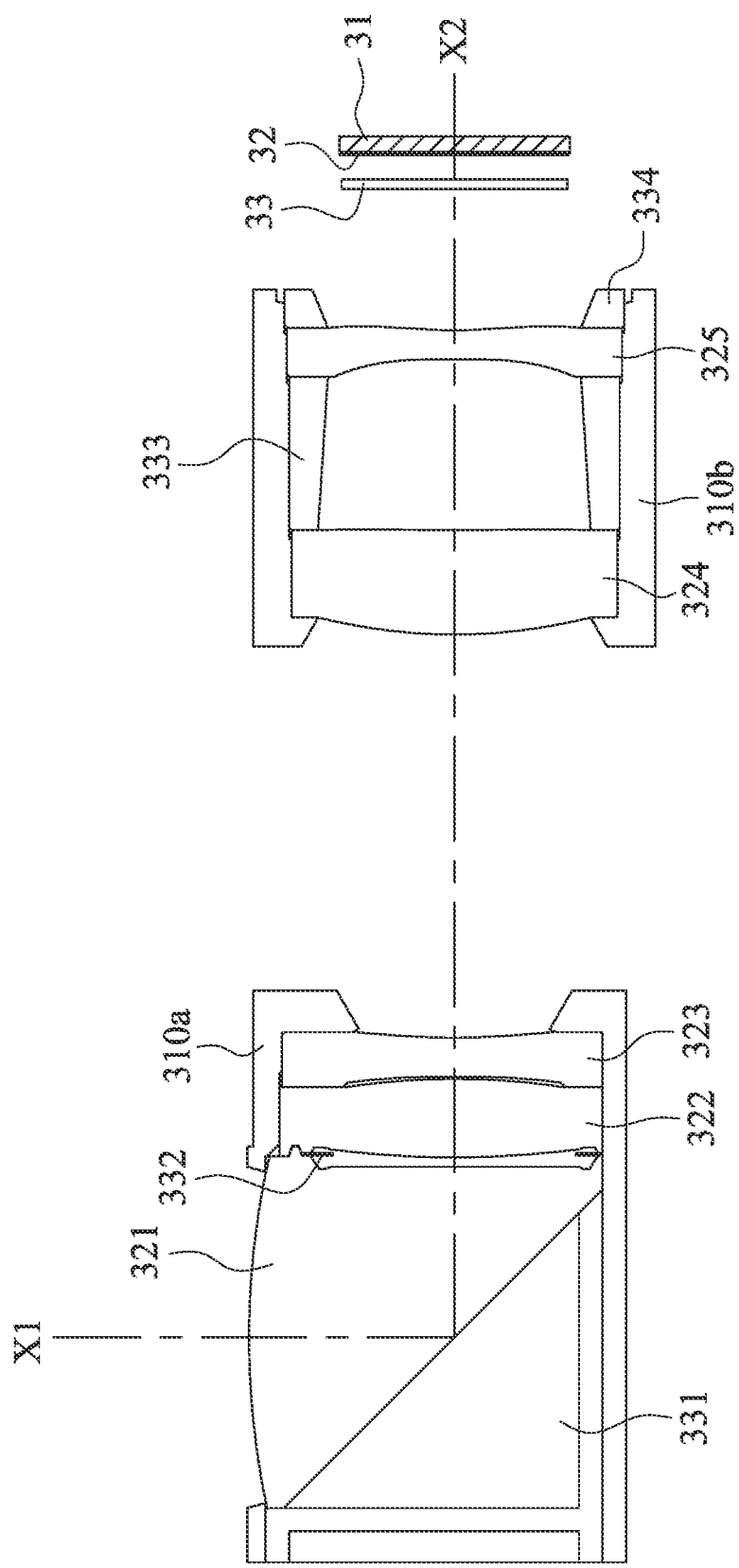
FIG. 3C is a schematic view of the electronic device according to the 3rd example in FIG. 3A.

FIG. 3A is a three dimensional view of an electronic device 30 according to the 3rd example of the present disclosure. FIG. 3B is an exploded view of the electronic device 30 according to the 3rd example in FIG. 3A. FIG. 3C is a schematic view of the electronic device 30 according to the 3rd example in FIG. 3A. In FIGS. 3A to 3C, the electronic device 30 includes at least one image capturing apparatus (its reference numeral is omitted), an image sensor 31 and a filter 33, wherein the image capturing apparatus includes at least one imaging lens assembly (its reference numeral is omitted), the filter 33 is disposed on an image side of the imaging lens assembly, and the image sensor 31 is disposed on an image surface 32 of the imaging lens assembly.

Moreover, the imaging lens assembly has an imaging light path (its reference numeral is omitted), and the imaging light path includes a first optical axis X1 and a second optical axis X2. The imaging lens assembly includes, in order from an object side to the image side, a retainer 331, a lens element 321, a light blocking sheet 332, a lens element 322, a lens element 323, a lens carrier 310a, a lens carrier 310b, a lens element 324, a spacer 333, a lens element 325 and a retainer 334, wherein the lens carrier 310a accommodates the lens elements 321, 322, 323, the retainer 331 and the light blocking sheet 332, and the lens carrier 310b accommodates the lens elements 324, 325, the spacer 333 and the retainer 334. By the light blocking sheet 332 disposed between the lens elements 321, 322, the non-imaging light can be blocked to enter the image sensor 31 to form the flare. It should be mentioned that the lens element 321 is a plastic lens element, the lens elements 322, 323, 324, 325 can be plastic lens elements or glass lens elements, and numbers, structures, surface shapes and so on of the lens elements can be disposed according to different imaging demand, other optical elements can be disposed on demands, and the present disclosure is not limited thereto.

Figure 3D:
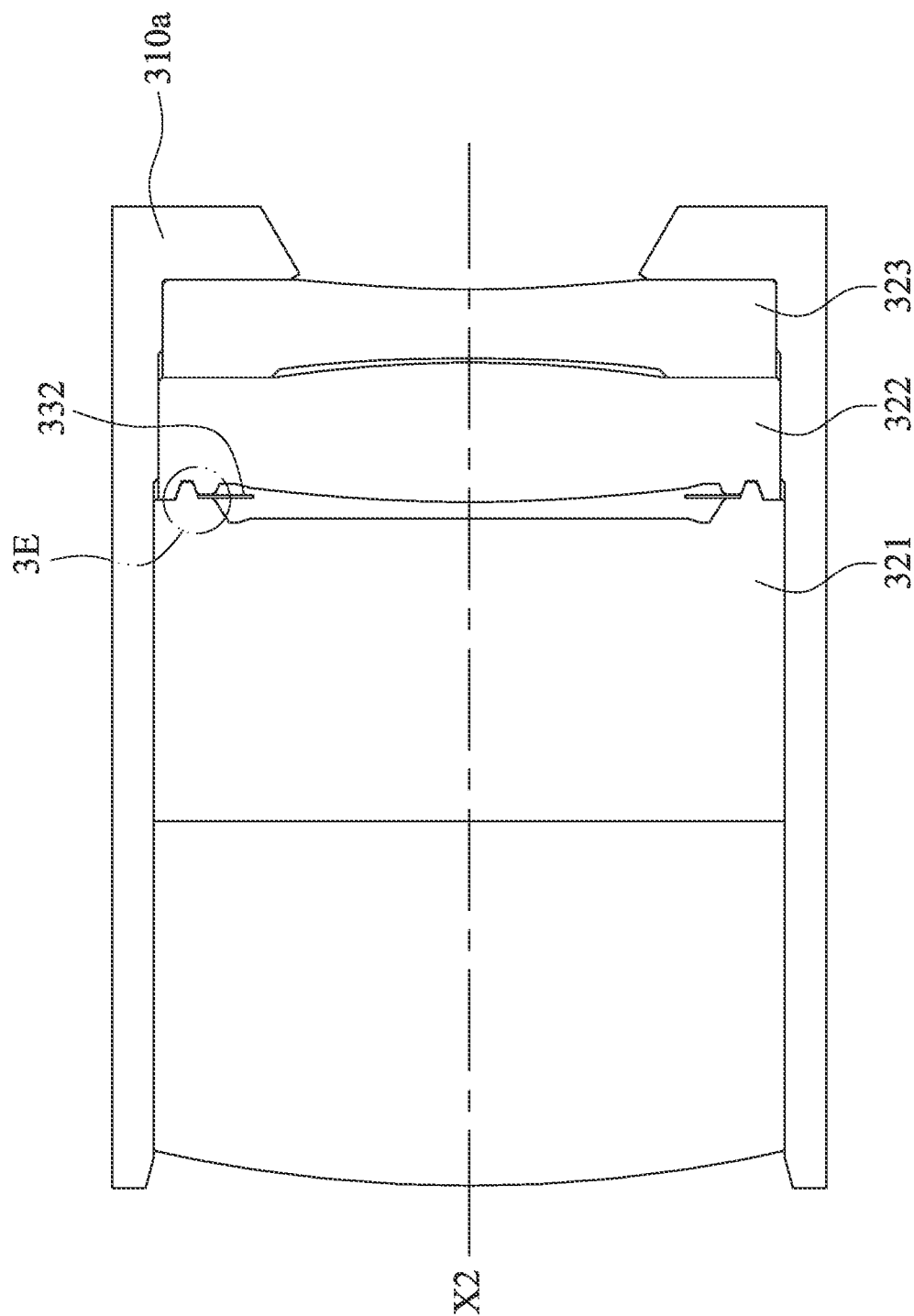
FIG. 3D is a partial schematic view of the electronic device according to the 3rd example in FIG. 3C.

FIG. 3D is a partial schematic view of the electronic device 30 according to the 3rd example in FIG. 3C. In FIG. 3D, each adjacent two of the lens elements (that is, the lens elements 321, 322) of the imaging lens assembly include annular corresponding structures 361 (as shown in FIG. 3I), 362 (as shown in FIG. 3K) configured to solve the problem of offset because of the variation of the environmental factors (that is, temperature, humidity). The annular corresponding structures 361, 362 between the lens elements 321, 322 are illustrated as followed.

Figure 3E:
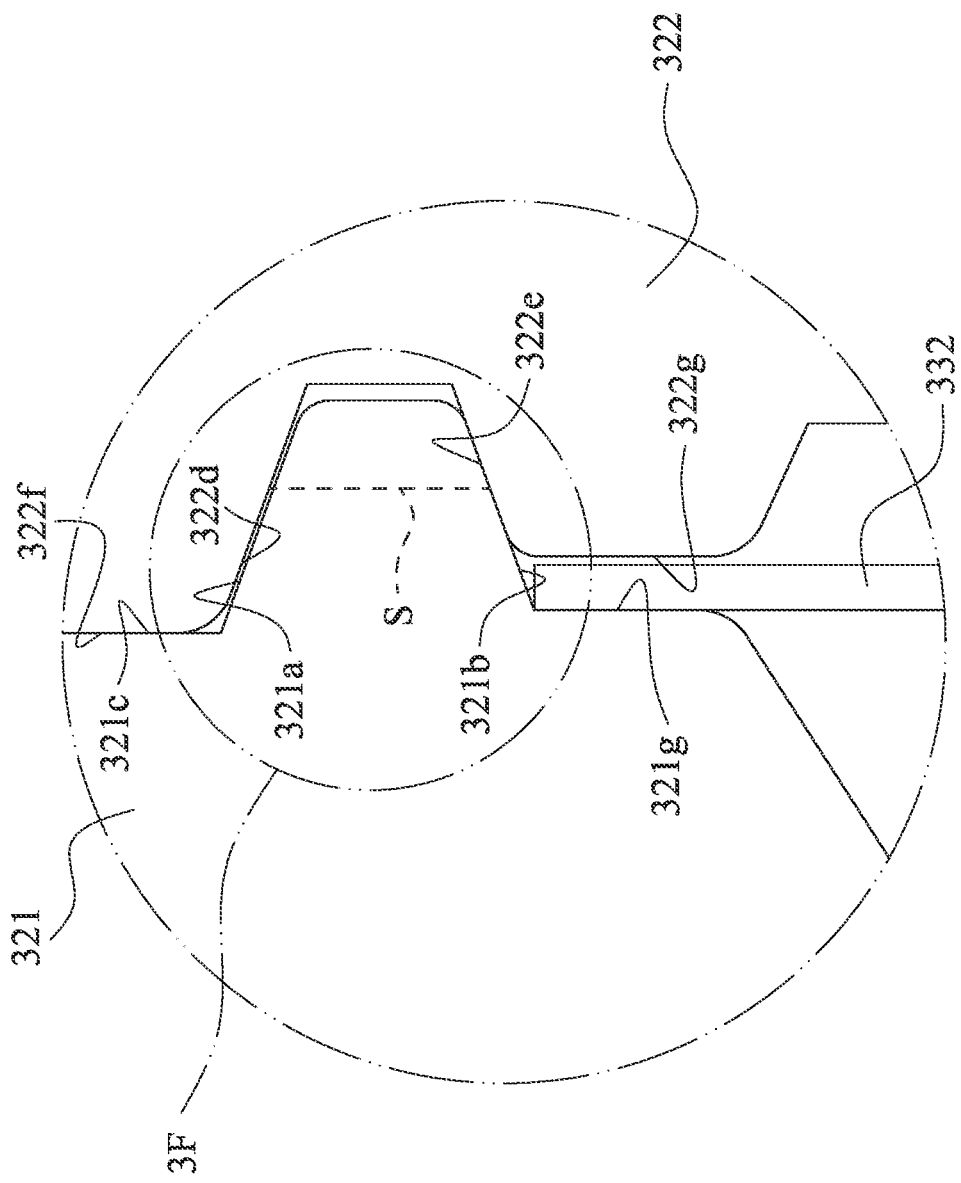
FIG. 3E is a partial enlarged view of the electronic device according to the 3rd example in FIG. 3D.
Figure 3H:
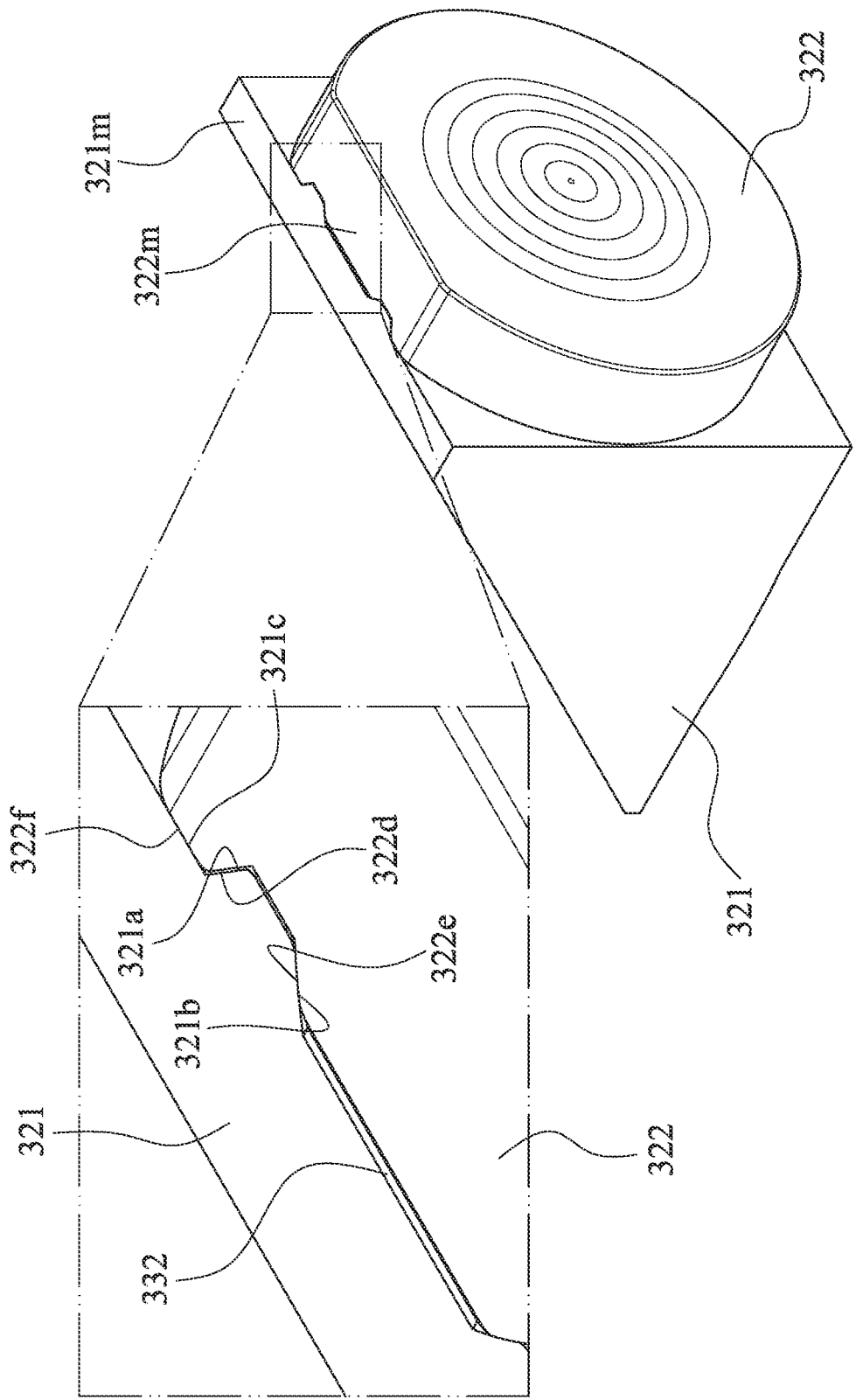
FIG. 3H is an assembling schematic view of the lens elements according to the 3rd example in FIG. 3A.
Figure 3I:
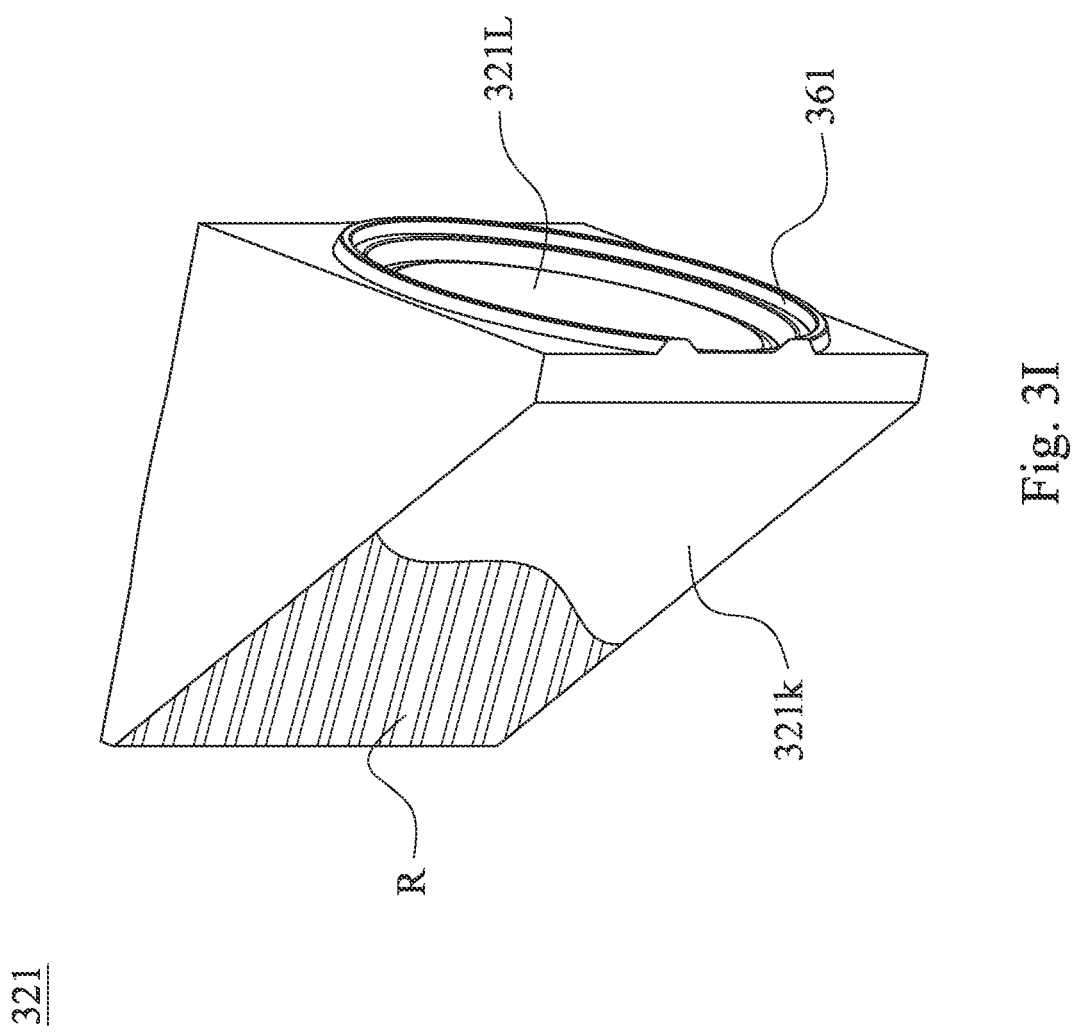
FIG. 3I is a schematic view of the lens element according to the 3rd example in FIG. 3A.
Figure 3K:
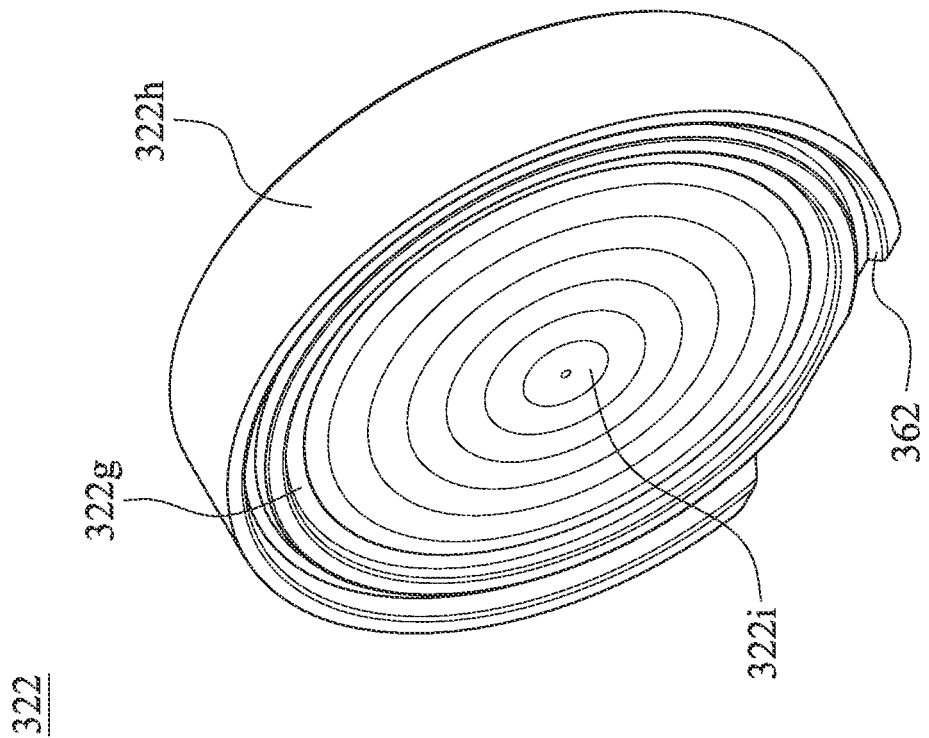
FIG. 3K is a schematic view of the lens element according to the 3rd example in FIG. 3A.

FIG. 3E is a partial enlarged view of the electronic device 30 according to the 3rd example in FIG. 3D. FIG. 3F is a partial enlarged view of the electronic device 30 according to the 3rd example in FIG. 3E. FIG. 3G is a partial enlarged view of the electronic device 30 under the different environmental temperature according to the 3rd example in FIG. 3E. FIG. 3H is an assembling schematic view of the lens elements 321, 322 according to the 3rd example in FIG. 3A. In FIGS. 3C to 3H, the lens elements 321, 322 are relatively located on the object side and the image side of the imaging lens assembly, and the second optical axis X2 passes through the lens elements 321, 322, wherein the lens element 321 can be a first lens element, and the lens element 322 can be a second lens element.

The first lens element includes a first frustum surface 321a, a second frustum surface 321b, a receiving surface 321c and a connecting surface 321g, wherein the first frustum surface 321a is disposed on a side of the first lens element facing towards the second lens element, and the second optical axis X2 is an axis of the first frustum surface 321a, the second frustum surface 321b and the first frustum surface 321a are disposed on the same side and face towards the second lens element, the second frustum surface 321b and the first frustum surface 321a are coaxial, and the second frustum surface 321b is closer to the second optical axis X2 than the first frustum surface 321a to the second optical axis X2; the receiving surface 321c faces towards the second lens element, the receiving surface 321c is substantially vertical to the second optical axis X2, the receiving surface 321c, the first frustum surface 321a and the second frustum surface 321b are disposed on the same side, and the receiving surface 321c is directly contacted with the second lens element.

The second lens element includes a first corresponding frustum surface 322d, a second corresponding frustum surface 322e, a corresponding receiving surface 322f and a connecting surface 322g, wherein the first corresponding frustum surface 322d is disposed on a side of the second lens element facing towards the first lens element, and the first corresponding frustum surface 322d is corresponding to the first frustum surface 321a, the second corresponding frustum surface 322e is corresponding to the second frustum surface 321b, the corresponding receiving surface 322f is corresponding to the receiving surface 321c, and the corresponding receiving surface 322f, the first corresponding frustum surface 322d and the second corresponding frustum surface 322e are disposed on the same side; the connecting surfaces 321g, 322g are disposed at intervals.

It should be mentioned that the first frustum surface 321a, the second frustum surface 321b and the receiving surface 321c are the annular corresponding structure 361 of the first lens element, the first corresponding frustum surface 322d, the second corresponding frustum surface 322e and the corresponding receiving surface 322f are the annular corresponding structure 362 of the second lens element. The first lens element is directly contacted with and aligned to the second lens element via the annular corresponding structures 361, 362.

In FIG. 3G, when an environmental temperature is T1, the first frustum surface 321a is directly contacted with the first corresponding frustum surface 322d, the second frustum surface 321b and the second corresponding frustum surface 322e are disposed at intervals, and the first lens element is aligned to the second lens element; in FIGS. 3E and 3F, when the environmental temperature is T2, the second frustum surface 321b is directly contacted with the second corresponding frustum surface 322e, the first frustum surface 321a and the first corresponding frustum surface 322d are disposed at intervals, and the first lens element is aligned to the second lens element. Furthermore, when the environmental temperature is between T1 and T2, a spacing between the first frustum surface 321a and the first corresponding frustum surface 322d changes according to the environmental temperature and is recoverable, and the receiving surface 321c and the second lens element keep being directly contacted, wherein the spacing between the first lens element and the second lens element on the second optical axis X2 can be kept by the receiving surface 321c, so as to avoid the deformation of the first lens element and the second lens element by the first frustum surface 321a, the second frustum surface 321b, the first corresponding frustum surface 322d and the second corresponding frustum surface 322e under pressure. In FIGS. 3E to 3G, T1 is 373.1 K, and T2 is 273.1 K. It should be mentioned that the environmental temperature is the environmental temperature outside the imaging lens assembly when the inner temperature of the imaging lens assembly is under the steady state.

In particular, the risk of the offset of the lens elements of the imaging lens assembly can be reduced by the secondary alignment of the first lens element and the second lens element under the different temperature. Further, the cooperation between the first lens element and the second lens element can be avoided being interfered and affected by the direct contact of the first frustum surface 321a and the first corresponding frustum surface 322d or the direct contact of the second frustum surface 321b and the second corresponding frustum surface 322e.

Figure 3J:
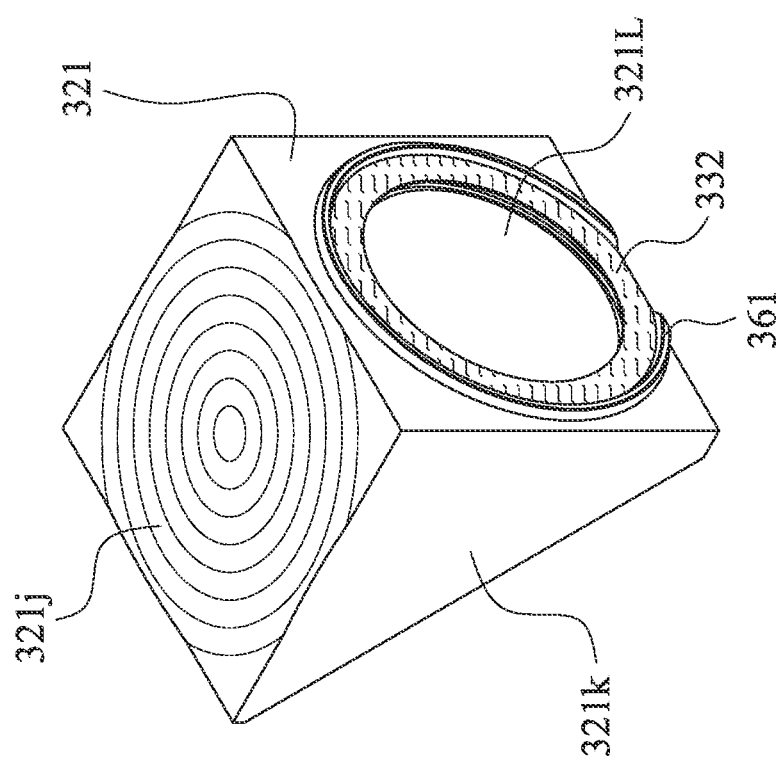
FIG. 3J is an assembling schematic view of the lens element with the light blocking sheet according to the 3rd example in FIG. 3A.

FIG. 3I is a schematic view of the lens element 321 according to the 3rd example in FIG. 3A. FIG. 3J is an assembling schematic view of the lens element 321 with the light blocking sheet 332 according to the 3rd example in FIG. 3A. In FIGS. 3B, 3C, 3I and 3J, the first lens element is a reflective lens element for guiding the imaging light path to enter the first lens element along the first optical axis X1 and reflect the imaging light path to enter the imaging lens assembly along the second optical axis X2, wherein the first lens element along the imaging light path further includes an incident surface 321j, at least one reflective surface 321k and an exit surface 321L, and the imaging light path is folded on the reflective surface 321k towards a mirror direction. Moreover, the incident surface 321j has a radius of curvature, the incident surface 321j has a convex surface in a paraxial region, and both of the reflective surface 321k and the exit surface 321L are flat surfaces, wherein the radius of curvature of the incident surface 321j is 17.13 mm.

The incident surface 321j includes an axisymmetric surface, the imaging light path passes through the axisymmetric surface, and the axisymmetric surface and the first frustum surface 321a are coaxially disposed on the second optical axis X2, wherein the axisymmetric surface can be sphere, aspherical surface or freeform surface. Therefore, the first lens element can be simultaneously configured to fold the imaging light path and change the image field so as to reduce the optical components and enhance the assembling efficiency.

In FIG. 3I, the incident surface 321j, the reflective surface 321k and the exit surface 321L of the first lens element can be integrally formed via a plastic injection. Further, the reflective surface 321k can further include a reflective layer R, wherein the reflective layer R can be a metal layer or a coating with high refractive index, but the present disclosure is not limited thereto. Therefore, the reflectivity of the reflective surface 321k can be enhanced.

Figure 3L:
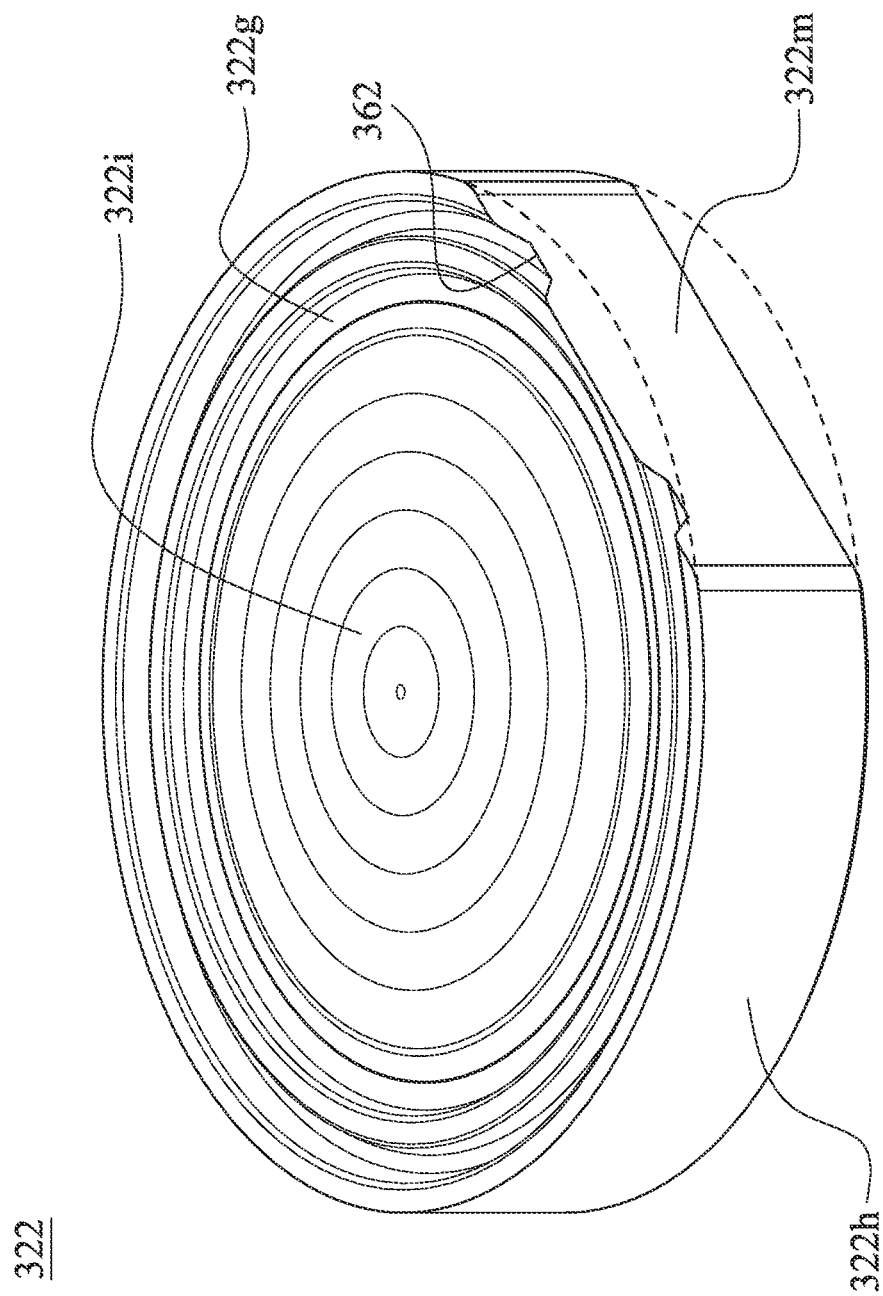
FIG. 3L is another schematic view of the lens element according to the 3rd example in FIG. 3A.

FIG. 3K is a schematic view of the lens element 322 according to the 3rd example in FIG. 3A. FIG. 3L is another schematic view of the lens element 322 according to the 3rd example in FIG. 3A. In FIGS. 3H, 3K and 3L, the first lens element further includes at least one reduction surface 321m, and the second lens element further includes an optical surface 322i and at least one reduction surface 322m, wherein the second optical axis X2 passes through the optical surface 322i, and the connecting surface 322g is connected to the optical surface 322i and the annular corresponding structure 362; the reduction surfaces 321m, 322m reduce from sides of the first lens element and the second lens element away from the second optical axis X2 towards a direction close to the second optical axis X2, respectively. In particular, the reduction surface 321m and the first corresponding frustum surface 322d of the second lens element are intersected, and the reduction surface 322m and the first frustum surface 321a of the first lens element are intersected, hence, the first frustum surface 321a and the first corresponding frustum surface 322d are C-shaped.

It should be mentioned that the first frustum surface 321a and the first corresponding frustum surface 322d can incompletely surround the second optical axis X2, and the reduction surfaces 321m, 322m can be marks of the alignment of the first lens element and the second lens element vertical to the second optical axis X2 so as to enhance the assembling efficiency. Moreover, the reduction surfaces 321m, 322m can be formed via the transfer mold, or the reduction surfaces 321m, 322m can be a cross-section of the secondary processing of the first lens element and the second lens element after forming, and each of the reduction surfaces 321m, 322m can further include a nozzle of the injection molding. The noncircular projection of the first lens element and the second lens element vertical to the second optical axis X2 can be obtained via the reduction surfaces 321m, 322m, so as to reduce the dimension of the imaging lens assembly vertical to the second optical axis X2.

In FIG. 3F, on a cross section S vertical to the second optical axis X2 and passing through the first frustum surface 321a, the first corresponding frustum surface 322d, the second frustum surface 321b and the second corresponding frustum surface 322e, a nearest distance between the first frustum surface 321a and the second frustum surface 321b is D, a shortest distance between the first corresponding frustum surface 322d and the second corresponding frustum surface 322e is d, a coefficient of linear thermal expansion of the first lens element is E1, a coefficient of linear thermal expansion of the second lens element is E2, and an angle between the first frustum surface 321a and the second frustum surface 321b on a cross section (its reference numeral is omitted) parallel to the second optical axis X2 is θ, the following conditions of the Table 5 are satisfied.

TABLE 5

| 3rd example | | | |
|---|---|---|---|
| D (μm) | 196 | E1 (ppm/K) | 87 |
| d (μm) | 200 | E2 (ppm/K) | 72 |
| \|D − d\| (μm) | 4 | \|(E1 − E2)/(E1 + E2)\| | 0.094 |
| θ (degree) | 40 | | |

Moreover, when the environmental temperature is a random temperature between T1 and T2, on the cross section S vertical to the second optical axis X2 and passing through the first frustum surface 321a and the corresponding frustum surface (that is, the first corresponding frustum surface 322d), a shortest distance between the first frustum surface 321a and the corresponding frustum surface is D', and D' is not larger than 19.8 μm; when the environmental temperature is between T1 and T2, a maximum shortest distance between the first frustum surface 321a and the corresponding frustum surface is D'max, and D'max is not less than 0.2 μm.

It should be mentioned that the first lens element and the second lens element have different coefficients of linear thermal expansion, and the first lens element and the second lens element can further have different hygroscopic expansion coefficients.

4th Example

Figure 4A:
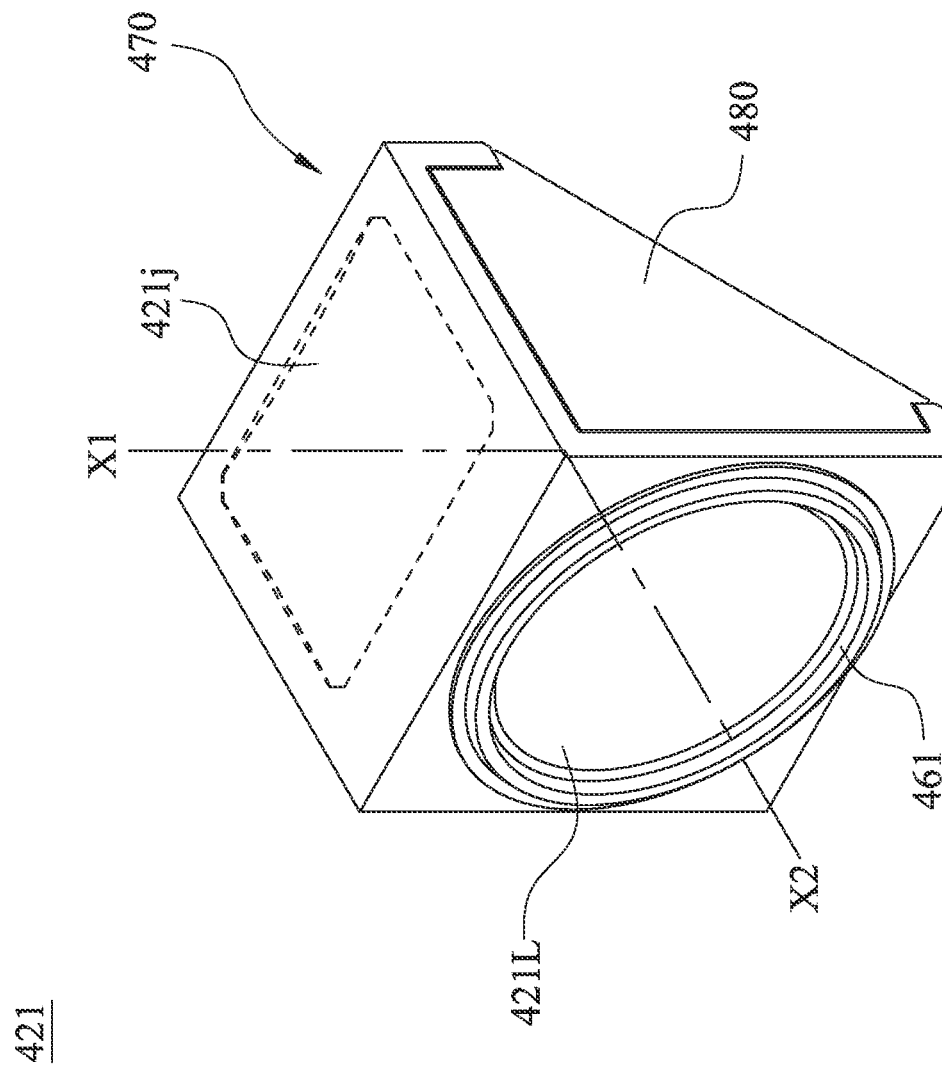
FIG. 4A is a three dimensional view of a lens element according to the 4th example of the present disclosure.
Figure 4B:
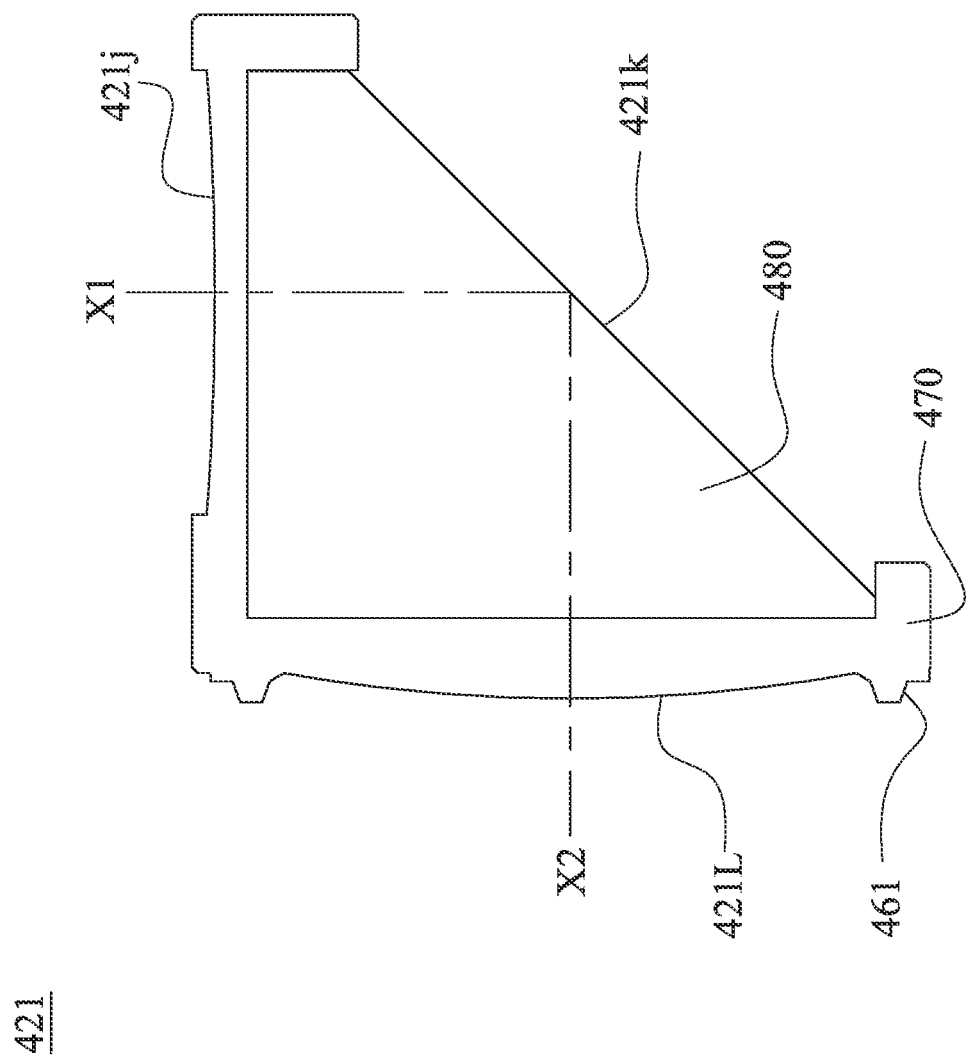
FIG. 4B is a schematic view of the lens element according to the 4th example in FIG. 4A.

FIG. 4A is a three dimensional view of a lens element 421 according to the 4th example of the present disclosure. FIG. 4B is a schematic view of the lens element 421 according to the 4th example in FIG. 4A. In FIGS. 4A and 4B, an imaging lens assembly has an imaging light path (its reference numeral is omitted), and the imaging light path includes a first optical axis X1 and a second optical axis X2. The imaging lens assembly (not shown) includes, in order from an object side to an image side, the lens element 421 and a second lens element (not shown), and the second optical axis X2 passes through the lens element 421 and the second lens element, wherein the lens element 421 can be a first lens element.

In particular, the first lens element includes an annular corresponding structure 461, wherein the annular corresponding structure 461 includes a first frustum surface (its reference numeral is omitted), a second frustum surface (its reference numeral is omitted) and a receiving surface (its reference numeral is omitted). In detail, the first frustum surface is disposed on a side of the first lens element facing towards the second lens element, and the second optical axis X2 is an axis of the first frustum surface; the second frustum surface and the first frustum surface are disposed on the same side and face towards the second lens element, the second frustum surface and the first frustum surface are coaxial, and the second frustum surface is closer to the second optical axis X2 than the first frustum surface to the second optical axis X2; the receiving surface faces towards the second lens element, the receiving surface is substantially vertical to the second optical axis X2, the receiving surface, the first frustum surface and the second frustum surface are disposed on the same side, and the receiving surface is directly contacted with the second lens element.

The first lens element is a reflective lens element for guiding the imaging light path to enter the first lens element along the first optical axis X1 and reflect the imaging light path to enter the imaging lens assembly along the second optical axis X2, wherein the first lens element along the imaging light path further includes an incident surface 421j, at least one reflective surface 421k and an exit surface 421L, and the imaging light path is folded on the reflective surface 421k towards a mirror direction. Moreover, each of the incident surface 421j and the exit surface 421L has a radius of curvature, each of the incident surface 421j and the exit surface 421L can be sphere or asphere, the incident surface 421j has a concave surface in a paraxial region, the exit surface 421L has a convex surface in a paraxial region, and the reflective surface 421k is a flat surface, wherein the radius of curvature of the incident surface 421j is 27.62 mm, and the radius of curvature of the exit surface 421L is 14.55 mm.

Each of the incident surface 421j and the exit surface 421L includes an axisymmetric surface, the imaging light path passes through the axisymmetric surfaces, and the axisymmetric surface of the exit surface 421L and the first frustum surface are coaxially disposed on the second optical axis X2, wherein the axisymmetric surfaces can be sphere, aspherical surface or freeform surface. Therefore, the first lens element can be simultaneously configured to fold the imaging light path and change the image field so as to reduce the optical components and enhance the assembling efficiency.

Figure 4C:
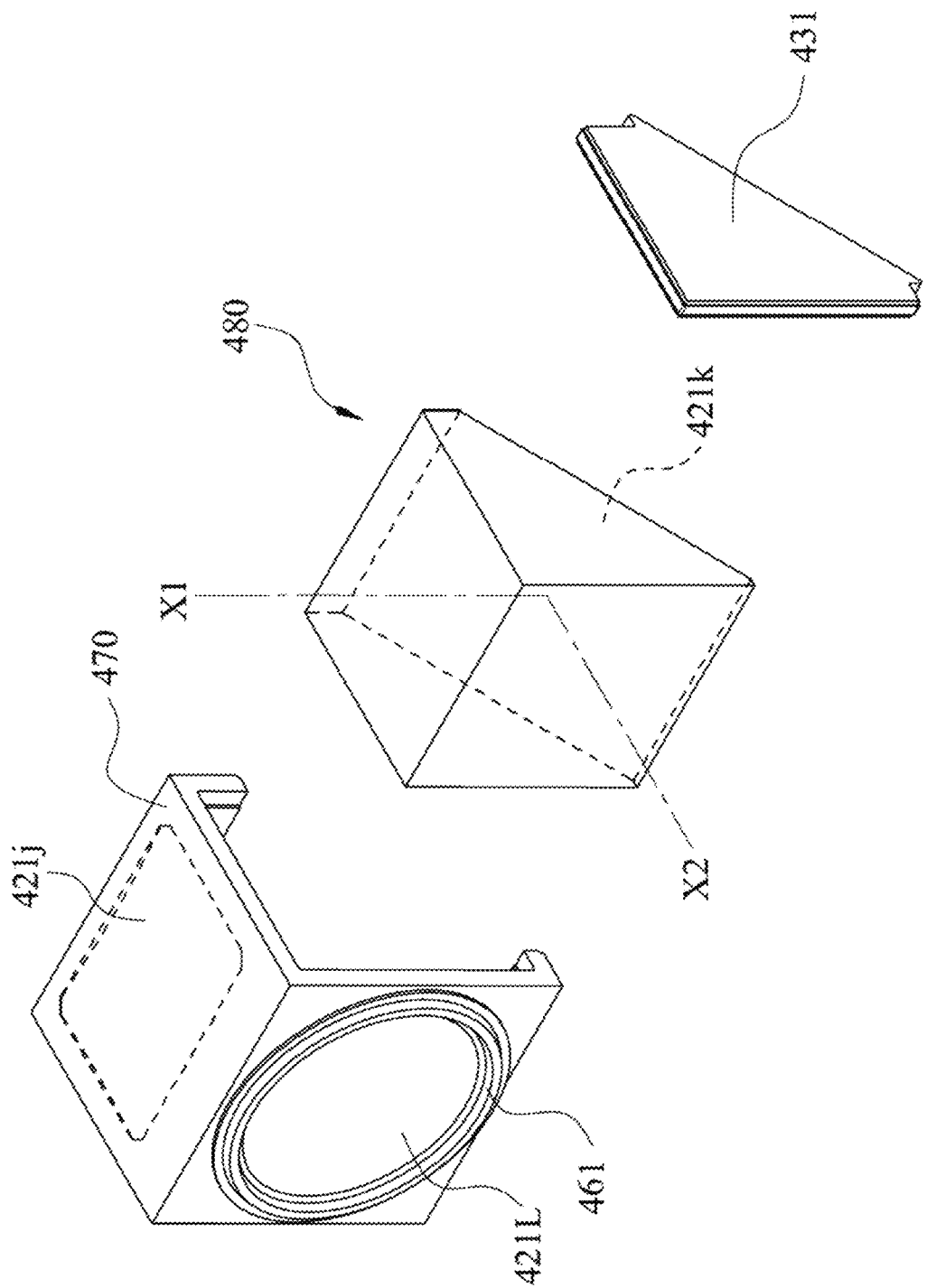
FIG. 4C is a schematic view of the lens element and the retainer according to the 4th example in FIG. 4A.

FIG. 4C is a schematic view of the lens element 421 and the retainer 431 according to the 4th example in FIG. 4A. In FIG. 4C, the first lens element further includes a reflective surface element 480 and an optical surface element 470, wherein the reflective surface 421k of the first lens element is formed on the reflective surface element 480, and the incident surface 421j and the exit surface 421L of the first lens element are formed on the optical surface element 470. The reflective surface element 480 is fixed on the optical surface element 470 via the retainer 431.

According to the 4th example, the reflective surface element 480 can be made of glass, the optical surface element 470 can be made of plastic, and the refractive index of the reflective surface element 480 can be higher than the refractive index of the optical surface element 470. Therefore, the incident light is easy to be totally reflected on the reflective surface 421k to enhance the brightness.

Moreover, the first lens element according to the 4th example can be applied to the imaging lens assembly according to the 3rd example, and the first lens element can be directly contacted with and aligned to the lens element 322 (that is, the second lens element) according to the 3rd example via the annular corresponding structures 461, 362.

Further, all of other structures and dispositions according to the 4th example are the same as the structures and the dispositions according to the 3rd example, and will not be described again herein.

5th Example

Figure 5A:
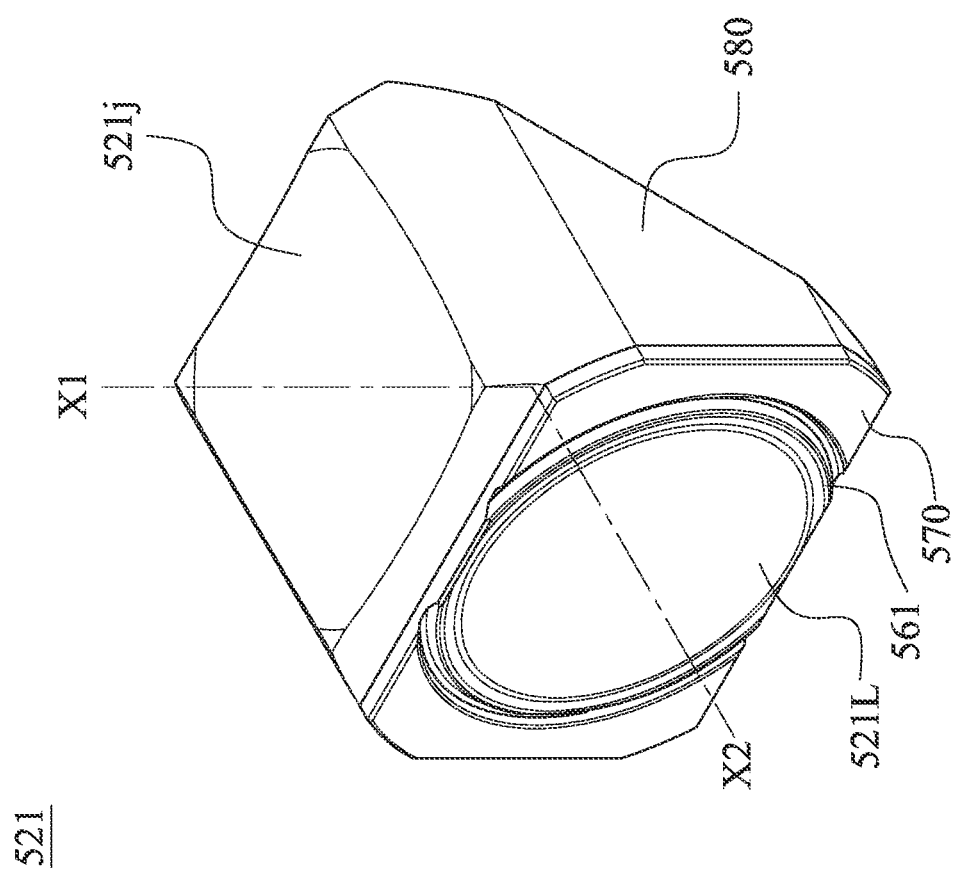
FIG. 5A is a three dimensional view of a lens element according to the 5th example of the present disclosure.

FIG. 5A is a three dimensional view of a lens element 521 according to the 5th example of the present disclosure. FIG. 5B is a schematic view of the lens element 521 according to the 5th example in FIG. 5A. In FIGS. 5A and 5B, an imaging lens assembly has an imaging light path (its reference numeral is omitted), and the imaging light path includes a first optical axis X1 and a second optical axis X2. The imaging lens assembly (not shown) includes, in order from an object side to an image side, the lens element 521 and a second lens element (not shown), and the second optical axis X2 passes through the lens element 521 and the second lens element, wherein the lens element 521 can be a first lens element.

In particular, the first lens element includes an annular corresponding structure 561 and a glue 540, wherein the annular corresponding structure 561 includes a first frustum surface (its reference numeral is omitted), a second frustum surface (its reference numeral is omitted) and a receiving surface (its reference numeral is omitted). In detail, the first frustum surface is disposed on a side of the first lens element facing towards the second lens element, and the second optical axis X2 is an axis of the first frustum surface; the second frustum surface and the first frustum surface are disposed on the same side and face towards the second lens element, the second frustum surface and the first frustum surface are coaxial, and the second frustum surface is closer to the second optical axis X2 than the first frustum surface to the second optical axis X2; the receiving surface faces towards the second lens element, the receiving surface is substantially vertical to the second optical axis X2, the receiving surface, the first frustum surface and the second frustum surface are disposed on the same side, and the receiving surface is directly contacted with the second lens element.

The first lens element is a reflective lens element for guiding the imaging light path to enter the first lens element along the first optical axis X1 and reflect the imaging light path to enter the imaging lens assembly along the second optical axis X2, wherein the first lens element along the imaging light path includes an incident surface 521j, at least one reflective surface 521k and an exit surface 521L, and the imaging light path is folded on the reflective surface 521k towards a mirror direction. Moreover, each of the incident surface 521j and the exit surface 521L has a radius of curvature, each of the incident surface 521j and the exit surface 521L can be sphere or asphere, the incident surface 521j has a concave surface in a paraxial region, the exit surface 521L has a convex surface in a paraxial region, and the reflective surface 521k is a flat surface, wherein the radius of curvature of the incident surface 521j is 27.62 mm, and the radius of curvature of the exit surface 521L is 14.55 mm.

Each of the incident surface 521j and the exit surface 521L includes an axisymmetric surface, the imaging light path passes through the axisymmetric surfaces, and the axisymmetric surface of the exit surface 521L and the first frustum surface are coaxially disposed on the second optical axis X2, wherein the axisymmetric surfaces can be sphere, aspherical surface or freeform surface. Therefore, the first lens element can be simultaneously configured to fold the imaging light path and change the image field so as to reduce the optical components and enhance the assembling efficiency.

Figure 5C:
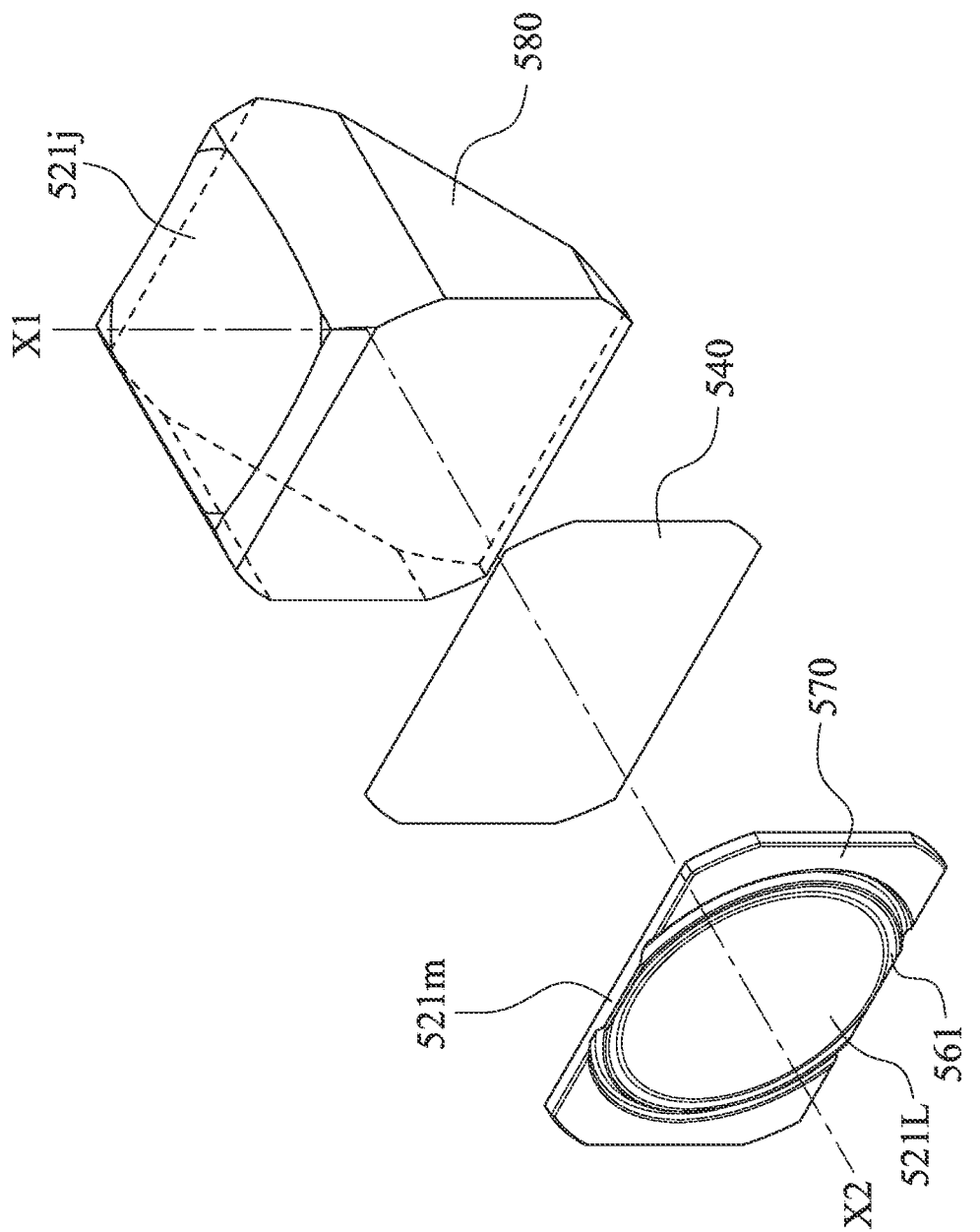
FIG. 5C is an exploded view of the lens element according to the 5th example in FIG. 5A.
Figure 5D:
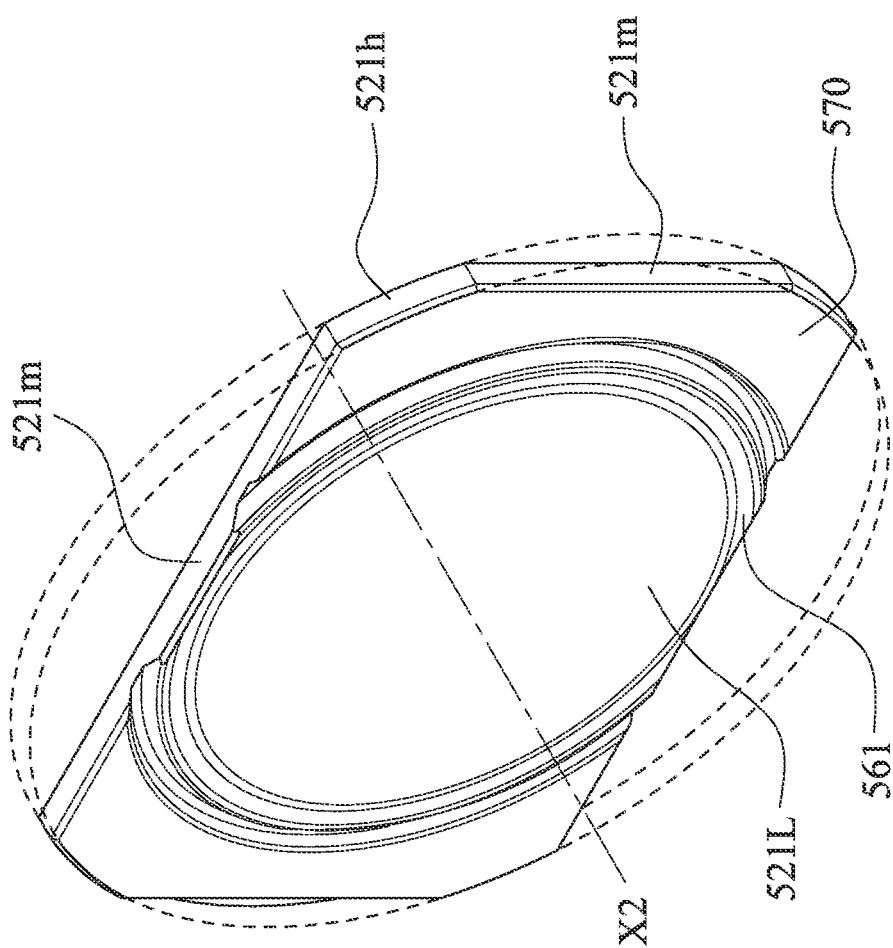
FIG. 5D is a schematic view of the optical surface element of the lens element according to the 5th example in FIG. 5A.

FIG. 5C is an exploded view of the lens element 521 according to the 5th example in FIG. 5A. FIG. 5D is a schematic view of the optical surface element 570 of the lens element 521 according to the 5th example in FIG. 5A. In FIGS. 5C and 5D, the first lens element further includes a reflective surface element 580 and the optical surface element 570, wherein the incident surface 521j and the reflective surface 521k of the first lens element are formed on the reflective surface element 580, and the exit surface 521L of the first lens element is formed on the optical surface element 570.

The reflective surface element 580 and the optical surface element 570 are bonded via the glue 540. Therefore, the interlayer of the dust can be avoided during fixing the relative position between the reflective surface element 580 and the optical surface element 570, so that the glare can be reduced.

According to the 5th example, the reflective surface element 580 can be made of glass, the optical surface element 570 can be made of plastic, and the refractive index of the reflective surface element 580 can be higher than the refractive index of the optical surface element 570. Therefore, the incident light is easy to be totally reflected on the reflective surface 521k to enhance the brightness.

In FIG. 5D, the first lens element includes four reduction surfaces 521m and four outside surfaces 521h, wherein the reduction surfaces 521m reduce from the outside surface 521h away from the second optical axis X2 towards the outside surface 521h close to the second optical axis X2, and the annular corresponding structure 561 and two of the reduction surfaces 521m are intersected, so that the annular corresponding structure 561 has two C-shaped structures relatively to the second optical axis X2.

Moreover, the first lens element according to the 5th example can be applied to the imaging lens assembly according to the 3rd example, and the first lens element can be directly contacted with and aligned to the lens element 322 (that is, the second lens element) according to the 3rd example via the annular corresponding structures 561, 362.

Further, all of other structures and dispositions according to the 5th example are the same as the structures and the dispositions according to the 3rd example, and will not be described again herein.

6th Example

Figure 6A:
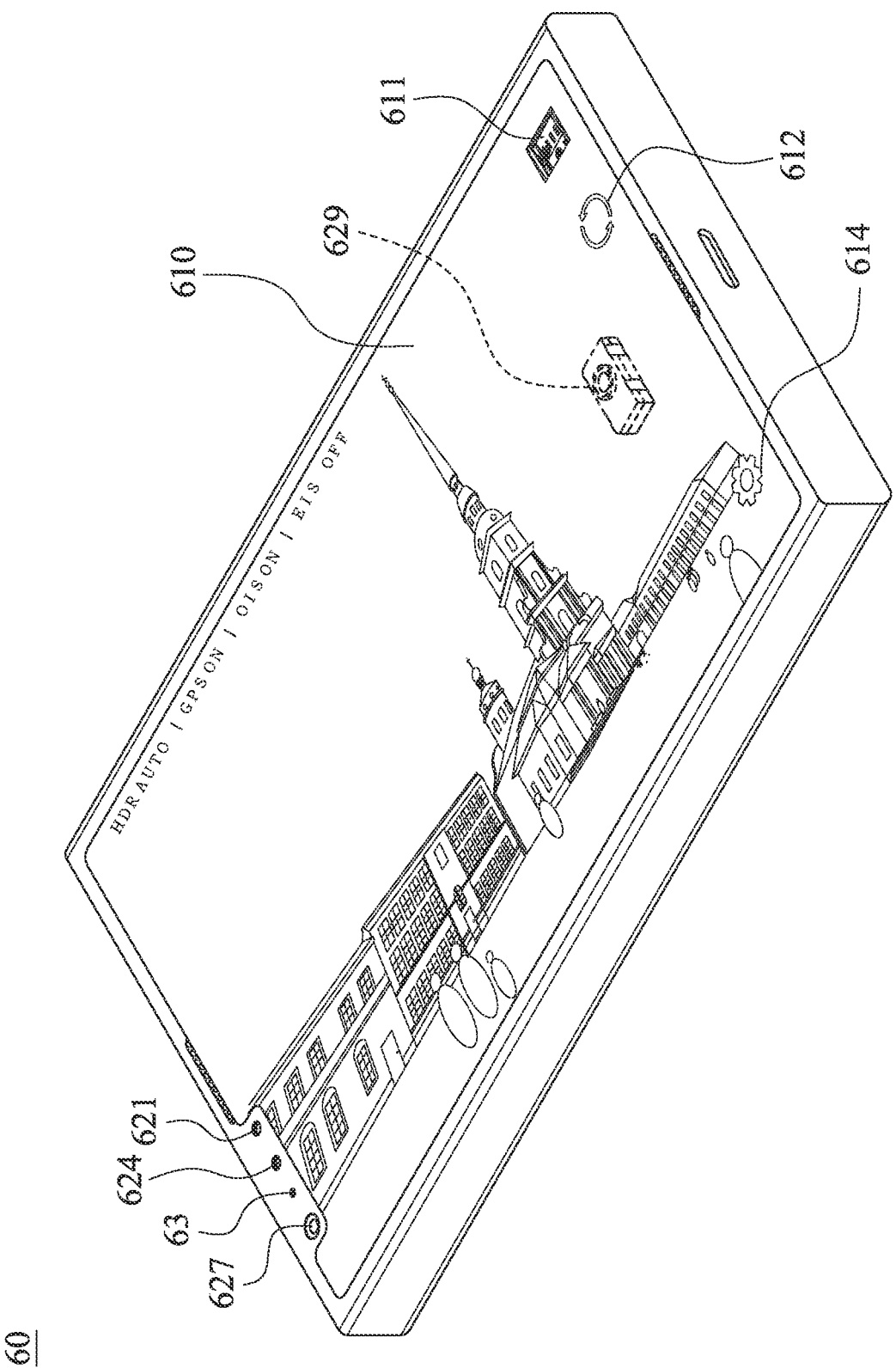
FIG. 6A is a schematic view of an electronic device according to the 6th example of the present disclosure.
Figure 6B:
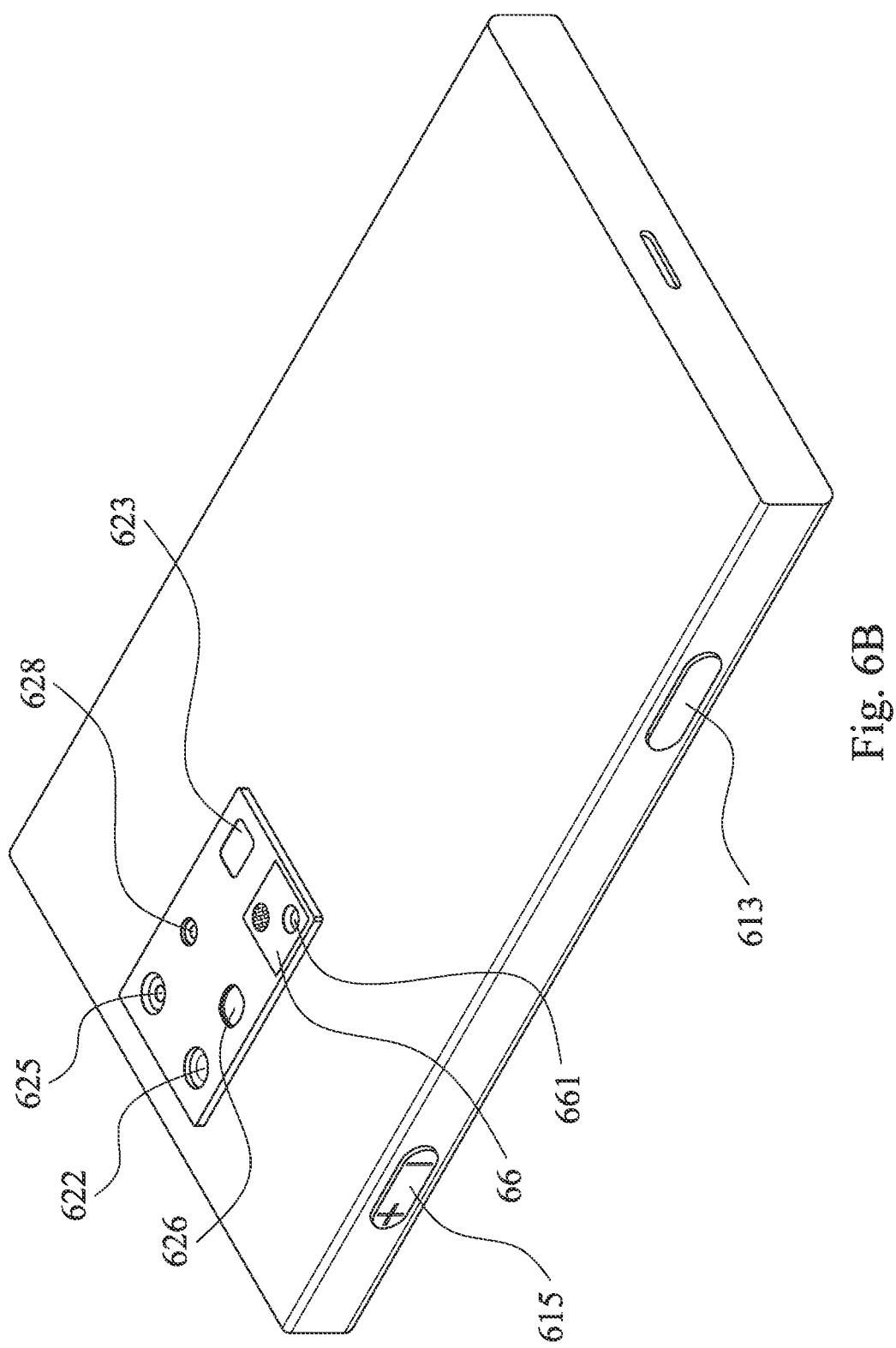
FIG. 6B is another schematic view of the electronic device according to the 6th example in FIG. 6A.
Figure 6C:
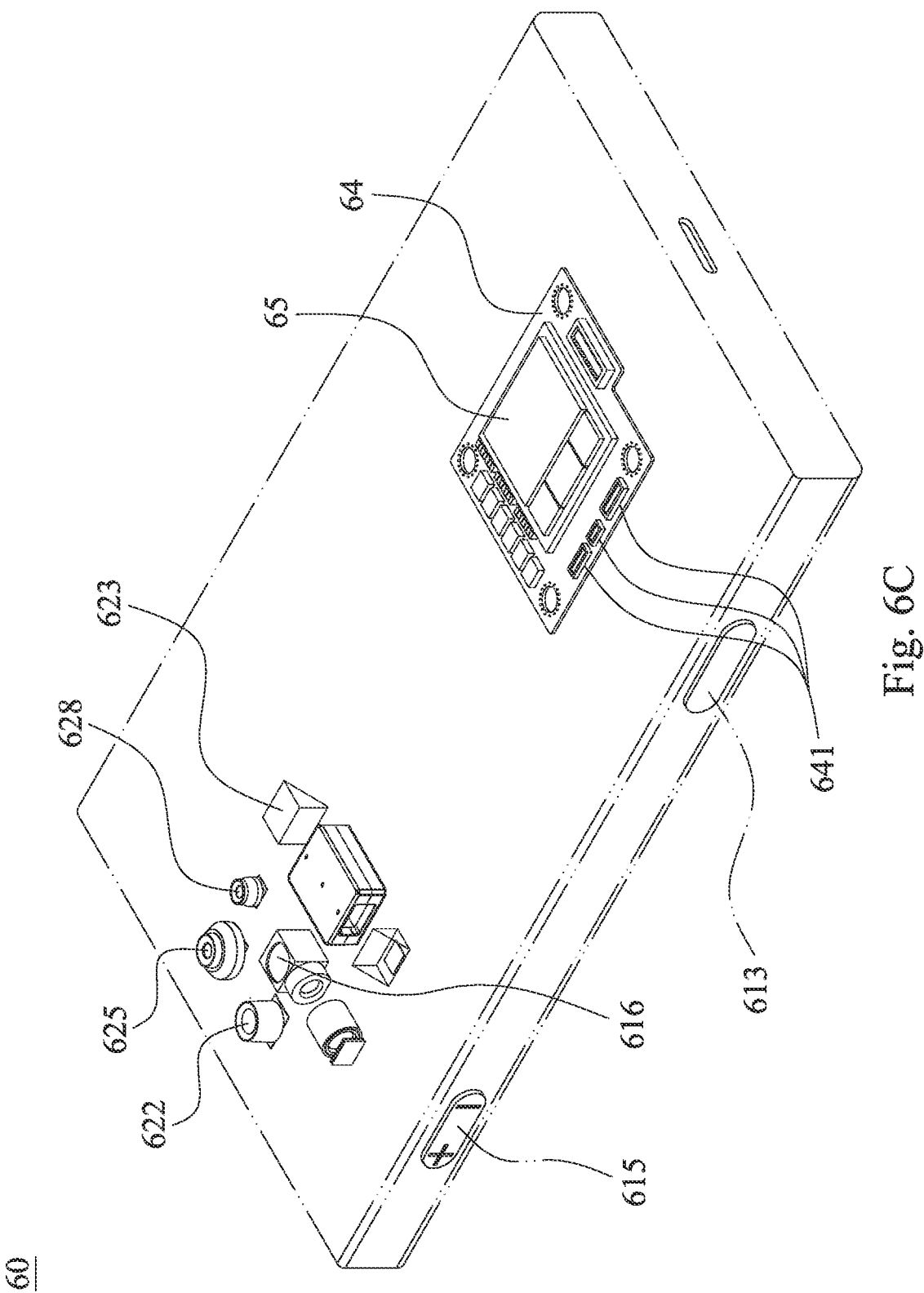
FIG. 6C is further another schematic view of the electronic device according to the 6th example in FIG. 6A.

FIG. 6A is a schematic view of an electronic device 60 according to the 6th example of the present disclosure. FIG. 6B is another schematic view of the electronic device 60 according to the 6th example in FIG. 6A. FIG. 6C is further another schematic view of the electronic device 60 according to the 6th example in FIG. 6A. In FIGS. 6A to 6C, the electronic device 60 is a smart phone, wherein the electronic device 60 can also be a laptop computer, a tablet computer or a dashcam, but the present disclosure is not limited thereto. The electronic device 60 includes at least one image capturing apparatus, an image sensor (not shown) and an imaging control interface 610, wherein the image capturing apparatus includes at least one imaging lens assembly, and the image sensor is disposed on an image surface (not shown) of the imaging lens assembly.

According to the 6th example, the imaging lens assembly includes ultra-wide angle image capturing apparatuses 621, 622, an ultra-telephoto image capturing apparatus 623, wide-angle image capturing apparatuses 624, 625, a telephoto image capturing apparatus 626, a time-of-flight (TOF) module 627, a macro image capturing apparatus 628 and a biometric sensing image capturing apparatus 629, wherein the TOF module 627 and the biometric sensing image capturing apparatus 629 can be another image capturing apparatuses with other functions, but the disposition is not limited thereto. In particular, the imaging lens assembly can be one of the imaging lens assemblies according to the aforementioned 1st example to the 5th example, but the present disclosure is not limited thereto.

In detail, the ultra-wide angle image capturing apparatus 621, the wide-angle image capturing apparatus 624, the TOF module 627 and the biometric sensing image capturing apparatus 629 are disposed on a front of the electronic device 60, the ultra-wide angle image capturing apparatus 622, the ultra-telephoto image capturing apparatus 623, the wide-angle image capturing apparatus 625, the telephoto image capturing apparatus 626 and the macro image capturing apparatus 628 are disposed on a back of the electronic device 60.

The imaging control interface 610 can be a touch screen for displaying the scene and having the touch function, and the shooting angle can be manually adjusted. In detail, the imaging control interface 610 includes an image replay button 611, an image capturing switching button 612, a focus capturing button 613, an integrated menu button 614 and a zoom control button 615. Furthermore, users enter a shooting mode via the imaging control interface 610 of the electronic device 60, the image capturing switching button 612 can be flexibly configured to switch one of the ultra-wide angle image capturing apparatuses 621, 622, the ultra-telephoto image capturing apparatus 623, the wide-angle image capturing apparatuses 624, 625, the telephoto image capturing apparatus 626 and the macro image capturing apparatus 628 to capture the image, the zoom control button 615 is configured to adjust the zoom, the users use the focus capturing button 613 to undergo image capturing after capturing the images and confirming one of the ultra-wide angle image capturing apparatuses 621, 622, the ultra-telephoto image capturing apparatus 623, the wide-angle image capturing apparatuses 624, 625, the telephoto image capturing apparatus 626 and the macro image capturing apparatus 628, the users can view the images by the image replay button 611 after undergoing image capturing, and the integrated menu button 614 is configured to adjust the details of the image capturing (such as timed photo, photo ratio, and etc.).

The electronic device 60 can further include a reminding light 63, and the reminding light 63 is disposed on the front of the electronic device 60 and can be configured to remind the users of unread messages, missed calls and the condition of the phone.

Moreover, after entering the shooting mode via the imaging control interface 610 of the electronic device 60, the imaging light is gathered on the image sensor via the imaging lens assembly, and an electronic signal about an image is output to an image signal processor (ISP) (its reference numeral is omitted) of a single chip system 65. The single chip system 65 can further include a random access memory (RAM) (its reference numeral is omitted), a central processing unit (its reference numeral is omitted) and a storage unit (its reference numeral is omitted). Also, the single chip system 65 can further include, but not be limited to, a display, a control unit, a read-only memory (ROM), or the combination thereof.

To meet a specification of the electronic device 60, the electronic device 60 can further include an optical anti-shake mechanism (not shown). Furthermore, the electronic device 60 can further include at least one focusing assisting module 66 and at least one sensing element (not shown). The focusing assisting module 66 can include a flash module 661 for compensating a color temperature, an infrared distance measurement component (not shown), a laser focus module (not shown), etc. The sensing element can have functions for sensing physical momentum and kinetic energy, such as an accelerator, a gyroscope, a Hall Effect Element, a position locator, a signal transmitter module, to sense shaking or jitters applied by hands of the user or external environments. Accordingly, the electronic device 60 equipped with an auto-focusing mechanism and the optical anti-shake mechanism can be enhanced to achieve the superior image quality. Furthermore, the electronic device 60 according to the present disclosure can have a capturing function with multiple modes, such as taking optimized selfies, high dynamic range (HDR) under a low light condition, 4K resolution recording, etc. Furthermore, the users can visually see a captured image of the camera through the imaging control interface 610 and manually operate the view finding range on the imaging control interface 610 to achieve the autofocus function of what you see is what you get.

Moreover, the imaging lens assembly, the image sensor, the optical anti-shake mechanism, the sensing element and the focusing assisting module 66 can be disposed on a circuit board 64 and electrically connected to the associated components via a connector 641 to perform a capturing process, wherein the circuit board 64 can be a flexible printed circuit board (FPC). Since the current electronic devices, such as smart phones, have a tendency of being compact, the way of firstly disposing the imaging lens assembly and related components on the flexible printed circuit board and secondly integrating the circuit thereof into the main board of the electronic device via the connector can satisfy the requirements of the mechanical design and the circuit layout of the limited space inside the electronic device, and obtain more margins. The autofocus function of the imaging lens assembly can also be controlled more flexibly via the touch screen of the electronic device. According to the 6th embodiment, the sensing elements and the focusing assisting modules 66 are disposed on the circuit board 64 and at least one other flexible printed circuit board (not shown) and electrically connected to the associated components, such as the image signal processor, via corresponding connectors to perform the capturing process. In other embodiments (not shown), the sensing elements and the focusing assisting modules can also be disposed on the main board of the electronic device or carrier boards of other types according to requirements of the mechanical design and the circuit layout.

Figure 6D:
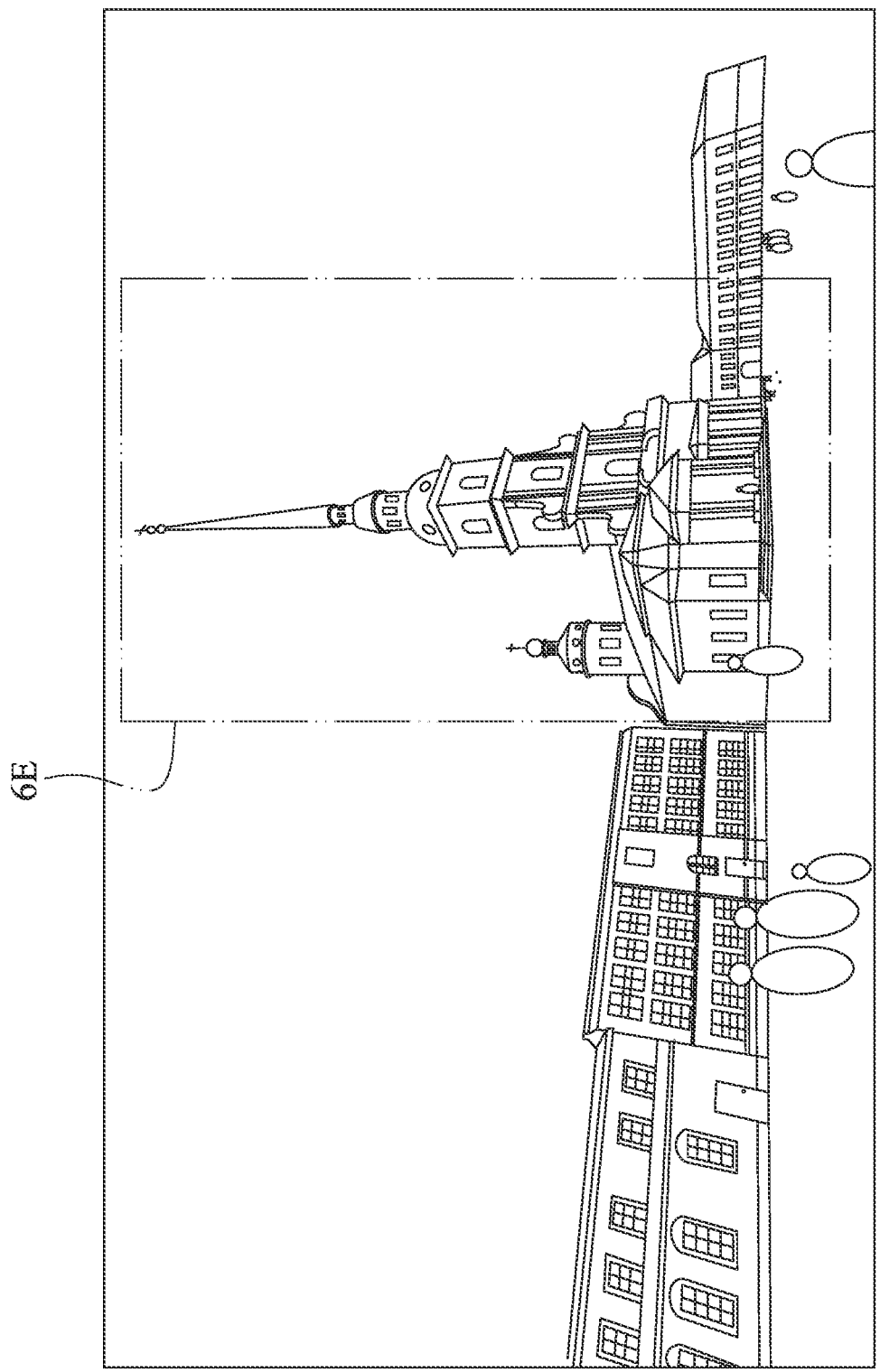
FIG. 6D is a schematic view of an image captured via the ultra-wide angle image capturing apparatuses according to the 6th example in FIG. 6A.

FIG. 6D is a schematic view of an image captured via the ultra-wide angle image capturing apparatuses 621, 622 according to the 6th example in FIG. 6A. In FIG. 6D, comparing with the image captured via the wide angle image capturing apparatuses 624, 625, the image captured via the ultra-wide angle image capturing apparatuses 621, 622 has wider visual angle and wider depth of field, but the image captured via the image captured via the ultra-wide angle image capturing apparatuses 621, 622 also has greater distortion. According to FIG. 6D, the visual angle is 105 degrees to 125 degrees, and the equivalent focal length is 11 mm to 14 mm.

Figure 6E:
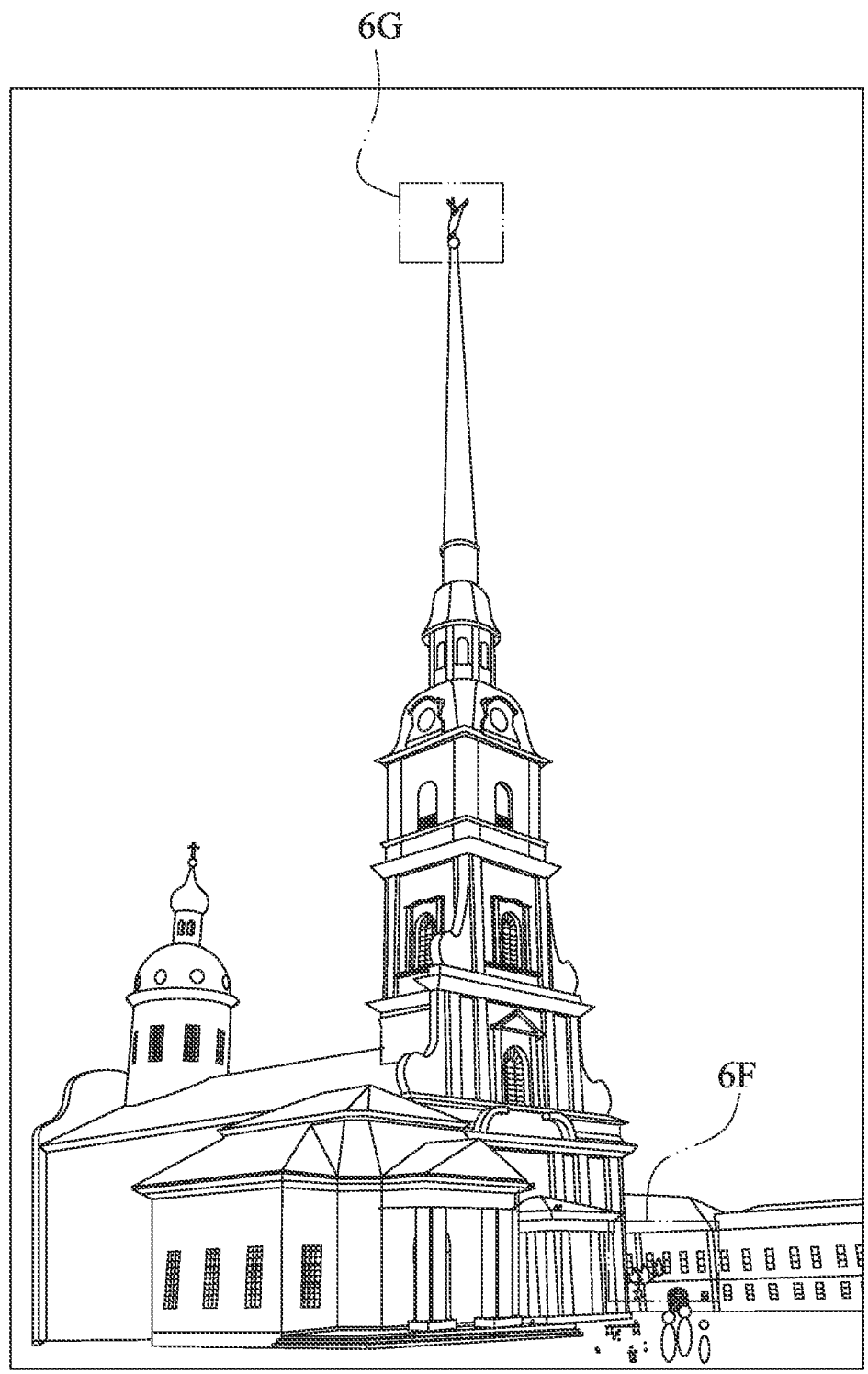
FIG. 6E is a schematic view of an image captured via the wide angle image capturing apparatuses according to the 6th example in FIG. 6A.

FIG. 6E is a schematic view of an image captured via the wide angle image capturing apparatuses 624, 625 according to the 6th example in FIG. 6A. In FIG. 6E, the image of the certain range with the high resolution can be captured via the wide angle image capturing apparatuses 624, 625, and the wide angle image capturing apparatuses 624, 625 have the function of the high resolution and the low deformation. In particular, FIG. 6E is the partial enlarged view of FIG. 6D. According to FIG. 6E, the visual angle is 70 degrees to 90 degrees, and the equivalent focal length is 22 mm to 30 mm.

Figure 6F:
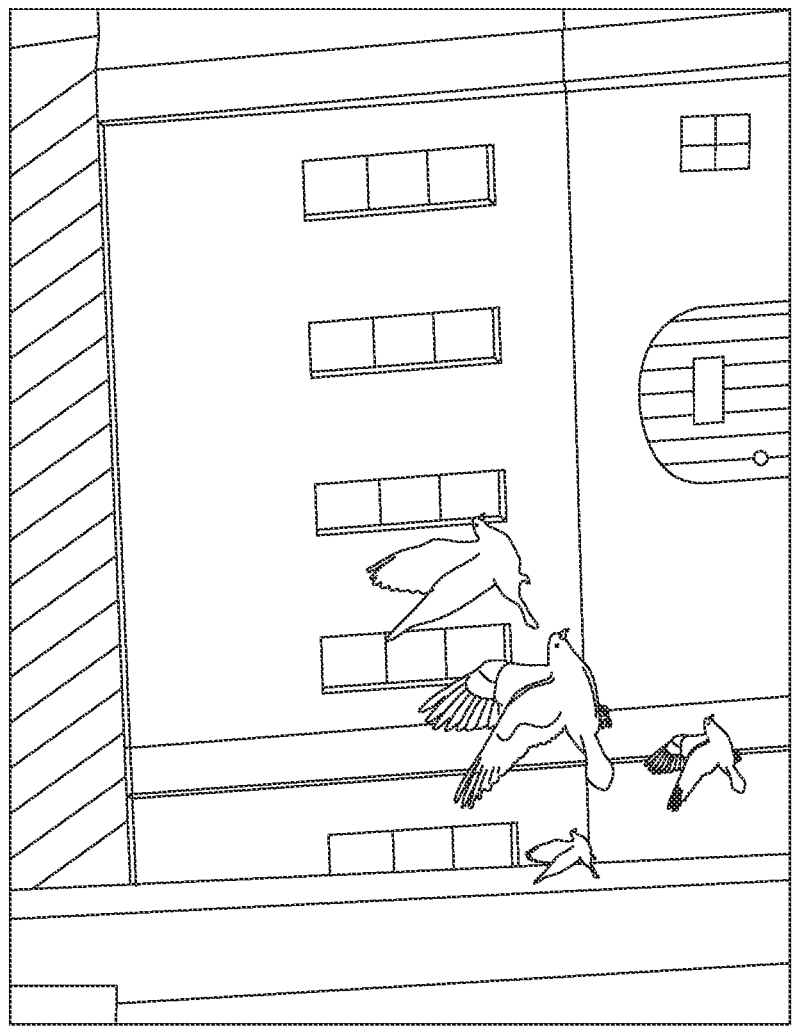
FIG. 6F is a schematic view of an image captured via the telephoto image capturing apparatus according to the 6th example in FIG. 6A.

FIG. 6F is a schematic view of an image captured via the telephoto image capturing apparatus 626 according to the 6th example in FIG. 6A. In FIG. 6F, comparing with the image captured via the wide angle image capturing apparatuses 624, 625, the image captured via the telephoto image capturing apparatus 626 has narrower visual angle and narrower depth of field. Hence, the telephoto image capturing apparatus 626 can be configured to capture the moving targets, that is, the telephoto image capturing apparatus 626 can be driven via an actuator (not shown) of the electronic device 60 to quick and continuous auto focus the moving targets, so as to make the image of the moving targets is not fuzzy owing to defocus. In particular, FIG. 6F is the partial enlarged view of FIG. 6E. According to FIG. 6F, the visual angle is 10 degrees to 40 degrees, and the equivalent focal length is 60 mm to 300 mm.

Figure 6G:
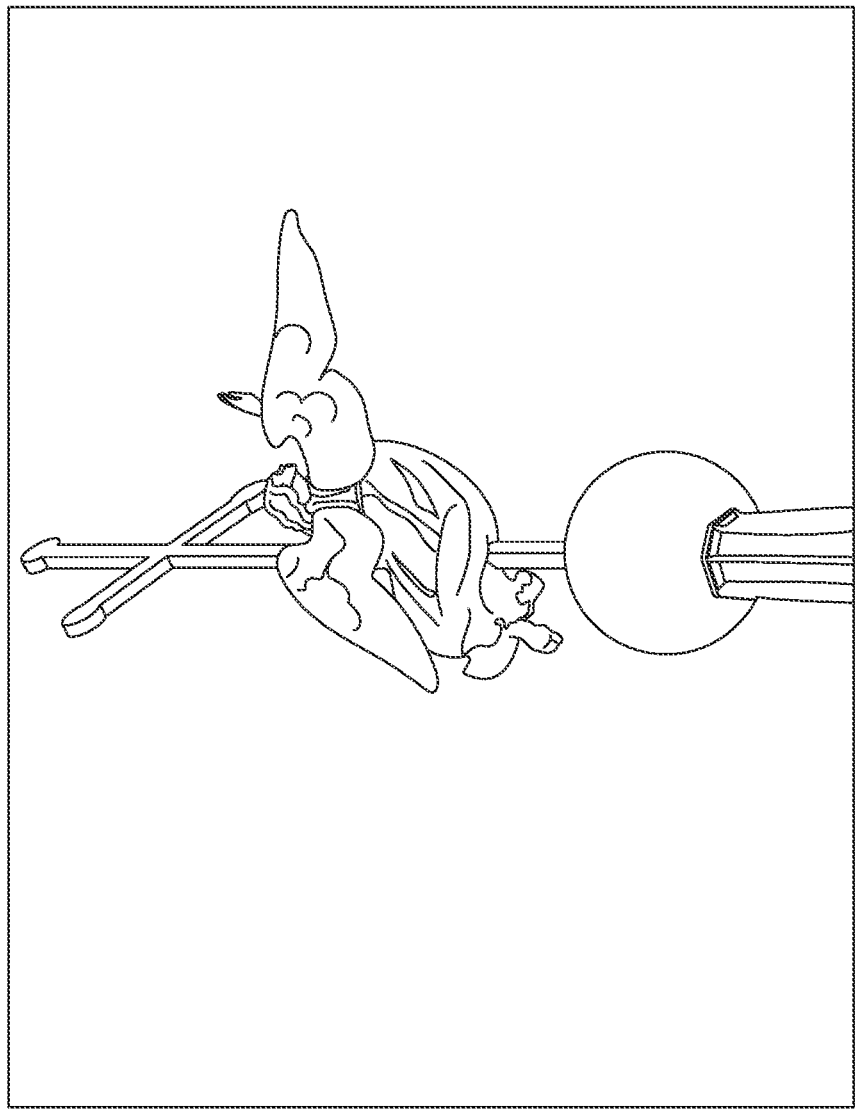
FIG. 6G is a schematic view of an image captured via the ultra-telephoto image capturing apparatus according to the 6th example in FIG. 6A.

FIG. 6G is a schematic view of an image captured via the ultra-telephoto image capturing apparatus 623 according to the 6th example in FIG. 6A. In FIG. 6G, comparing with the image captured via the telephoto image capturing apparatus 626, the image captured via the ultra-telephoto image capturing apparatus 623 has narrower visual angle and narrower depth of field, and the image captured by the ultra-telephoto image capturing apparatus 623 is easily fuzzy due to the shaking. Hence, the actuator is configure to provide the driving force to make the ultra-telephoto image capturing apparatus 623 focus on the targets, and the actuator is also configure to provide the feedback of modifying the shaking to obtain the effect of the optical image stabilization. In particular, FIG. 6G is the partial enlarged view of FIG. 6E. According to FIG. 6G, the visual angle is 4 degrees to 8 degrees, and the equivalent focal length is 400 mm to 600 mm.

In FIGS. 6D to 6G, the zooming function can be obtained via the electronic device 60, when the scene is captured via the imaging lens assembly with different focal lengths cooperated with the function of image processing. It should be mentioned that the equivalent focal length is the estimated value by conversion, and the equivalent focal length may be different from the actual focal length because of the design of the imaging lens assembly and the cooperation of the dimension of the image sensor.

The foregoing description, for purpose of explanation, has been described with reference to specific examples. It is to be noted that Tables show different data of the different examples; however, the data of the different examples are obtained from experiments. The examples were chosen and described in order to best explain the principles of the disclosure and its practical applications, to thereby enable others skilled in the art to best utilize the disclosure and various examples with various modifications as are suited to the particular use contemplated. The examples depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly comprising, in order from an object side to an image side, a first lens element and a second lens element, and an optical axis passing through the first lens element and the second lens element;
    wherein the first lens element comprises:
        a first frustum surface disposed on a side of the first lens element facing towards the second lens element, and the optical axis being an axis of the first frustum surface; and
        a second frustum surface, the first frustum surface and the second frustum surface disposed on the same side and being coaxial, and the second frustum surface closer to the optical axis than the first frustum surface to the optical axis;
    wherein the second lens element comprises:
        a first corresponding frustum surface corresponding to the first frustum surface; and
        a second corresponding frustum surface corresponding to the second frustum surface;
    wherein when an environmental temperature is T1, the first frustum surface is directly contacted with the first corresponding frustum surface, the second frustum surface and the second corresponding frustum surface are disposed at intervals, and the first lens element is aligned to the second lens element; when the environmental temperature is T2, the second frustum surface is directly contacted with the second corresponding frustum surface, the first frustum surface and the first corresponding frustum surface are disposed at intervals, the first lens element is aligned to the second lens element, and the following condition is satisfied:

$$5\ K \leq |T1-T2| \leq 200\ K.$$

2. The imaging lens assembly of claim 1, wherein on a cross section perpendicular to the optical axis and passing through the first frustum surface, the first corresponding frustum surface, the second frustum surface and the second corresponding frustum surface, a nearest distance between the first frustum surface and the second frustum surface is D, a shortest distance between the first corresponding frustum surface and the second corresponding frustum surface is d, and the following condition is satisfied:

$$0.2\ \mu m \leq |D-d| \leq 19.8\ \mu m.$$

3. The imaging lens assembly of claim 1, wherein at least one of the first lens element and the second lens element further comprises an outside surface, the outside surface is farther from the optical axis than the first frustum surface, the first corresponding frustum surface, the second frustum surface or the second corresponding frustum surface from the optical axis, and a light blocking layer of the imaging lens assembly covers at least one portion of the outside surface.

4. The imaging lens assembly of claim 1, further comprising:
    a lens carrier accommodating the first lens element and the second lens element, and comprising an inside surface, wherein the inside surface faces towards and surrounds the first lens element and the second lens element;
    wherein one of the first lens element and the second lens element and the lens carrier are disposed at intervals.

5. The imaging lens assembly of claim 1, wherein the first lens element and the second lens element have different coefficients of linear thermal expansion, the coefficient of linear thermal expansion of the first lens element is E1, the coefficient of linear thermal expansion of the second lens element is E2, and the following condition is satisfied:

$$0.005 \leq |(E1-E2)/(E1+E2)| \leq 0.95.$$

6. The imaging lens assembly of claim 1, wherein an angle between the first frustum surface and the second frustum surface on a cross section parallel to the optical axis is $\theta$, and the following condition is satisfied:

$$10\ degrees \leq \theta \leq 90\ degrees.$$

7. The imaging lens assembly of claim 1, wherein the first lens element further comprises a receiving surface facing towards the second lens element and substantially perpendicular to the optical axis;
    wherein the receiving surface keeps being directly contacted with the second lens element when the environmental temperature is between T1 and T2.

8. The imaging lens assembly of claim 1, wherein one of the first lens element and the second lens element comprises at least one reduction surface reducing from a side of the one of the first lens element and the second lens element away from the optical axis towards a direction close to the optical axis.

9. The imaging lens assembly of claim 1, wherein one of the first lens element and the second lens element is a reflective lens element, the reflective lens element along an imaging light path comprises an incident surface, at least one reflective surface and an exit surface, and the imaging light path is folded on the at least one reflective surface towards a mirror direction;
wherein at least one of the incident surface and the exit surface comprises an axisymmetric surface, the imaging light path passes through the axisymmetric surface, and the axisymmetric surface and the first frustum surface are coaxially disposed on the optical axis.

10. The imaging lens assembly of claim 9, wherein the incident surface, the at least one reflective surface and the exit surface of the reflective lens element are integrally formed via a plastic injection.

11. The imaging lens assembly of claim 9, wherein the reflective lens element further comprises a reflective surface element and an optical surface element, the at least one reflective surface is formed on the reflective surface element, and the at least one of the incident surface and the exit surface is formed on the optical surface element.

12. The imaging lens assembly of claim 11, wherein the reflective lens element further comprises a glue bonded the reflective surface element and the optical surface element.

13. An imaging lens assembly comprising, in order from an object side to an image side, a first lens element and a second lens element;
wherein the first lens element comprises:
a first frustum surface disposed on a side of the first lens element facing towards the second lens element, and an optical axis being an axis of the first frustum surface; and
a receiving surface, the first frustum surface and the receiving surface disposed on the same side, the receiving surface substantially perpendicular to the optical axis, and the receiving surface directly contacted with the second lens element;
wherein the second lens element comprises:
a corresponding frustum surface disposed on a side of the second lens element facing towards the first lens element, and corresponding to the first frustum surface;
wherein when an environmental temperature is between T1 and T2, a spacing between the first frustum surface and the corresponding frustum surface changes according to the environmental temperature and is recoverable, and the receiving surface and the second lens element keep being directly contacted; when the environmental temperature is T1, the first frustum surface and the corresponding frustum surface are disposed at intervals; when the environmental temperature is T2, the first frustum surface is directly contacted with the corresponding frustum surface, the first lens element is aligned to the second lens element, and the following condition is satisfied:

5 K≤|T1−T2|≤200 K.

14. The imaging lens assembly of claim 13, wherein when the environmental temperature is a random temperature between T1 and T2, on a cross section perpendicular to the optical axis and passing through the first frustum surface and the corresponding frustum surface, a shortest distance between the first frustum surface and the corresponding frustum surface is D', and D' is not larger than 19.8 μm; when the environmental temperature is between T1 and T2, a maximum shortest distance between the first frustum surface and the corresponding frustum surface is D'max, and D'max is not less than 0.2 μm.

15. The imaging lens assembly of claim 13, wherein the first lens element further comprises a second frustum surface facing towards the second lens element; when the environmental temperature is T1, the second frustum surface is directly contacted with the second lens element;
wherein an angle between the first frustum surface and the second frustum surface on a cross section parallel to the optical axis is θ, and the following condition is satisfied:

10 degrees≤θ≤90 degrees.

16. The imaging lens assembly of claim 13, wherein at least one of the first lens element and the second lens element further comprises an outside surface, the outside surface is farther from the optical axis than the first frustum surface, the receiving surface or the corresponding frustum surface from the optical axis, and a light blocking layer of the imaging lens assembly covers at least one portion of the outside surface.

17. The imaging lens assembly of claim 13, further comprising:
a lens carrier accommodating the first lens element and the second lens element, and comprising an inside surface, wherein the inside surface faces towards and surrounds the first lens element and the second lens element;
wherein one of the first lens element and the second lens element and the lens carrier are disposed at intervals.

18. The imaging lens assembly of claim 13, wherein one of the first lens element and the second lens element is a reflective lens element, the reflective lens element along an imaging light path comprises an incident surface, at least one reflective surface and an exit surface, and the imaging light path is folded on the at least one reflective surface towards a mirror direction;
wherein at least one of the incident surface and the exit surface comprises an axisymmetric surface, the imaging light path passes through the axisymmetric surface, and the axisymmetric surface and the first frustum surface are coaxially disposed on the optical axis.

19. The imaging lens assembly of claim 18, wherein the reflective lens element further comprises a reflective surface element and an optical surface element, the at least one reflective surface is formed on the reflective surface element, and the at least one of the incident surface and the exit surface is formed on the optical surface element;
wherein the reflective lens element further comprises a glue bonded the reflective surface element and the optical surface element.

20. The imaging lens assembly of claim 19, wherein one of the first lens element and the second lens element comprises at least one reduction surface reducing from a side of the one of the first lens element and the second lens element away from the optical axis towards a direction close to the optical axis.

21. An electronic device, comprising:
at least one of the image lens assembly of claim 1; and
an image sensor disposed on an image surface of the imaging lens assembly.

22. An electronic device, comprising:
at least one of the image lens assembly of claim 13; and an image sensor disposed on an image surface of the imaging lens assembly.

\* \* \* \* \*